(12) United States Patent
Miyazaki et al.

(10) Patent No.: US 8,405,687 B2
(45) Date of Patent: Mar. 26, 2013

(54) MULTI-PRIMARY COLOR DISPLAY DEVICE

(75) Inventors: Akiko Miyazaki, Osaka (JP); Kazunari Tomizawa, Osaka (JP); Kozo Nakamura, Osaka (JP); Shun Ueki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 178 days.

(21) Appl. No.: 13/056,175

(22) PCT Filed: Jul. 23, 2009

(86) PCT No.: PCT/JP2009/003485
§ 371 (c)(1),
(2), (4) Date: Jan. 27, 2011

(87) PCT Pub. No.: WO2010/013421
PCT Pub. Date: Feb. 4, 2010

(65) Prior Publication Data
US 2011/0128309 A1 Jun. 2, 2011

(30) Foreign Application Priority Data
Jul. 28, 2008 (JP) .................................. 2008-193889

(51) Int. Cl.
*G09G 5/10* (2006.01)
*G09G 3/30* (2006.01)
*G09G 3/36* (2006.01)
(52) U.S. Cl. .............................. 345/690; 345/77; 345/88
(58) Field of Classification Search ............ 345/87–106, 345/690
See application file for complete search history.

(56) References Cited

U.S. PATENT DOCUMENTS

| 4,800,375 | A | 1/1989 | Silverstein et al. |
| 6,621,497 | B1 | 9/2003 | Sugiura et al. |
| 7,268,757 | B2 | 9/2007 | Ben-David et al. |
| 7,626,565 | B2 * | 12/2009 | Tsuge .............................. 345/76 |

(Continued)

FOREIGN PATENT DOCUMENTS

| JP | 6-261332 A | 9/1994 |
| JP | 9-251160 A | 9/1997 |

(Continued)

OTHER PUBLICATIONS

Official Communication issued in International Patent Application No. PCT/JP2009/003485, mailed on Aug. 18, 2009.

(Continued)

*Primary Examiner* — Alexander Eisen
*Assistant Examiner* — Nan-Ying Yang
(74) *Attorney, Agent, or Firm* — Keating & Bennett, LLP

(57) ABSTRACT

A multi-primary color display device according to the present invention includes pixels, each having a plurality of sub-pixels. The plurality of sub-pixels include first, second, third and fourth sub-pixels for displaying first, second, third and fourth colors having first, second, third and fourth hues. The second and third hues are adjacent to the first hue on both sides thereof on an a*b* plane of an L*a*b* colorimetric system. When a color displayed by each pixel changes from black to an optimal color of the first hue, luminance values of the plurality of sub-pixels are set such that the luminance value of the first sub-pixel starts to be increased and also the luminance values of the second and third sub-pixels start to be increased at a rate of increase lower than the rate of increase of the first sub-pixel.

13 Claims, 33 Drawing Sheets

U.S. PATENT DOCUMENTS

| | | |
|---|---|---|
| 2003/0151694 A1 | 8/2003 | Lee et al. |
| 2003/0227429 A1 | 12/2003 | Shimoshikiryo |
| 2004/0001167 A1 | 1/2004 | Takeuchi et al. |
| 2004/0174389 A1 | 9/2004 | Ben-David et al. |
| 2005/0122294 A1* | 6/2005 | Ben-David et al. ............ 345/87 |
| 2005/0206979 A1 | 9/2005 | Tomizawa et al. |
| 2009/0135213 A1* | 5/2009 | Tomizawa et al. ............ 345/697 |
| 2009/0167657 A1 | 7/2009 | Tomizawa |

FOREIGN PATENT DOCUMENTS

| | | |
|---|---|---|
| JP | 2001-209047 A | 8/2001 |
| JP | 2001-306023 A | 11/2001 |
| WO | 2007/032133 A1 | 3/2007 |
| WO | WO 2007032133 A1 * | 3/2007 |
| WO | 2007/097080 A1 | 8/2007 |
| WO | WO 2007148519 A1 * | 12/2007 |

OTHER PUBLICATIONS

Yang et al.; "31.1: Development of Six Primary-Color LCD"; Society for Information Display, 2005 International Symposium Digest of Technical Papers; May 25-27, 2005; pp. 1210-1213; vol. XXXVI, Book II.

Chino et al.; "25.1: Invited Paper: Development of Wide-Color-Gamut Mobile Displays With Four-Primary-Color LCDS"; Society for Information Display, 2006 International Symposium Digest of Technical Papers; Jun. 7-9, 2006; pp. 1221-1224; vol. XXXVII, Book II.

"Improving LCD TV Color Using Multi-Primary Technology"; FPD International 2005 Forum; Oct. 19, 2005; Total of 66 pages.

English translation of Official Communication issued in corresponding International Application PCT/JP2009/003485, mailed on Mar. 17, 2011.

* cited by examiner (a)    (b)

| | | | | | | | | | | | | |
|---|---|---|---|---|---|---|---|---|---|---|---|---|
| R | R | Ye | G | C | B | R | R | Ye | G | C | B | × |
| R | R | Ye | G | B | C | R | R | Ye | G | B | C | × |
| R | R | Ye | C | G | B | R | R | Ye | C | G | B | × |
| R | R | Ye | C | B | G | R | R | Ye | C | B | G | × |
| R | R | Ye | B | G | C | R | R | Ye | B | G | C | × |
| R | R | Ye | B | C | G | R | R | Ye | B | C | G | × |
| R | R | G | Ye | C | B | R | R | G | Ye | C | B | × |
| R | R | G | Ye | B | C | R | R | G | Ye | B | C | ○ |
| R | R | G | C | Ye | B | R | R | G | C | Ye | B | × |
| R | R | G | B | Ye | C | R | R | G | B | Ye | C | ○ |
| R | R | C | Ye | G | B | R | R | C | Ye | G | B | × |
| R | R | C | G | Ye | B | R | R | C | G | Ye | B | × |
| R | Ye | R | G | C | B | R | Ye | R | G | C | B | × |
| R | Ye | R | G | B | C | R | Ye | R | G | B | C | × |
| R | Ye | R | C | G | B | R | Ye | R | C | G | B | × |
| R | G | R | Ye | C | B | R | G | R | Ye | C | B | ○ |
| R | G | R | Ye | B | C | R | G | R | Ye | B | C | ○ |
| R | G | R | C | Ye | B | R | G | R | C | Ye | B | ○ |

MULTI-PRIMARY COLOR DISPLAY DEVICE

TECHNICAL FIELD

The present invention relates to a multi-primary color display device.

BACKGROUND ART

Color display devices such as color TVs, color monitors and the like usually represent colors by additive color mixture of RGB colors (i.e., red, green and blue). In general, pixels of a color display panel each include red, green and blue sub-pixels in correspondence with the ROB colors. Such a display is referred to also as a "three primary color display device". To a display panel of the three primary color display device, YCrCb (YCC) signals which can be converted into RGB signals are input, and based on the YCrCb signals, the luminance values of the red, green and blue sub-pixels are changed. Thus, various colors are represented. In the following description, the luminance value (luminance level) of a sub-pixel corresponding to the minimum gray scale level (for example, gray scale level 0) is represented as "0", and the luminance value of a sub-pixel corresponding to the maximum gray scale level (for example, gray scale level 255) is represented as "1". The luminance values of the red, blue and green sub-pixels are each controlled in the range of "0" to "1".

When the luminance values of all the sub-pixels, i.e., the red, green and blue sub-pixels are "0", the color displayed by the pixel is black. By contrast, when the luminance values of all the sub-pixels are "1", the color displayed by the pixel is white. Many of recent TVs allow even a user to adjust the color temperature. In such a TV, the color temperature is adjusted by fine-tuning the luminance value of each sub-pixel. Here, the luminance value of a sub-pixel after the color temperature is adjusted to a desired level is represented as "1".

Hereinafter, with reference to FIG. 65, changes of the luminance values of the sub-pixels in the three primary color display device will be described. Here, the color displayed by the pixel changes from black to white via green. The luminance value of each sub-pixel is changed so as to maximize the chroma at each lightness of the color displayed by the pixel. In the following description, the hue of the color displayed by the green sub-pixel is represented as the "hue (G)" or simply "(G)". The hue (G) is defined by the green sub-pixel.

FIG. 65 shows the relationship between the change of the luminance value of each sub-pixel and the change of the color displayed by the pixel in the three primary color display device. FIG. 65(a) shows the change of the color displayed by the pixel, and FIG. 65(b) shows the changes of the luminance values of the red, green and blue sub-pixels.

In an initial state, the color displayed by the pixel is black, and the luminance values of the red, green and blue sub-pixels are "0". First, the luminance value of the green sub-pixel starts to be increased. As the luminance value of the green sub-pixel increases, the chroma and the lightness of the color displayed by the pixel increase. When the luminance value of the green sub-pixel reaches "1", the chroma of the color displayed by the pixel is maximized at the hue (G). In the following description of this specification, among the colors displayed by the display device, a color having a highest chroma at each hue angle on an a*b* plane of an L*a*b* colorimetric system will be referred to as the "optimal color".

When reaching "1", the luminance value of the green sub-pixel is kept "1". Then, in order to further increase the lightness of the pixel, the luminance values of the other sub-pixels (i.e., the red and blue sub-pixels) start to be increased. In this step, the luminance values of the red and blue sub-pixels increase at an equal rate. By increasing the luminance values of the red and blue sub-pixels at an equal rate, the lightness of the pixel can be increased without changing the hue (G) almost at all. When the luminance values of all the sub-pixels become "1", the color displayed by the pixel is white. In this manner, in the three primary color display device, the color displayed by the pixel is changed from black to white via the optimal color of the hue (G) by first lighting up the green sub-pixel and then lighting up the red and blue sub-pixels.

Now, with reference to FIG. 66, changes of the luminance values of the sub-pixels in the three primary color display device in the case where the color displayed by the pixel changes from black to white via cyan will be described. Cyan is represented by the green and blue sub-pixels. Here, the hue of the color represented by making the luminance values of the green and blue sub-pixels approximately equal to each other is represented as the "hue (C)" or simply "(C)".

FIG. 66 shows the relationship between the change of the luminance value of each sub-pixel and the change of the color displayed by the pixel in the three primary color display device. FIG. 66(a) shows the change of the color displayed by the pixel, and FIG. 66(b) shows the changes of the luminance values of the red, green and blue sub-pixels.

In an initial state, the color displayed by the pixel is black, and the luminance values of all the sub-pixels are "0". First, the luminance values of the green and blue sub-pixels start to be increased to "1" at an equal rate. When the luminance values of the green and blue sub-pixels reach "1", the color displayed by the pixel is the optimal color of the hue (C).

When reaching "1", the luminance values of the green and blue sub-pixels are kept "1". Then, in order to further increase the lightness of the pixel, the luminance value of the red sub-pixel starts to be increased. By increasing the luminance value of the red sub-pixel while keeping the luminance values of the green and blue sub-pixels "1", the lightness of the pixel can be increased without changing the hue (C). When the luminance values of all the sub-pixels become "1", the color displayed by the pixel is white. In this manner, in the three primary color display device, the color displayed by the pixel is changed from black to white via the optimal color of the hue (C) by first lighting up the green and blue pixels and then lighting up the red sub-pixel.

As can be understood from the above, the three primary color display device can represent various colors by changing the luminance value of each sub-pixel. However, the range of colors reproduced by a general three primary color display device is narrower than the range of colors perceivable by the human. Therefore, in order to enlarge the range of colors reproducible by the display device, it is conceived to increase the thickness of the color filter to raise the color purity or to use a high color purity LED. However, such techniques decrease the brightness and thus reduces the light source efficiency.

Recently, as opposed to the three primary color display device as described above, display devices using additive color mixture of four or more primary colors have been proposed (see, for example, Patent Documents 1 through 3). Such a display device which performs display using four or more primary colors is referred to also as the "multi-primary color display device". Patent Documents 1 and 2 disclose a multi-primary color display device including pixels having red, green, blue, yellow, cyan and magenta sub-pixels. Patent Document 3 discloses a multi-primary color display device including another red sub-pixel instead of the magenta sub-pixel.

CITATION LIST

Patent Literature

Patent Document 1: Japanese National Phase PCT Laid-Open Patent Publication No. 2004-529396
Patent Document 2: Japanese National Phase PCT Laid-Open Patent Publication No. 2005-523465
Patent Document 3: Pamphlet of International Publication 2007/032133

SUMMARY OF INVENTION

Technical Problem

In the case where the panel size and the resolution of a multi-primary color display device are approximately the same as those of a three primary color display device, the size of one sub-pixel in the multi-primary color display device is smaller than that of the three primary color display device. Therefore, in the multi-primary color display device, when only one sub-pixel is lit up and the other sub-pixels are not lit up (the gray scale level is almost 0), the ratio of the areas occupied by the non-lit-up sub-pixels is large in the pixel area. As a result, the non-lit-up sub-pixels appear to display black. For example, when the pixel displays green, it may occasionally be misapprehended that black is also displayed in addition to green. This declines the display quality. Such a mis-apprehension can be avoided by simply increasing the number of sub-pixels to be lit up, but such a measure does not allow effective use of the range of reproducible colors.

The present invention, made in light of the above-described problems, has an object of providing a multi-primary color display device for suppressing the decline of the display quality while making effective use of the range of reproducible colors.

Solution to Problem

A multi-primary color display device according to the present invention includes a plurality of pixels, each having a plurality of sub-pixels. The plurality of sub-pixels include a first sub-pixel for displaying a first color having a first hue, a second sub-pixel for displaying a second color having a second hue, a third sub-pixel for displaying a third color having a third hue, and a fourth sub-pixel for displaying a fourth color having a fourth hue; the second hue and the third hue are adjacent to the first hue on both sides thereof, among the hues corresponding to the plurality of sub-pixels on an a*b* plane of an L*a*b* colorimetric system; and when a color displayed by each pixel changes from black to an optimal color of the first hue or an optimal color of a specific hue which is closest to the first hue among the hues corresponding to the plurality of sub-pixels, luminance values of the plurality of sub-pixels are set such that the luminance value of the first sub-pixel starts to be increased and also the luminance values of the second and third sub-pixels start to be increased at a rate of increase lower than the rate of increase of the first sub-pixel.

In one embodiment, the plurality of sub-pixels are arranged in one direction.

In one embodiment, the plurality of pixels are arranged in a matrix of a plurality of rows and a plurality of columns; and in each of the plurality of pixels, the plurality of sub-pixels are arranged in a row direction.

In one embodiment, an order in which the plurality of sub-pixels are arranged in the row direction in one of the plurality of pixels is the same as an order in which the plurality of sub-pixels are arranged in the row direction in another of the plurality of pixels which is adjacent to the one pixel in the row direction.

In one embodiment, when each pixel displays the optimal color of the first hue or the optimal color of the specific hue, the luminance values of the second and third sub-pixels are higher than the luminance value corresponding to a minimum gray scale level and are lower than the luminance value corresponding to a maximum gray scale level.

In one embodiment, the plurality of sub-pixels further include a fifth sub-pixel for displaying a fifth color having a fifth hue and a sixth sub-pixel for displaying a sixth color having a sixth hue.

In one embodiment, the hue of at least one of the plurality of sub-pixels is approximately the same as the hue of at least one of the other sub-pixels among the plurality of sub-pixels.

In one embodiment, the color displayed by at least one of the plurality of sub-pixels is approximately the same as the color displayed by either one of the other sub-pixels among the plurality of sub-pixels.

In one embodiment, at least one of the fourth sub-pixel, the fifth sub-pixel and the sixth sub-pixel is provided between two sub-pixels among the first sub-pixel, the second sub-pixel and the third sub-pixel.

In one embodiment, the plurality of sub-pixels include a first red sub-pixel, a second red sub-pixel, a green sub-pixel, a blue sub-pixel, a yellow sub-pixel and a cyan sub-pixel as the first sub-pixel, the second sub-pixel, the third sub-pixel, the fourth sub-pixel, the firth sub-pixel and the sixth sub-pixel.

In one embodiment, at least one of the first red sub-pixel, the second red sub-pixel and the blue sub-pixel is provided between two sub-pixels among the green sub-pixel, the cyan sub-pixel and the yellow sub-pixel.

In one embodiment, at least one of the first red sub-pixel, the second red sub-pixel and the yellow sub-pixel is provided between two sub-pixels among the cyan sub-pixel, the green sub-pixel and the blue sub-pixel.

In one embodiment, at least one of the green sub-pixel, the yellow sub-pixel and the cyan sub-pixel is provided between two sub-pixels among the first red sub-pixel, the second red sub-pixel and the blue sub-pixel.

Advantageous Effects of Invention

The present invention can provide a multi-primary color display device for suppressing the decline of the display quality while making effective use of the range of reproducible colors.

BRIEF DESCRIPTION OF DRAWINGS

FIG. 49 is a schematic view for explaining a preferable arrangement pattern of the sub-pixels in the multi-primary color display device in Embodiment 2.

DESCRIPTION OF EMBODIMENTS

Hereinafter, embodiments of a multi-primary color display device according to the present invention will be described with reference to the drawings. The present invention is not limited to any of the following embodiments.

Embodiment 1

Hereinafter, a Multi-Primary Color Display Device in Embodiment 1 according to the present invention will be described.

Figure 1:
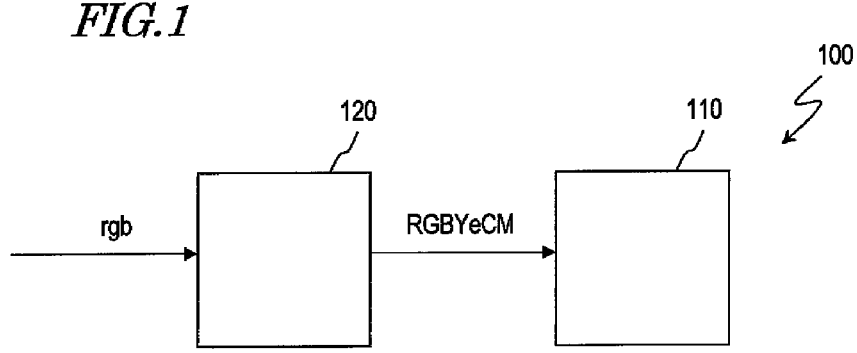
FIG. 1 is a schematic view of a multi-primary color display device in Embodiment 1 according to the present invention.

FIG. 1 shows a schematic view of a multi-primary color display device 100 in this embodiment. The multi-primary color display device 100 includes a multi-primary color display panel 110 including a plurality of pixels arranged in a matrix of a plurality of rows and a plurality of columns, and a multi-primary color signal generation section 120 for generating a multi-primary color signal for the multi-primary color display panel 110. In the multi-primary color display panel 110, the pixels each include at least four sub-pixels representing different colors. Here, the multi-primary color display panel 110 is a liquid crystal panel, and the multi-primary color display device 100 is a liquid crystal display device. In the following description of this specification, the multi-primary color display device may occasionally be referred to simply as the "display device".

Figure 2:
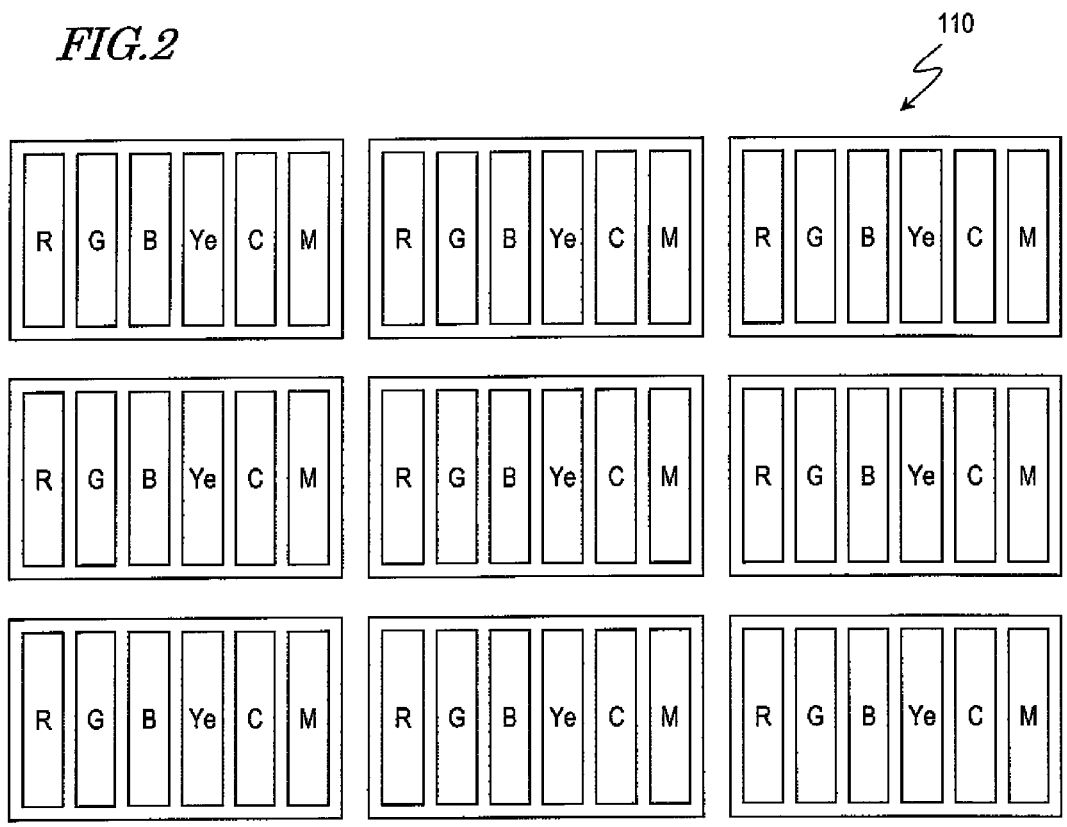
FIG. 2 is a schematic view showing an arrangement of sub-pixels included in pixels in the multi-primary color display device in Embodiment 1.

FIG. 2 shows an arrangement of the pixels and the sub-pixels included in the pixels which are provided in the multi-primary color display panel 110. FIG. 2 shows pixels in three rows and three columns as an example. Each pixel includes six types of sub-pixels, namely, a red sub-pixel R, a green sub-pixel G, a blue sub-pixel B, a yellow sub-pixel Ye, a cyan sub-pixel C and a magenta sub-pixel M. In general, red, green and blue are referred to as the "three primary colors of light", and yellow, cyan and magenta are referred to as the "three primary colors of ink". The multi-primary color display panel 110 includes six sub-pixels corresponding to the three primary colors of light and the three primary colors of ink. The luminance value of each sub-pixel is independently controlled. In the case where the display device 100 is a liquid crystal display device, the arrangement in a color filter of the liquid crystal panel (not shown) corresponds to the arrangement shown in FIG. 2.

Here, the six sub-pixels belonging to one pixel are arranged in the row direction. Regarding the sub-pixels belonging to two pixels adjacent to each other in the row direction, the order in which the red sub-pixel R, the green sub-pixel G, the blue sub-pixel B, the yellow sub-pixel Ye, the cyan sub-pixel C and the magenta sub-pixel M are arranged in the row direction in one pixel is the same as the order in the other pixel. The sub-pixels are periodically arranged.

A multi-primary color signal generated by the multi-primary color signal generation section 120 shown in FIG. 1 represents gray scale levels of the sub-pixels in the multi-primary color display panel 110. In the following description of this specification, the gray scale levels of the red sub-pixel R, the green sub-pixel G, the blue sub-pixel B, the yellow sub-pixel Ye, the cyan sub-pixel C and the magenta sub-pixel M will be represented also as R, G, B, Ye, C and M, respectively. In FIG. 1, the gray scale levels R, G, B, Ye, C and M are collectively represented as "RGBYeCM". Each sub-pixel in the multi-primary color display panel 110 represents the luminance value corresponding to the respective gray scale level R, G, B, Ye, C or M of the multi-primary color signal.

In the following description, the luminance level of a sub-pixel corresponding to the minimum gray scale level (for example, gray scale level 0) will be represented as "0", and the luminance level of a sub-pixel corresponding to the maximum gray scale level (for example, gray scale level 255) will be represented as "1", for the sake of convenience. Even when the luminance levels are equal, the actual luminance values of the red, green, blue, yellow, cyan and magenta sub-pixels are different, and the luminance level represents the ratio of the luminance value of each sub-pixel with respect to the maximum luminance value. In the following description, the luminance value of each sub-pixel may occasionally be represented by the luminance level.

For example, when the color of the pixel is black, the gray scale levels R, G, B, Ye, C and M are all the minimum gray scale level (for example, gray scale level 0). In this case, the luminance levels of the sub-pixels, i.e., $Y_R$, $Y_G$, $Y_B$, $Y_{Ye}$, $Y_C$ and $Y_M$ are represented as "0". By contrast, when the color of the pixel is white, the gray scale levels R, G, B, Ye, C and M are all the maximum gray scale level (for example, gray scale level 255). In this case, the luminance levels of the sub-pixels, i.e., $Y_R$, $Y_G$, $Y_B$, $Y_{Ye}$, $Y_M$ and $Y_M$ are represented as "1". Many of recent TVs allow even a user to adjust the color temperature. In such a TV, the color temperature is adjusted by fine-tuning the luminance value of each sub-pixel. Here, the luminance level after the color temperature is adjusted to a desired level is represented as "1".

The multi-primary color signal generation section 120 generates a multi-primary color signal based on, for example, an input signal for a three primary color display device. The input signal for the three primary color display device represents the gray scale levels of the red, green and blue sub-pixels. Alternatively, the values represented by this input signal can be converted into the gray scale levels of the red, green and blue sub-pixels. In general, an input signal is represented three-dimensionally. In FIG. 1, the gray scale levels of the input signal, i.e., r, g and b are collectively represented as "rgb". In the case where the input signal is conformed to the BT.709 Standard, the gray scale levels r, g and b represented by the input signal are each in the range from the minimum gray scale level (for example, gray scale level 0) to the maximum gray scale level (for example, gray scale level 255). The luminance values of the red, green and blue sub-pixels are each in the range of "0" to "1".

The multi-primary color signal generation section 120 converts the gray scale levels rgb of the input signal into the gray scale levels RGBYeCM. In this specification, such conversion is referred to as the "multi-primary color conversion". For example, when the color of the pixel specified by the input signal is black, the gray scale levels r, g and b are all the minimum gray scale level (for example, gray scale level 0). The gray scale levels R, G, B, Ye, C and M obtained from these levels by multi-primary color conversion are all the minimum gray scale level (for example, gray scale level 0). The luminance levels $Y_R$, $Y_G$, $Y_B$, $Y_{Ye}$, $Y_C$ and $Y_M$ are all "0". When the color of the pixel specified by the input signal is white, the gray scale levels r, g and b are all the maximum gray scale level (for example, gray scale level 255). The gray scale levels R, G, B, Ye, C and M obtained from these levels by multi-primary color conversion are all the maximum gray scale level (for example, gray scale level 255). The luminance levels $Y_R$, $Y_G$, $Y_B$, $Y_{Ye}$, $Y_C$ and $Y_M$ are all "1". Basically, the color specified by the gray scale levels RGBYeCM is the same as the color specified by the gray scale levels rgb, but may be different when necessary. The input signal and the multi-primary color signal may represent the luminance levels of the sub-pixels.

Figure 3:
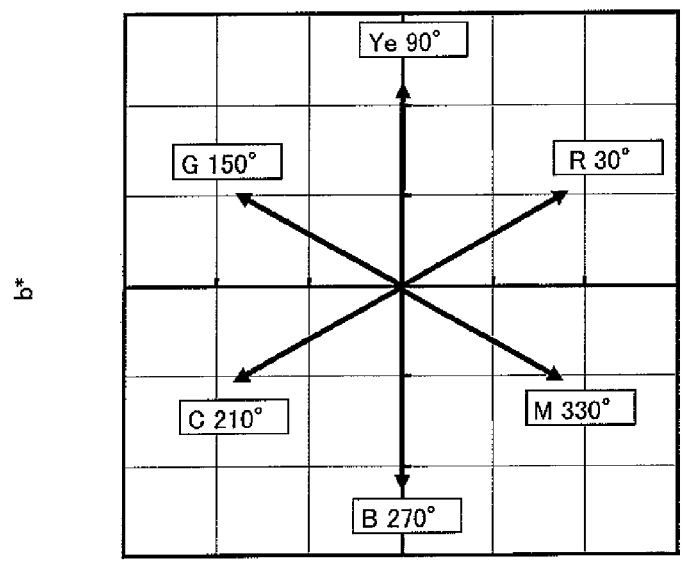
FIG. 3 is a schematic view showing an a*b* plane of an L*a*b* colorimetric system in which a* and b* are plotted regarding the color of each of six sub-pixels in the multi-primary color display device in Embodiment 1.

FIG. 3 is a schematic view showing an a*b* plane of an L*a*b* colorimetric system in which a* and b* are plotted regarding the color of each of the six sub-pixels in the display device 100 in this embodiment. FIG. 3 shows hue angles of the colors each displayed only by each one of the sub-pixels. The hue angle is an angle from 0°, which corresponds to the axis of the a* direction (red direction), in the counterclockwise direction. Here, ideally, R is 30°, Ye is 90°, G is 150°, C is 210°, B is 270°, and M is 330°.

Now, advantages of the display device 100 in this embodiment will be described as compared with display devices in Comparative examples 1 through 3. The display devices in Comparative examples 1 through 3 each include a multi-primary color display panel substantially the same as that of the multi-primary color display panel 110 of the display device 100 in this embodiment, but are different in the manner in which the luminance values of the sub-pixels change. Here, the color displayed by the pixel changes from black to white via the optimal color of the hue (G). In the following description of this specification, unless otherwise specified, the hues of the colors defined by the red, yellow, green, cyan, blue and magenta sub-pixels will be represented as (G), (Ye), (G), (C), (B) and (M), respectively. In the following description, in the case where the color displayed by the pixel changes from black to white via the optimal color of a certain hue, when the luminance value of the sub-pixel corresponding to the hue reaches "1", the color represented by the pixel is the optimal color.

Figure 65:
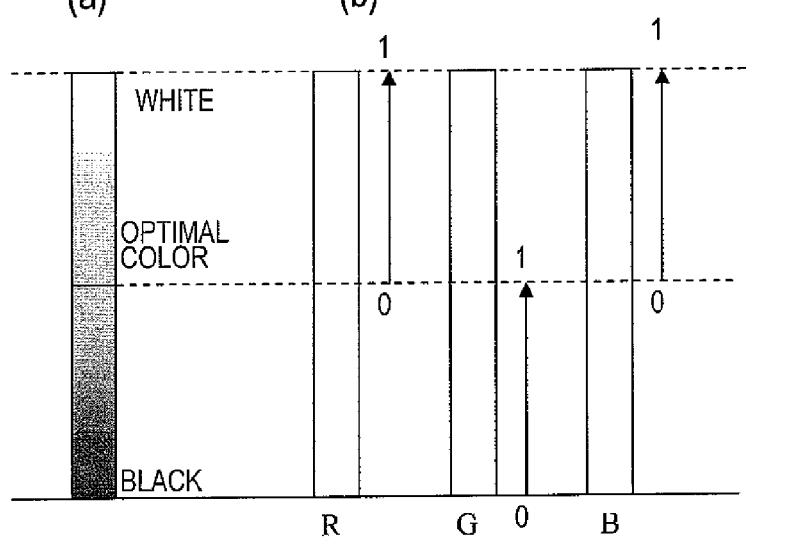
FIG. 65 is a schematic view showing the relationship between the change of the luminance value of each sub-pixel and the change of the color displayed by the pixel in the three primary color display device; (a) shows the change of the color displayed by the pixel, and (b) shows the changes of the luminance values of the sub-pixels.

First, the display device in Comparative example 1 will be described. As described above with reference to FIG. 65, in a three primary color display device, after the luminance value of the green sub-pixel reaches "1", the luminance values of the other sub-pixels (namely, the red and blue sub-pixels) start to be increased at the same time. In the display device in Comparative example 1, after the luminance value of the green sub-pixel reaches "1", the luminance values of the other sub-pixels (namely, the yellow, red, blue, cyan and magenta sub-pixels) start to be increased at the same time like in the three primary color display device.

Figure 4:
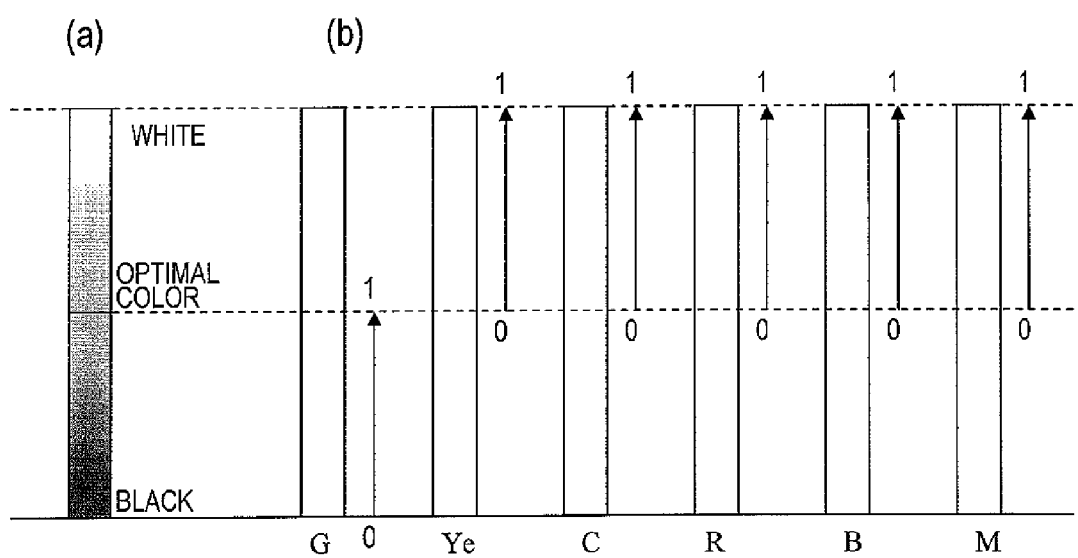
FIG. 4 is a schematic view for explaining the relationship between the change of the luminance value of each sub-pixel and the change of the color displayed by the pixel in a display device in Comparative example 1; (a) shows the change of the color displayed by the pixel, and (b) shows the changes of the luminance values of green, yellow, cyan, red, blue and magenta sub-pixels.

FIG. 4 is a schematic view for explaining the relationship between the change of the luminance value of each sub-pixel and the change of the color displayed by the pixel in the display device in Comparative example 1. FIG. 4(a) shows the change of the color displayed by the pixel, and FIG. 4(b) shows the changes of the luminance values of the green, yellow, cyan, red, blue and magenta sub-pixels. FIG. 4(b) shows the luminance levels of the green, yellow, cyan, red, blue and magenta sub-pixels, and the actual luminance values of the sub-pixels at "1" are different from each other.

In an initial state, the luminance values of all the sub-pixels, namely, the green, yellow, cyan, red, blue and magenta sub-pixels are "0". The color displayed by the pixel is black. When the luminance values of all the sub-pixels including the green sub-pixel are "0", the color displayed by the pixel is black, and the chroma is zero. This corresponds to the point having a chroma of zero (origin) of the a*b* plane of the L*a*b* colorimetric system shown in FIG. 3.

First, the luminance value of the green sub-pixel starts to be increased. As the luminance value of the green sub-pixel increases, the chroma and the lightness of the color displayed by the pixel increase. As the luminance value of the green sub-pixel increases, the chromaticities a* and b* of the color displayed by the pixel change from the origin in FIG. 3 along an arrow directed toward G. When the luminance value of the green sub-pixel reaches "1", the chromaticities a* and b* are farthest from the origin in the direction of the arrow. In the case where the multi-primary color display panel 110 (FIG. 1) is a liquid crystal panel, the values of a* and b* when the luminance value of each sub-pixel is "1" are determined by the color filter (not shown) and the light source (not shown).

In the display device in Comparative example 1, after the luminance value of the green sub-pixel reaches "1", the luminance values of the other sub-pixels (namely, the yellow, cyan, red, blue and magenta sub-pixels) start to be increased at the same time as shown in FIG. 4(b). The luminance values of the yellow, cyan, red, blue and magenta sub-pixels increase at an equal rate. In this case also, by the increase of the luminance values of the sub-pixels, the lightness of the color displayed by the pixel increases. When the luminance values of all the sub-pixels become "1", the color displayed by the pixel is white.

Figure 5:
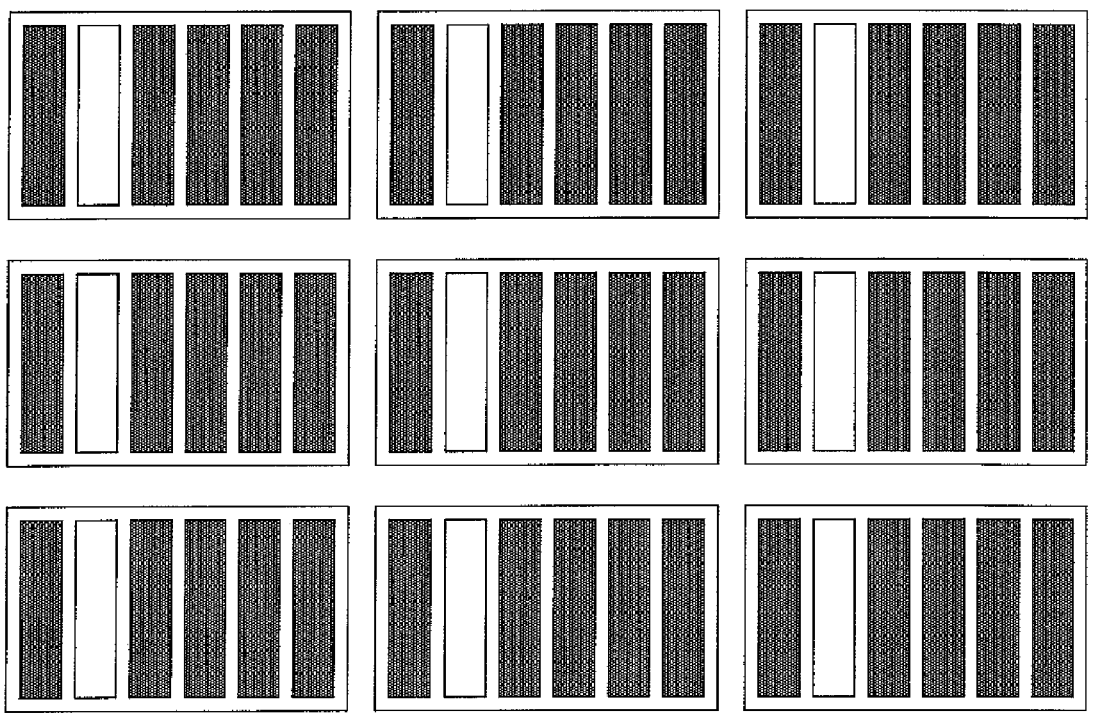
FIG. 5 is a schematic view showing a lit-up/non-lit-up state of the sub-pixels in the display device in Comparative example 1.

In such a display device in Comparative example 1, while the color displayed by the pixel changes from black to the optimal color of the hue (G), only the green sub-pixel is lit up and the other sub-pixels are not lit up. In this case, as shown in FIG. 5, the area size occupied by the non-lit-up sub-pixels with respect to one pixel is large. In the case where the resolution of the display device is sufficiently high, there is almost no influence of this state. However, when the resolution is 100 ppi (pixels per inch) or lower, the non-lit-up sub-pixels may occasionally appear to display black.

Although each pixel displays green, it is misapprehended that black is also displayed in addition to green. Especially in a structure in which the sub-pixels belonging to one pixel are arranged in one row, in the case where the pixels in one column each display the optimal color of the hue (G), thick black lines appear to be displayed in addition to thin green lines. This is misapprehended as a display of green stripes.

Now, a display device in Comparative example 2 will be described. In the display device in Comparative example 2, after the color displayed by the pixel becomes the optimal color of the hue (G), the luminance values of the yellow and cyan sub-pixels start to be increased. The display device in Comparative example 2 corresponds to the display device disclosed in Patent Document 3.

Figure 6:
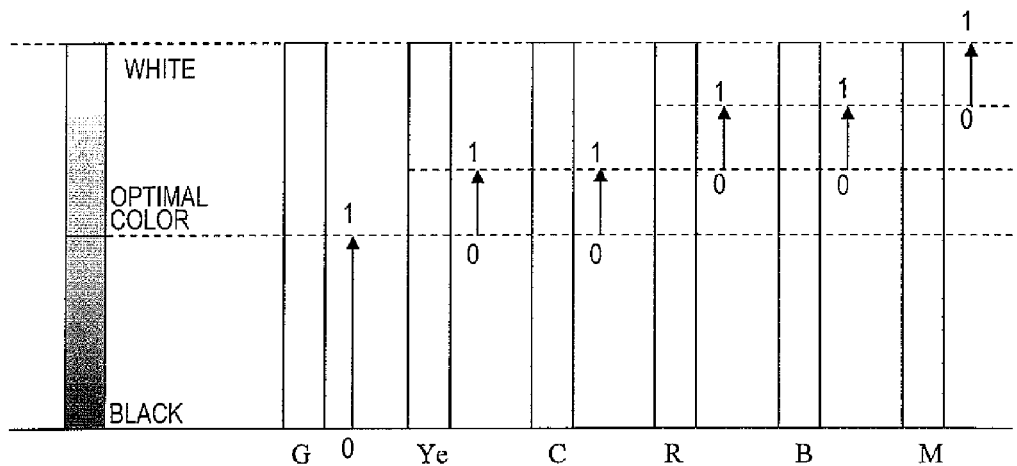
FIG. 6 is a schematic view for explaining the relationship between the change of the luminance value of each sub-pixel and the change of the color displayed by the pixel in a display device in Comparative example 2; (a) shows the change of the color displayed by the pixel, and (b) shows the changes of the luminance values of the green, yellow, cyan, red, blue and magenta sub-pixels.

FIG. 6 is a schematic view for explaining the relationship between the change of the luminance value of each sub-pixel and the change of the color displayed by the pixel in the display device in Comparative example 2. FIG. 6(a) shows the change of the color displayed by the pixel, and FIG. 6(b) shows the changes of the luminance values of the green, yellow, cyan, red, blue and magenta sub-pixels.

In the display device in Comparative example 2 also, in an initial state, the luminance values of all the sub-pixels, namely, the green, yellow, cyan, red, blue and magenta sub-pixels are "0". The color displayed by the pixel is black. First, the luminance value of the green sub-pixel starts to be increased. As the luminance value of the green sub-pixel increases, the chroma and the lightness of the color displayed by the pixel increase.

When increasing and reaching "1", the luminance value of the green sub-pixel is kept "1". At this point, the color displayed by the pixel is the optimal color of the hue (G). Next, the luminance values of the yellow and cyan sub-pixels start to be increased. As the luminance values of the yellow and cyan sub-pixels increase, the lightness of the color displayed by the pixel increases. The luminance values of the yellow and cyan sub-pixels are increased so as not to change the hue (G). Here, the rate of increase of the luminance value of the yellow sub-pixel is equal to that of the cyan sub-pixel.

When increasing and reaching "1", the luminance values of the yellow and cyan sub-pixels are kept "1". Next, the luminance values of the red and blue sub-pixels start to be increased. The rates of increase of the luminance values of the red and blue sub-pixels are set so as not to change the hue (G). Here again, the rate of increase of the luminance value of the red sub-pixel is equal to that of the blue sub-pixel.

When increasing and reaching "1", the luminance values of the red and blue sub-pixels are kept "1". Next, the luminance value of the magenta sub-pixel starts to be increased. When the luminance value of the magenta sub-pixel increases and reaches "1", the color displayed by the pixel is white.

The display device in Comparative example 2 utilizes the wide range of reproducible colors more effectively than the display device in Comparative example 1. A conceivable reason for this is as follows. After the luminance value of the green sub-pixel reaches "1", in order to further increase the lightness of the pixel, the luminance values of the sub-pixels corresponding to the other hues need to be increased. Whichever sub-pixel may be increased in the luminance value, the chroma of the color displayed by the pixel is decreased. When the luminance value of the sub-pixel, among the sub-pixels, corresponding to a hue far from the hue (G) is increased, the chroma of green is significantly decreased. By contrast, when the luminance value of the sub-pixel corresponding to a hue close to the hue (G) is increased, the chroma of green is not much decreased. Therefore, when the luminance value of the sub-pixel corresponding to a hue close to the hue (G) starts to be increased earlier than the sub-pixel corresponding to a hue far from the hue (G), the decrease of the chroma can be suppressed and the lightness can be increased. As a result, at a lightness higher than that of the optimal color, the chroma is relatively low in the display device in Comparative example 1, whereas the chroma is relatively high in the display device in Comparative example 2. Therefore, the display device in Comparative example 2 can represent a color having a high chroma, which cannot be represented by the display device in Comparative example 1.

Figure 7:
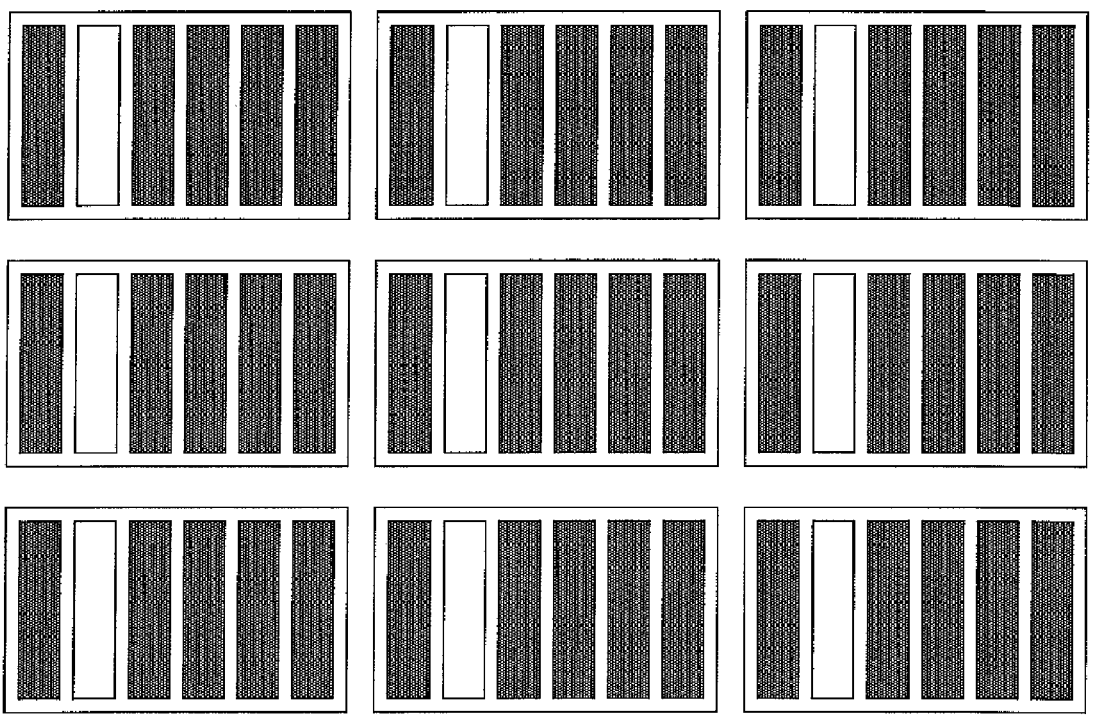
FIG. 7 is a schematic view showing a lit-up/non-lit-up state of the sub-pixels in the display device in Comparative example 2.

However, in the display device in Comparative example 2 like in the display device in Comparative example 1, while the color displayed by the pixel changes from black to the optimal color of the hue (G), only the green sub-pixel is lit up and the other sub-pixels are not lit up. In this case, as shown in FIG. 7, the area size occupied by the non-lit-up sub-pixels with respect to one pixel is large. In the case where the resolution of the display device is sufficiently high, there is almost no influence of this state. However, when the resolution is 100 ppi (pixels per inch) or lower, the non-lit-up sub-pixels may occasionally appear to display black. Although each pixel displays green, it is misapprehended that black is also displayed in addition to green. In the three primary color display device described above with reference to FIG. 65, while the color displayed by the pixel changes from black to the optimal color of the hue (G), the green sub-pixel, which is lit up, occupies about ⅓ of the pixel size. By contrast, in the display devices in Comparative examples 1 and 2, the green sub-pixel, which is lit up, occupies only about ⅙ of the pixel size. The size of the sub-pixel lit up in the display devices in Comparative examples 1 and 2 is half of the size in the three primary color display device. In display devices in Comparative examples 1 and 2, the misapprehension is likely to occur. Especially in a structure in which the sub-pixels belonging to one pixel are arranged in one row, in the case where the pixels in one column each display the optimal color of the hue (G), thick black lines appear to be displayed in addition to thin green lines.

By contrast, in Comparative example 3, while the color displayed by the pixel changes from black to the optimal color of the hue (G), the luminance values of the green, yellow and cyan sub-pixels are increased. Hereinafter, a display device in Comparative example 3 will be described with reference to FIG. 8.

Figure 8:
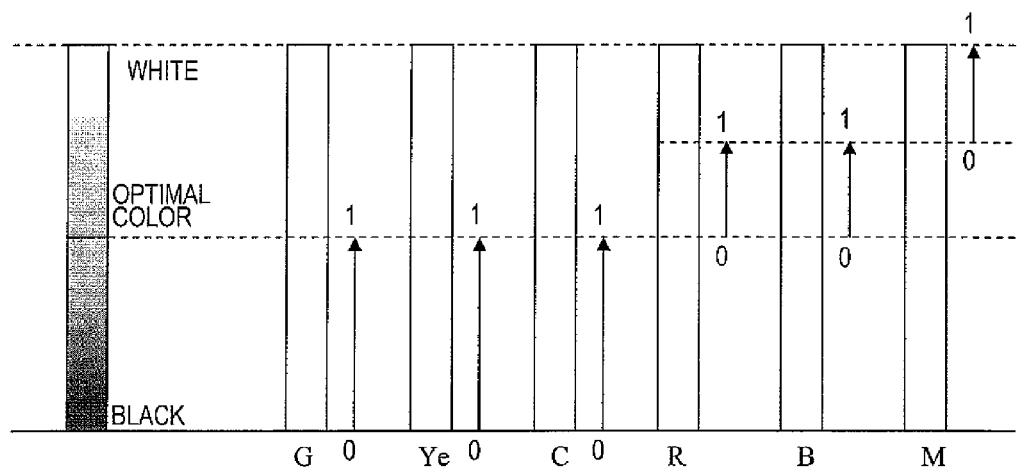
FIG. 8 is a schematic view for explaining the relationship between the change of the luminance value of each sub-pixel and the change of the color displayed by the pixel in a display device in Comparative example 3; (a) shows the change of the color displayed by the pixel, and (b) shows the changes of the luminance values of the green, yellow, cyan, red, blue and magenta sub-pixels.

FIG. 8 is a schematic view for explaining the relationship between the change of the luminance value of each sub-pixel and the change of the color displayed by the pixel in the display device in Comparative example 3. FIG. 8(a) shows the change of the color displayed by the pixel, and FIG. 8(b) shows the changes of the luminance values of the green, yellow, cyan, red, blue and magenta sub-pixels.

In the display device in Comparative example 3 also, in an initial state, the luminance values of all the sub-pixels, namely, the green, yellow, cyan, red, blue and magenta sub-pixels are "0". The color displayed by the pixel is black. First, the luminance value of the green sub-pixel starts to be increased. Together with the luminance value of the green sub-pixel, the luminance values of the yellow and cyan sub-pixels are increased. In the display device in Comparative example 3, the luminance values of the green, yellow and cyan sub-pixels increase at an equal rate. The luminance values of the green, yellow and cyan sub-pixels are set so as to not change the hue (G) as increasing. As the luminance values of the green, yellow and cyan sub-pixels increase, the chroma and the lightness of the color displayed by the pixel increase.

When increasing and reaching "1", the luminance values of the green, yellow and cyan sub-pixels are kept "1". At this point, the color displayed by the pixel is the optimal color of the hue (G). Next, the luminance values of the red and blue sub-pixels start to be increased. The rates of increase of the luminance values of the red and blue sub-pixels are set so as not to change the hue (G). Here again, the rate of increase of the luminance value of the red sub-pixel is equal to that of the blue sub-pixel.

When increasing and reaching "1", the luminance values of the red and blue sub-pixels are kept "1". Next, the luminance value of the magenta sub-pixel starts to be increased. When the luminance value of the magenta sub-pixel increases and reaches "1", the color displayed by the pixel is white.

As can be understood from the comparison with Comparative examples 1 and 2 described above, in the display device in Comparative example 3, while the color displayed by the pixel changes from black to the optimal color of the hue (G), the green, yellow and cyan sub-pixels are lit up. This suppresses the misapprehension. However, the display device in Comparative example 3 does not utilize the wide range of reproducible colors effectively. When compared at substantially the same luminance level (gray scale level), the chroma of green displayed by the yellow and cyan sub-pixels is lower than the chroma of green displayed by the green sub-pixel. The display device in Comparative example 3 cannot represent a color having a high chroma especially at a low lightness.

In the multi-primary color display device 100 in this embodiment, like in the display device in Comparative example 3, while the color displayed by the pixel changes from black to the optimal color of the hue (G), the luminance value of the green sub-pixel is increased, and also the luminance values of the yellow and cyan sub-pixels corresponding to two hues adjacent to the hue (G) (namely, (Ye) and (C)) are increased at a rate lower than that of the green sub-pixel.

Now, with reference to FIG. 3 again, the relationship between the hue (G) and the hues (R), (B), (Ye), (C) and (M) will be described. The closeness and fairness between the hues of the sub-pixels are represented by the difference between the hue angles of the sub-pixels. When the difference between the hue angle of one sub-pixel and the hue angle of another sub-pixel is small, the hues of the two sub-pixels are close to each other. By contrast, when the difference between the hue angle of one sub-pixel and the hue angle of another sub-pixel is large, the hues of the two sub-pixels are far from each other.

With respect to the hue (G) as the reference, the closeness of the other hues will be discussed. The hues closest to the hue (G) are (Ye) and (C) (hue angle difference: 60°). The next closest hues are (R) and (B) (hue angle difference: 120°). The farthest hue is (M) (hue angle difference: 180°).

(Ye) is in the clockwise direction with respect to (G). (C) is in the counterclockwise direction with respect to (G). Namely, on the a*b* plane of the L*a*b* colorimetric system, (C) is on the opposite side to (Ye) with respect to (G). On the a*b* plane of the L*a*b* colorimetric system, (B) is on the same side as (C) with respect to (G), and (R) is on the same side as (Ye) with respect to (G).

On the a*b* plane of the L*a*b* colorimetric system, (Ye) is closest to (G) in the clockwise direction, and (C) is closest to (G) in the counterclockwise direction. In this specification, (Ye) and (C) are described as being "adjacent to (G) on both sides" on the a*b* plane of the L*a*b* colorimetric system. In the above, the closeness of the hues (R), (Ye), (C), (B) and (M) with respect to the hue (G) has been discussed with reference to the a*b* plane of the L*a*b* colorimetric system. Alternatively, the hues (R), (Ye), (G), (C), (B) and (M) may be put on a hue circle to discuss the closeness of the hues (R), (Ye), (C), (B) and (M) with respect to the hue (G).

Hereinafter, with reference to FIG. 9, changes of the luminance values of the sub-pixels in the display device 100 in the case where the color displayed by the pixel changes from black to white via the optimal color of the hue (G) will be described. FIG. 9(a) shows the change of the color displayed by the pixel, and FIG. 9(b) shows the changes of the luminance values of the green, yellow, cyan, red, blue and magenta sub-pixels.

In an initial state, the luminance values of all the sub-pixels, namely, the green, yellow, cyan, red, blue and magenta sub-pixels are "0". The color displayed by the pixel is black. First, the luminance value of the green sub-pixel starts to be increased. In the display device 100 in this embodiment, like in the display device in Comparative example 3, in addition to the luminance value of the green sub-pixel, the luminance values of the yellow and cyan sub-pixels are also increased. On the a*b* plane of the L*a*b* colorimetric system shown in FIG. 3, the yellow sub-pixel corresponds to (Ye) closest to the hue (G) in the clockwise direction, and the cyan sub-pixel corresponds to (C) closest to the hue (G) in the clockwise direction.

In the display device 100 in this embodiment, the rates of increase of the luminance values of the yellow and cyan sub-pixels are lower than that of the green sub-pixel. In this specification, the rate of increase of the luminance value is referred to also as the "increasing rate" of the luminance value. The increasing rates of the luminance values of the yellow and cyan sub-pixels are set so as not to change the hue (G) of the color displayed by the pixel. In this specification, in the case where the luminance value of each sub-pixel is changed so as not to change the hue of the color displayed by the pixel, the hue angle of the color displayed by the pixel changes within ±20°, preferably ±10°, with respect to the target hue angle. Here, the increasing rate of the luminance value of the yellow sub-pixel is equal to that of the cyan sub-pixel.

Ideally, the luminance values of the yellow and cyan sub-pixels start to be increased at the same time as the luminance value of the green sub-pixel. However, as described above, the increasing rate of the luminance value of the green sub-pixel is higher than those of the yellow and cyan sub-pixels. Therefore, in actuality, as a result of quantization or the like or the like of the numerical values in a circuit embodying this control, the luminance value of the green sub-pixel may first start to be increased, and immediately after that, the luminance values of the yellow and cyan sub-pixels may start to be increased.

As the luminance values of the green, yellow and cyan sub-pixels increase, the chroma and the lightness of the color displayed by the pixel increase. When reaching "1", the luminance value of the green sub-pixel is kept "1". At this point, the color displayed by the pixel is the optimal color of the hue (G). The luminance values of the green, yellow, cyan, red, blue and magenta sub-pixels are respectively "1". "0.31", "0.31", "0", "0" and "0".

Next, in order to further increase the lightness of the pixel, the luminance values of the yellow and cyan sub-pixels are kept increasing. The increasing rate of the luminance value of the yellow sub-pixel is equal to that of the cyan sub-pixel. Therefore, the luminance value of the yellow sub-pixel reaches "1" at the same time as the luminance value of the cyan sub-pixel. When reaching "1", the luminance values of the yellow and cyan sub-pixels are kept "1".

Next, the luminance value of the red sub-pixel corresponding to (R), which is in the clockwise direction with respect to the hue (G) like the hue (Ye) and is closest to the hue (G) next to the hue (Ye) on the a*b* plane of the L*a*b* colorimetric system, and the luminance value of the blue sub-pixel corresponding to (B), which is in the counterclockwise direction with respect to the hue (G) like the hue (C) and is closest to the hue (G) next to the hue (C) on the a*b* plane of the L*a*b* colorimetric system, start to be increased. The increasing rates of the luminance values of the red and blue sub-pixels are set so as not to change the hue (G). Here again, the increasing rate of the luminance value of the red sub-pixel is equal to that of the blue sub-pixel.

The luminance values of the red and blue sub-pixels reach "1" approximately at the same time. Next, the luminance value of the magenta sub-pixel corresponding to the hue (M), which substantially has a complementary color relationship to the hue (G) on the a*b* plane of the L*a*b* colorimetric system, start to be increased. When the luminance value of the magenta sub-pixel increases and reaches "1", the color displayed by the pixel is white. At this point, the luminance values of the green, yellow, cyan, red, blue and magenta sub-pixels are respectively, "1", "1", "1", "1", "1" and "1".

Now, the display devices in Comparative examples 1 through 3 and the display device 100 in this embodiment will be compared. In the display devices in Comparative examples 1 and 2, while the color displayed by the pixel changes from black to the optimal color of the hue (G), only the luminance value of the green sub-pixel is increased. During this time, as shown in FIG. 5 and FIG. 7, only the green sub-pixel is lit up and the other sub-pixels are not lit up. Therefore, in the display devices in Comparative examples 1 and 2, the area size occupied by the non-lit-up sub-pixels with respect to one pixel is large. As a result, the non-lit-up sub-pixels appear to display black. It is misapprehended that black is also displayed in addition to green. Thus, the display quality is declined.

Figure 10:
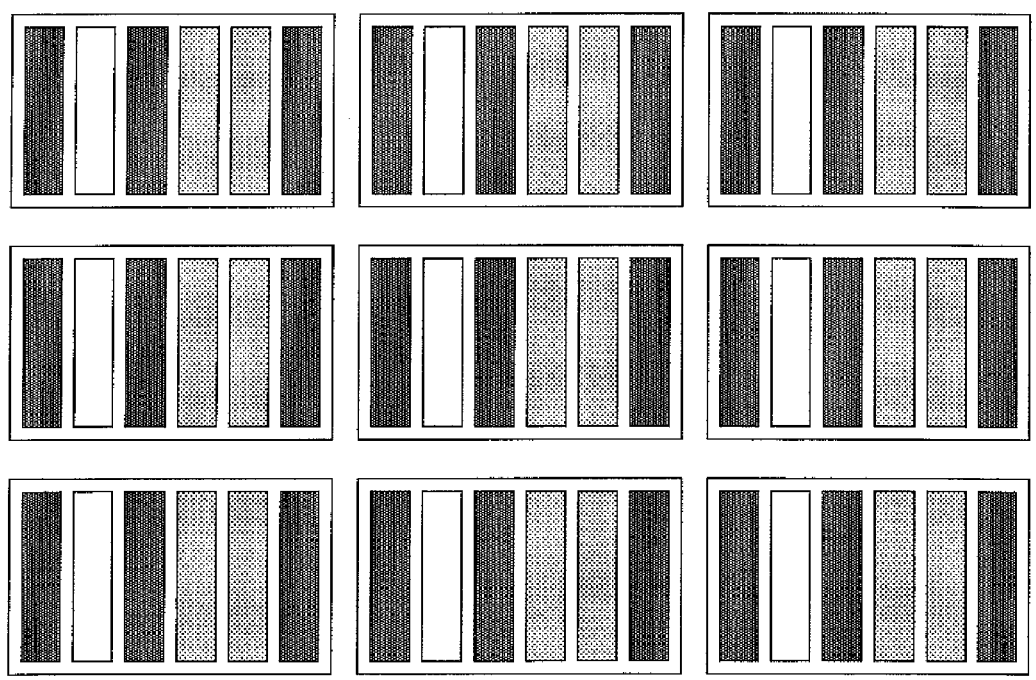
FIG. 10 is a schematic view showing a lit-up/non-lit-up state of the sub-pixels in the multi-primary color display device in Example 1.

In the display device 100 in this embodiment, while the color displayed by the pixel changes from black to the optimal color of the hue (G), the luminance value of the green sub-pixel and also the luminance values of the yellow and cyan sub-pixels are increased. Therefore, during this time, as shown in FIG. 10, the green sub-pixel is lit up and also the yellow and cyan sub-pixels are lit up. As can be seen, in the display device 100 in this embodiment, the area size occupied by the non-lit-up sub-pixels with respect to one pixel is small, and so the misapprehension is suppressed.

In the display device in Comparative example 3, the luminance values of three sub-pixels are increased at an equal increasing rate, and so the range of reproducible colors is not effectively utilized. For displaying the optimal color of the hue (G), the gray scale levels of the sub-pixels in the display device in Comparative example 3 are (R, G, B, Ye, C, M)=(0, 255, 0, 255, 255, 0). By contrast, the gray scale levels of the sub-pixels in the display device 100 in this embodiment are, for example, (R, G, B, Ye, C, M)=(0, 255, 0, 150, 150, 0). In this case, the chroma of the optimal color in the display device 100 in this embodiment is higher than that in the display device in Comparative example 3. The reason for this is that as the luminance values of the other sub-pixels are more increased with respect to the luminance value of the green sub-pixel having the maximum gray scale level (maximum luminance level), the chroma of the pixel is decreased. As can be seen, the display device 100 utilizes the range of reproducible colors more effectively than the display device in Comparative example 3. Specifically, at a lightness higher than that of the optimal color displayable by the display device 100, the upper limit of the chrome displayable by the display device 100 is equal to that displayable by the display device in Comparative example 3. However, at a lightness lower than that of the optimal color displayable by the display device 100, the upper limit of the chroma displayable by the display device 100 is higher than that displayable by the display device in Comparative example 3.

In order to light up the sub-pixels other than the green sub-pixel without changing the hue (G), while the color displayed by the pixel changes from black to the optimal color of the hue (G), the red and blue sub-pixels, for example, may be lit up in addition to the green sub-pixel. Alternatively, the red and blue sub-pixels may be lit up in addition to the green, yellow and cyan sub-pixels. However, like in the case of the display device in Comparative example 2 described above, when the luminance value of the sub-pixel corresponding to a hue far from the hue (G) is increased in order to raise the lightness, the chroma of green is significantly decreased. By contrast, when the luminance value of the sub-pixel corresponding to a hue close to the hue (G) is increased, the chroma of green is not much decreased. As described above, in the display device 100 in this embodiment, while the color displayed by the pixel changes from black to the optimal color of the hue (G), the yellow and cyan sub-pixels corresponding to the hues (Ye) and (C) adjacent to the hue (G) on both sides thereof are lit up in addition to the green sub-pixel. This suppresses the decrease of the chroma.

For displaying the optimal color of the hue (G), the gray scale levels of the sub-pixels in the display devices in Comparative examples 1 and 2 are (R, G, B, Ye, C, M)=(0, 255, 0, 0, 0, 0). By contrast, the gray scale levels of the sub-pixels in the display device 100 in this embodiment are, for example, (R, G, B, Ye, C, M)=(0, 255, 0, 150, 150, 0). In this case, the chroma of the optimal color in the display device 100 in this embodiment is lower than those in the display devices in Comparative examples 1 and 2. The reason for this is that as the luminance values of the other sub-pixels are more increased with respect to the luminance value of the green sub-pixel having the maximum gray scale level, the chroma of the pixel is decreased. Thus, the display devices in Comparative examples 1 and 2 utilize the range of reproducible colors more effectively than the display device 100 in at least a part of the lightness range. Specifically, at a lightness lower than that of the optimal color displayable by the display device in Comparative example 1, the upper limit of the chroma displayable by the display device in Comparative example 1 is higher than that displayable by the display device 100. At a lightness lower than that of the optimal color displayable by the display device 100, the upper limit of the chroma displayable by the display device in Comparative example 2 is higher than that displayable by the display device 100.

Figure 9:
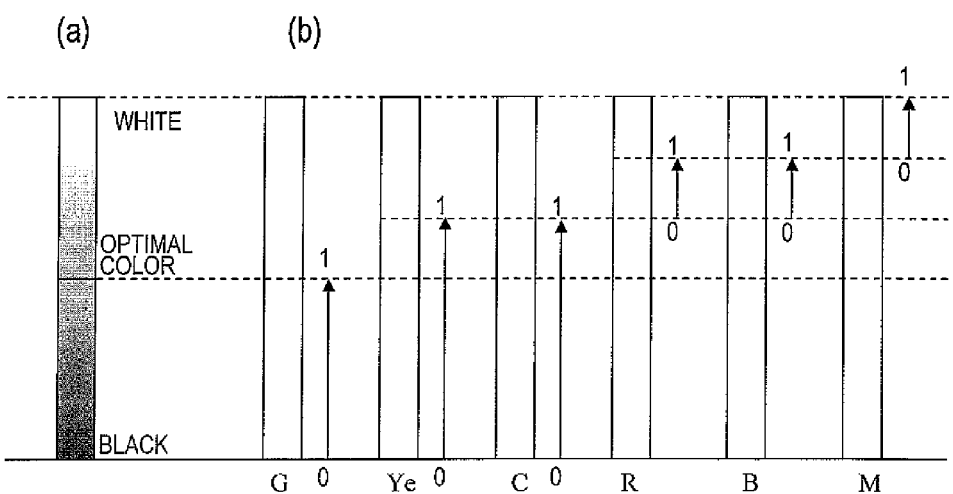
FIG. 9 is a schematic view for explaining the relationship between the change of the luminance value of each sub-pixel and the change of the color displayed by the pixel in the multi-primary color display device in Embodiment 1; (a) shows the change of the color displayed by the pixel, and (b) shows the changes of the luminance values of the green, yellow, cyan, red, blue and magenta sub-pixels.

It should be noted that the above description given with reference to FIG. 9 is not only regarding the timing at which the sub-pixels start to be lit up (at which the luminance values start to be increased) in the case where the color displayed by the pixel changes from black to white via green. The above description given with reference to FIG. 9 is nothing but an algorithm, by which the multi-primary color signal generation section 120 (see FIG. 1) sets the luminance value (gray scale level) of a sub-pixel corresponding to the color displayed by the pixel.

Namely, in the display device 100 in this embodiment, the combination of the luminance values of the sub-pixels shown in FIG. 9(b) is set based on the above-mentioned algorithm. In other words, FIG. 9(b) does not merely show the timing at which the sub-pixels are lit up (at which the luminance values start to be increased), but shows the combination of the luminance values of the sub-pixels itself. The luminance values of the sub-pixels may be prepared in advance based on the above-mentioned algorithm or generated by calculations. As can be seen, the display device 100 in this embodiment can display colors, based on the above-mentioned algorithm, which cannot be displayed by the three primary color display device.

The luminance values of the sub-pixels shown in FIG. 9(b) are changed so as to maximize the chroma at each lightness among the colors which can be represented by the pixel in the display device 100 in this embodiment, and correspond to the upper limit of the chroma at each lightness of the colors which can be represented by the pixel in the display device 100 in this embodiment. Needless to say, by adding the luminance value of another sub-pixel to the combination of the luminance values of the sub-pixels shown in FIG. 9(b), the pixel in the display device 100 can increase the lightness at a chroma lower than the upper limit thereof.

Figure 11:
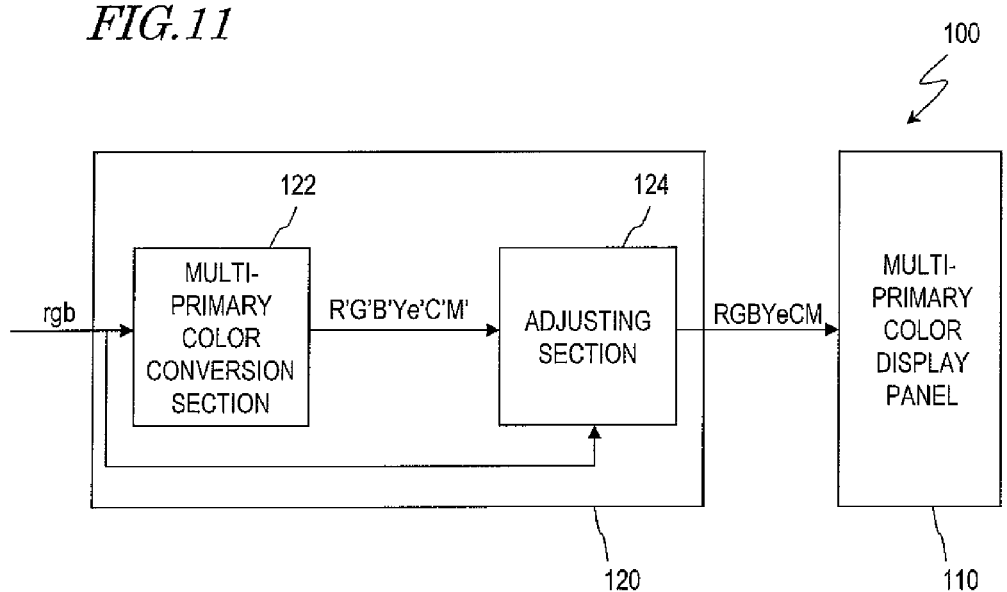
FIG. 11 is a schematic view showing a specific structure of the multi-primary color display device in Embodiment 1.

With reference to FIG. 11, a more specific structure of the multi-primary color display device 100 in this embodiment will be described. The multi-primary color signal generation section 120 includes a multi-primary color conversion section 122 and an adjusting section 124. The multi-primary color conversion section 122 performs multi-primary color conversion on the gray scale levels of an input signal for a three primary color display device. In the following description of this specification, a signal representing the gray scale levels obtained by multi-primary color conversion performed by the multi-primary color conversion section 122 will be referred to also as a multi-primary color original signal. For example, an input signal represents values rgb showing the gray scale levels of the red, green and blue sub-pixels of the three primary color display panel. The multi-primary color conversion section 122 converts the values rgb into values R'G'B'Ye'C'M'. Thus, a multi-primary color original signal representing the values R'G'B'Ye'C'M' is generated. The adjusting section 124 obtains an adjustment amount based on the gray scale levels rgb represented by the input signal.

In the above description given with reference to FIG. 11, the multi-primary color conversion section 122 converts the gray scale levels, but the present invention is not limited to this. The multi-primary color conversion section 122 may convert the luminance levels.

Figure 12:
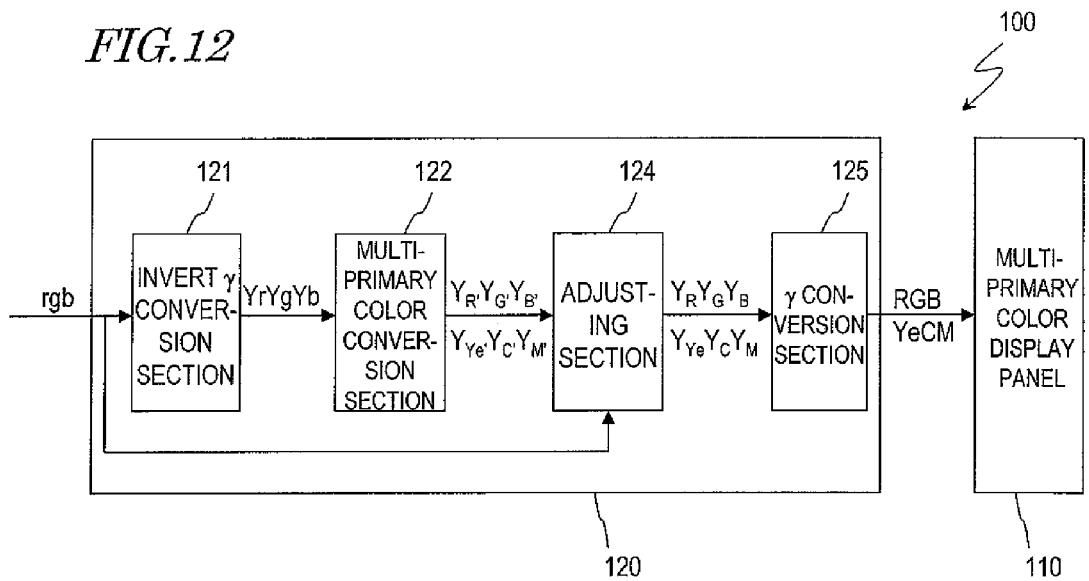
FIG. 12 is a schematic view showing another specific structure of the multi-primary color display device in Embodiment 1.

As shown in FIG. 12, the multi-primary color signal generation section 120 includes an invert γ conversion section 121, the multi-primary color conversion section 122, the adjusting section 124, and a γ conversion section 125. The invert γ conversion section 121 performs invert γ conversion on the gray scale levels rgb represented by the input signal for the three primary color display panel to obtain luminance levels $Y_r Y_g Y_b$. Next, the multi-primary color conversion section 122 performs multi-primary color conversion on the luminance levels $Y_r Y_g Y_b$ to obtain luminance levels $Y_R$, $Y_G$, $Y_B$, $Y_{Ye}$, $Y_C$, $Y_M$. The adjusting section 124 obtains an adjusting amount based on the gray scale levels rgb. For example, the adjusting section 124 obtains adjusting amounts $\Delta Y_{Ye}$ and $\Delta Y_C$, and adjusts the luminance levels $Y_R$, $Y_G$, $Y_B$, $Y_{Ye}$, $Y_C$, $Y_M$, based on the adjusting amounts $\Delta Y_{Ye}$ and $\Delta Y_C$ to obtain luminance levels $Y_R Y_G Y_B Y_{Ye} Y_C Y_M$. Next, the γ conversion section 125 performs γ conversion on the luminance levels $Y_R Y_G Y_B Y_{Ye} Y_C Y_M$ to obtain gray scale levels RGBYeCM, and generates a multi-primary color signal representing the gray scale levels RGBYeCM. The multi-primary color display panel 110 performs display in accordance with the multi-primary color signal.

Figure 13:
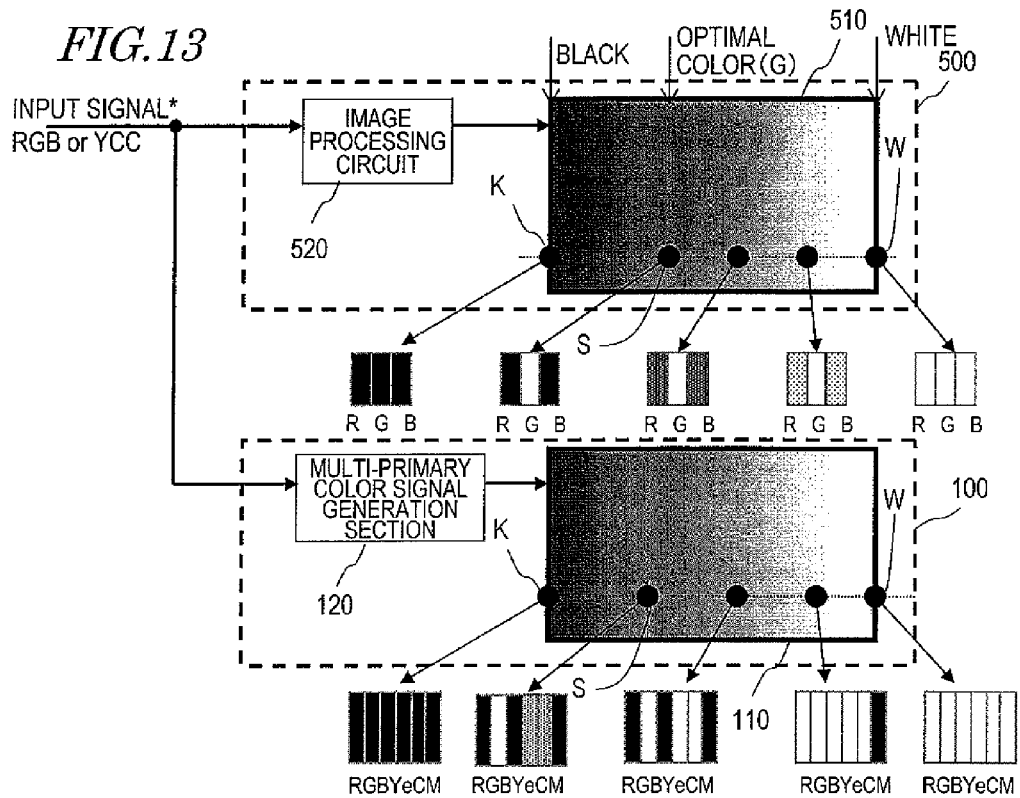
FIG. 13 is a schematic view for explaining the relationship between the change of the color displayed by the pixel and the change of each sub-pixel between the lit-up state and the non-lit-up state in the multi-primary color display device in Embodiment 1 as compared with that in a three primary color display device.

Now, with reference to FIG. 13, the relationship between the change of the color displayed by the pixel and the change of each sub-pixel between a lit-up state and a non-lit-up state in the multi-primary color display device 100 in Embodiment 1 will be described. Here, for comparison, a three primary color display device 500 is shown. As an input signal, an RGB primary color signal is used. The input signal may be a signal which can be converted into an RGB primary color signal such as a YCrCb signal generally used for color TVs or the like.

The three primary color display device 500 includes a display panel 510 and an image processing circuit 520. As shown in FIG. 13, the same input signal is input to the display device 100 in this embodiment and the three primary color display device 500. This input signal causes the entire screen of the multi-primary color display panel 110 and the entire screen of the display panel 510 to provide a gradation display from black to white via the optimal color of the hue (G). Using such an input signal, it can be easily checked whether or not a multi-primary color display device is the multi-primary color display panel 110 in this embodiment.

As shown in FIG. 2, in the multi-primary color display panel 110, the red, green, blue, yellow, cyan and magenta sub-pixels are strip-shaped. Here, the red, green, blue, yellow, cyan and magenta sub-pixels are arranged in this order in the row direction like stripes. In the display panel 510, the red, green and blue sub-pixels are also strip-shaped and arranged in this order in the row direction like stripes.

In the conventional display device 500, part K of the display panel 510 displays black. In part K, the luminance values of all the sub-pixels are "0". Part S of the display panel 510 displays the optimal color of the hue (G). In part S, the luminance value of the green sub-pixel is "1" whereas the luminance values of the red and blue sub-pixels are "0". In the display panel 510, the luminance value of the green sub-pixel increases and the lightness of the pixel rises from part K toward part S.

Part W of the display panel 510 displays white. In part W, the luminance values of all the sub-pixels are "1". In the display panel 510, the luminance values of the red and blue sub-pixels increase and the lightness of the pixel rises from part S toward part W.

By contrast, in the display device 100 in this embodiment, part K of the multi-primary color display panel 110 displays black. Therefore, in part K, the luminance values of all the sub-pixels are "0". Part S of the multi-primary color display panel 110 displays the optimal color of the hue (G). In part S, the luminance value of the green sub-pixel is "1", the luminance values of the yellow and cyan sub-pixels are "0.31", and the luminance values of the red, blue and magenta sub-pixels are "0". In the multi-primary color display panel 110, the luminance value of the green sub-pixel and also the luminance values of the yellow and cyan sub-pixels increase from part K toward part S. Owing to this, the lightness of the pixel rises.

Part W of the multi-primary color display panel 110 displays white. In part W, the luminance values of all the sub-pixels are "1". As described above, the luminance value "1" of each sub-pixel means the luminance value of each sub-pixel for realizing white when the color temperature is set to a desired level. In the multi-primary color display panel 110, from part S toward part W, the luminance values of the yellow and cyan sub-pixels are kept increasing; when the luminance values of the yellow and cyan sub-pixels become "1", the luminance values of the red and blue sub-pixels start to be increased; and when the luminance values of the red and blue sub-pixels become "1", finally, the luminance value of the magenta sub-pixel starts to be increased. The above-described changes of the luminance values of the sub-pixels can be checked by observing the pixels in the multi-primary color display panel 110 and the display panel 510 during the gradation display in a state of being enlarged by a loupe or the like.

In the above description, the increasing rate of the luminance value of the yellow sub-pixel is equal to that of the cyan sub-pixel, but the present invention is not limited to this. It is sufficient that the increasing rates of the luminance values of the yellow and cyan sub-pixels are set so as not to change the hue (G) of the color displayed by the pixel. For example, in the case where the hue of the color displayed by the pixel changes from the hue (G) toward the hue (C) if the luminance value of the yellow sub-pixel and the luminance value of the cyan sub-pixel are increased at an equal increasing rate, the increasing rate of the luminance value of the yellow sub-pixel may be higher than that of the cyan sub-pixel. Hereinafter, with reference to FIG. 14, changes of the luminance values of the sub-pixels in the display device 100 in this embodiment in the case where the color displayed by the pixel changes from black to white via the optimal color of the hue (G) will be described.

In an initial state, the luminance values of all the sub-pixels, namely, the green, yellow, cyan, red, blue and magenta sub-pixels are "0". The color displayed by the pixel is black. In the display device 100, the luminance value of the green sub-pixel is increased, and also the luminance values of the yellow and cyan sub-pixels are increased at an increasing rate lower than that of the green sub-pixel.

The increasing rates of the luminance values of the yellow and cyan sub-pixels are set so as not to change the hue (G) of the color displayed by the pixel. Here, the increasing rate of the luminance value of the yellow sub-pixel is higher than that of the cyan sub-pixel. It should be noted that as described above, as a result of quantization or the like or the like of the numerical values in a circuit embodying this control, the luminance value of the green sub-pixel may first start to be increased, and then the luminance values of the yellow and cyan sub-pixels may start to be increased.

As the luminance values of the green, yellow and cyan sub-pixels increase, the chroma and the lightness of the color displayed by the pixel increase. When reaching "1", the luminance value of the green sub-pixel is kept "1". At this point, the color displayed by the pixel is the optimal color of the hue (G). Then, in order to further increase the lightness of the pixel, the luminance values of the yellow and cyan sub-pixels are kept increasing.

Since the increasing rate of the luminance value of the yellow sub-pixel is higher than that of the cyan sub-pixel, the luminance value of the yellow sub-pixel reaches "1" before the luminance value of the cyan sub-pixel. When reaching "1", the luminance value of the yellow sub-pixel is kept "1". Next, the luminance value of the red sub-pixel starts to be increased. Here again, the increasing rate of the luminance value of the red sub-pixel is set so as not to change the hue (G) by the increase of the luminance values of the cyan and red sub-pixels.

The luminance value of the cyan sub-pixel reaches "1" before the luminance value of the red sub-pixel. When reaching "1", the luminance value of the cyan sub-pixel is kept "1". Next, the luminance value of the blue sub-pixel starts to be increased. Here again, the increasing rate of the luminance value of the blue sub-pixel is set so as not to change the hue (G) by the increase of the luminance values of the red and blue sub-pixels.

The luminance values of the red and blue sub-pixels increase and reach "1" approximately at the same time. Then, the luminance value of the magenta sub-pixel starts to be increased. When the luminance value of the magenta sub-pixel increases and reaches "1", the color displayed by the pixel is white.

Figure 14:
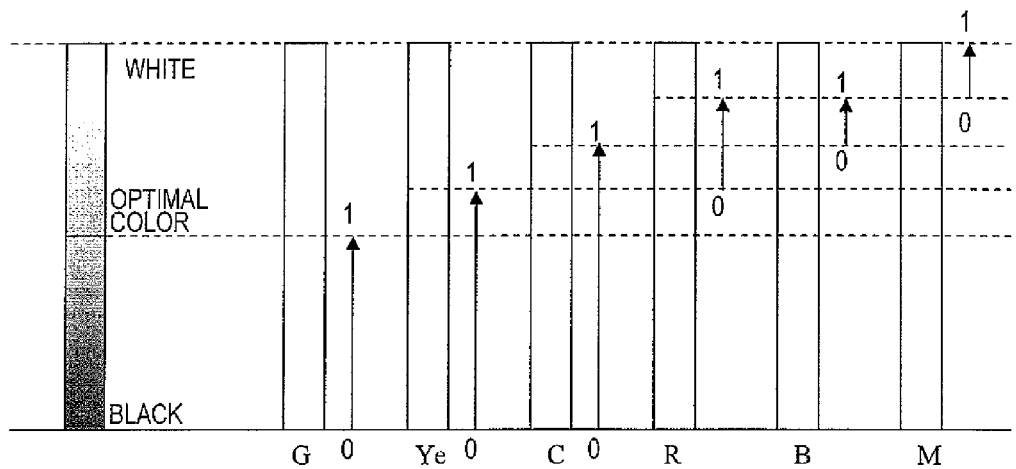
FIG. 14 is a schematic view for explaining the relationship between the change of the luminance value of each sub-pixel and the change of the color displayed by the pixel in the multi-primary color display device in Embodiment 1; (a) shows the change of the color displayed by the pixel, and (b) shows the changes of the luminance values of the green, yellow, cyan, red, blue and magenta sub-pixels.
Figure 15:
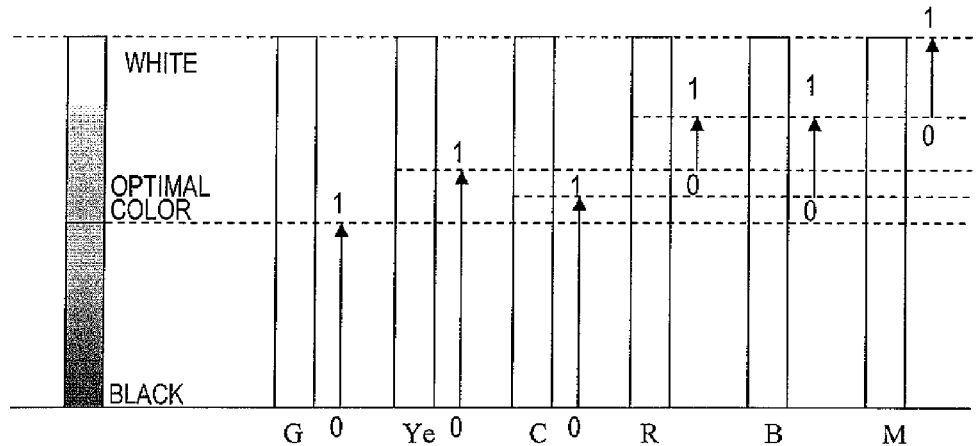
FIG. 15 is a schematic view for explaining the relationship between the change of the luminance value of each sub-pixel and the change of the color displayed by the pixel in the multi-primary color display device in Embodiment 1; (a) shows the change of the color displayed by the pixel, and (b) shows the changes of the luminance values of the green, yellow, cyan, red, blue and magenta sub-pixels.

In the above description given with reference to FIG. 14, the increasing rate of the luminance value of the yellow sub-pixel is higher than that of the cyan sub-pixel, but the present invention is not limited to this. The increasing rate of the luminance value of the cyan sub-pixel may be higher than that of the yellow sub-pixel. In this case, as shown in FIG. 15, after the luminance value of the green sub-pixel reaches "1", the luminance values of the yellow and cyan sub-pixels are kept increasing. Then, the luminance value of the cyan sub-pixel reaches "1" before the luminance value of the yellow sub-pixel. When reaching "1", the luminance value of the cyan sub-pixel is kept "1". Next, the luminance value of the blue sub-pixel starts to be increased. Here again, the increasing rate of the luminance value of the blue sub-pixel is set so as not to change the hue (G) by the increase of the luminance values of the yellow and blue sub-pixels.

The luminance value of the yellow sub-pixel reaches "1" before the luminance value of the blue sub-pixel. When reaching "1", the luminance value of the yellow sub-pixel is kept "1". Next, the luminance value of the red sub-pixel starts to be increased. Here again, the increasing rate of the luminance value of the red sub-pixel is set so as not to change the hue (G) by the increase of the luminance values of the blue and red sub-pixels. The changes of the luminance values of the sub-pixels after this are substantially the same as described above with reference to FIG. 9 and FIG. 14.

Figure 16:
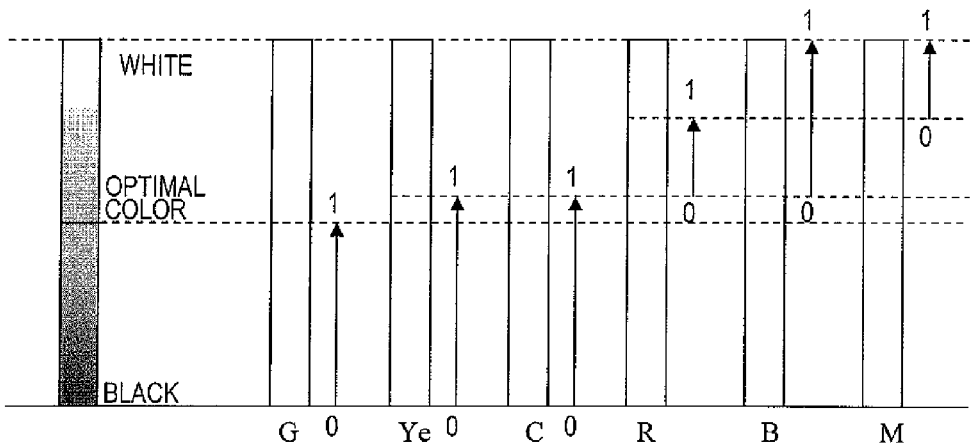
FIG. 16 is a schematic view for explaining the relationship between the change of the luminance value of each sub-pixel and the change of the color displayed by the pixel in the multi-primary color display device in Embodiment 1; (a) shows the change of the color displayed by the pixel, and (b) shows the changes of the luminance values of the green, yellow, cyan, red, blue and magenta sub-pixels.

In the above description given with reference to FIG. 9, the increasing rate of the luminance value of the red sub-pixel is equal to that of the blue sub-pixel, but the present invention is not limited to this. The increasing rate of the luminance value of the red sub-pixel may be higher than that of the blue sub-pixel. In this case, as shown in FIG. 16, after the luminance values of the yellow and cyan sub-pixels reach "1", the luminance values of the red and blue sub-pixels start to be increased. When the luminance values of the red and blue sub-pixels increase, the luminance value of the red sub-pixel reaches "1" before the luminance value of the blue sub-pixel. When reaching "1", the luminance value of the red sub-pixel is kept "1". Next, the luminance value of the magenta sub-pixel starts to be increased. Here again, the increasing rate of the luminance value of the magenta sub-pixel is set so as not to change the hue (G) by the increase of the luminance values of the blue and magenta sub-pixels. When the luminance values of the blue and magenta sub-pixels increase and reach "1" at the same time, the color displayed by the pixel is white.

Figure 17:
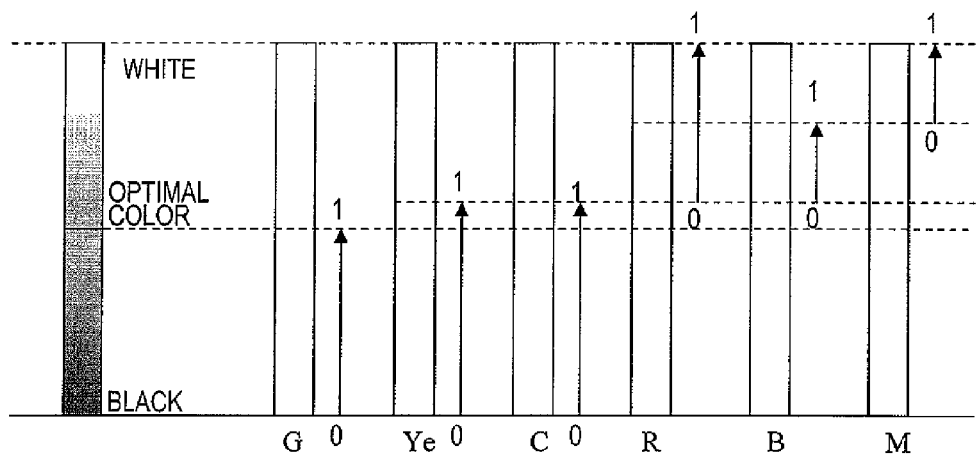
FIG. 17 is a schematic view for explaining the relationship between the change of the luminance value of each sub-pixel and the change of the color displayed by the pixel in the multi-primary color display device in Embodiment 1; (a) shows the change of the color displayed by the pixel, and (b) shows the changes of the luminance values of the green, yellow, cyan, red, blue and magenta sub-pixels.

In the above description given with reference to FIG. 16, the increasing rate of the luminance value of the red sub-pixel is higher than that of the blue sub-pixel, but the present invention is not limited to this. The increasing rate of the luminance value of the blue sub-pixel may be higher than that of the red sub-pixel. In this case, as shown in FIG. 17, after the luminance values of the yellow and cyan sub-pixels reach "1", the luminance values of the red and blue sub-pixels start to be increased. When the luminance values of the red and blue sub-pixels increase, the luminance value of the blue sub-pixel reaches "1" before the luminance value of the red sub-pixel. When reaching "1" the luminance value of the blue sub-pixel is kept "1". Next, the luminance value of the magenta sub-pixel starts to be increased. Here again, the increasing rate of the luminance value of the magenta sub-pixel is set so as not to change the hue (G) by the increase of the luminance values of the red and magenta sub-pixels.

When the luminance values of the red and magenta sub-pixels increase and reach "1" at the same time, the color displayed by the pixel is white.

FIG. 9 and FIGS. 14 through 17 show examples of changes of the luminance values of the sub-pixels in the case where the color displayed by the pixel changes from black to white via the optimal color of the hue (G), but the present invention is not limited to these. The luminance values of the sub-pixels may change in different manners.

In the above description, the changes of the luminance values of the sub-pixels in the case where the color displayed by the pixel changes from black to white via the optimal color of the hue (G) are explained. In the case where the color displayed by the pixel changes from black to white via the optimal color of the hue (R) or (B) also, the luminance values of the sub-pixels change in substantially the same manner. For example, while the color displayed by the pixel changes from black to the optimal color of the hue (R), the red sub-pixel is lit up, and also the yellow and magenta sub-pixels corresponding to the hues (Ye) and (M) adjacent to the hue (R) on both sides thereof are lit up. While the color displayed by the pixel changes from black to the optimal color of the hue (B), the blue sub-pixel is lit up, and also the magenta and cyan sub-pixels corresponding to the hues (M) and (C) adjacent to the hue (B) on both sides thereof are lit up.

As described above, in the case where the color displayed by the pixel changes from black to the optimal color of the hue (R), (G) or (B), in the display devices in Comparative examples 1 and 2, only one sub-pixel is lit up. By contrast, in the display device 100 in this embodiment, three sub-pixels are lit up and so the misapprehension is suppressed. In the case where the color displayed by the pixel changes from black to white via the optimal color of the hue (Ye), (C) or (M), the luminance values of the sub-pixels change in a slightly different manner. Hereinafter, advantages of the display device 100 in this embodiment will be described as compared with the display devices in Comparative examples 1 and 2. Here, the color displayed by the pixel changes from black to white via the optimal color of the hue (C).

Figure 66:
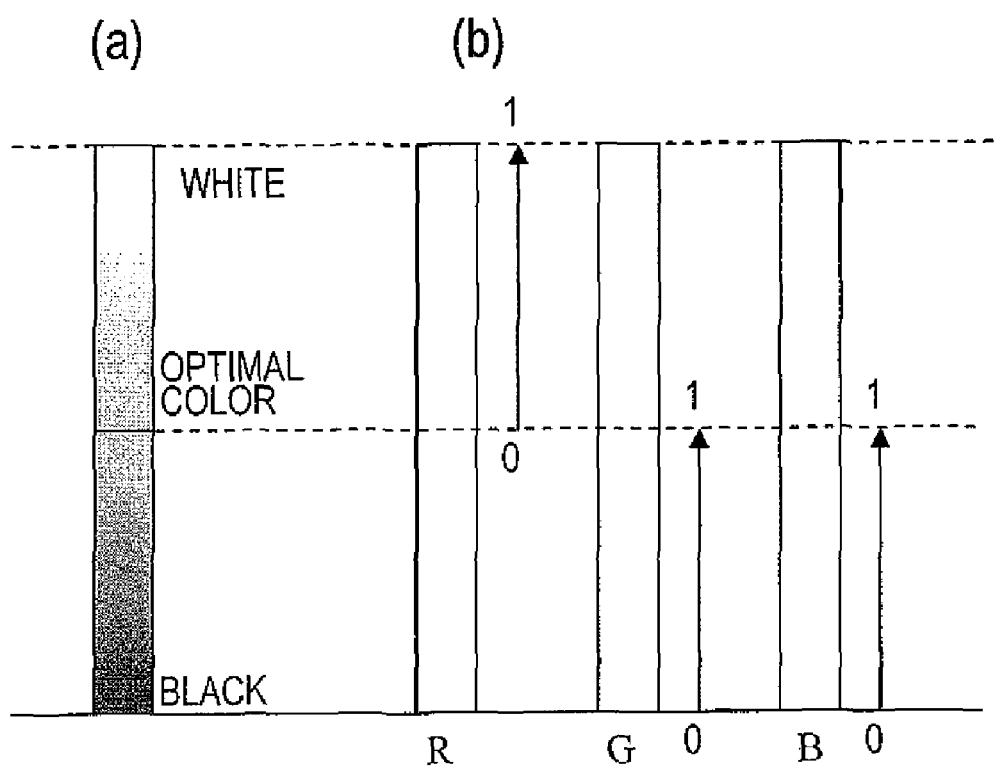
FIG. 66 is a schematic view showing the relationship between the change of the luminance value of each sub-pixel and the change of the color displayed by the pixel in the three primary color display device; (a) shows the change of the color displayed by the pixel, and (b) shows the changes of the luminance values of the sub-pixels.

First, the display device in Comparative example 1 will be described. As described above with reference to FIG. 66, in a three primary color display device, after the luminance values of the green and blue sub-pixels reach "1", the luminance value of the other sub-pixel (namely, the red sub-pixel) starts to be increased at the same time. In the display device in Comparative example 1, the luminance values of the cyan, blue and green sub-pixels start to be increased at the same time. After these luminance values reach "1", the luminance values of the other sub-pixels (namely, the yellow, magenta and red sub-pixels) pixels start to be increased at the same time.

Figure 18:
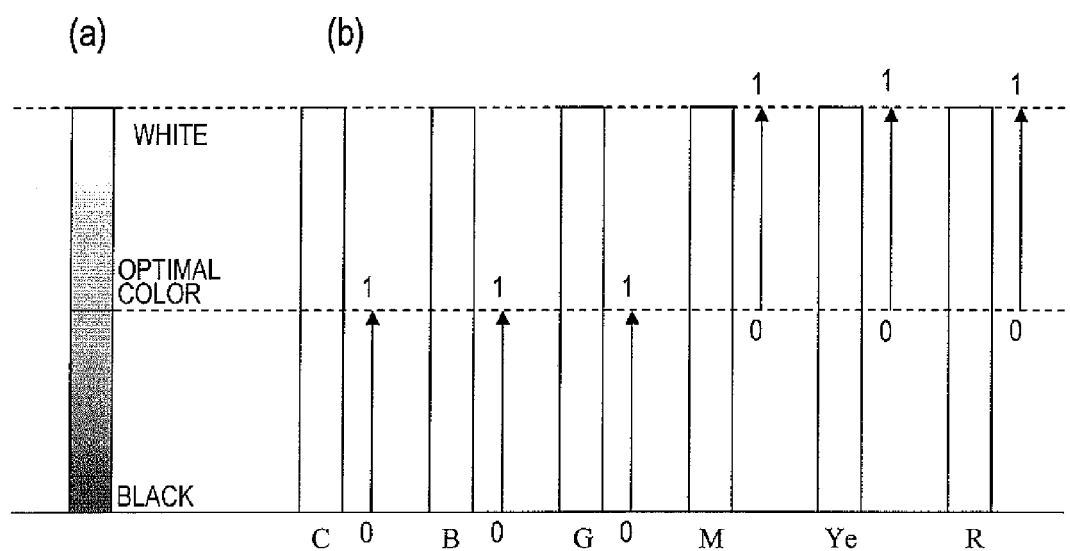
FIG. 18 is a schematic view for explaining the relationship between the change of the luminance value of each sub-pixel and the change of the color displayed by the pixel in the display device in Comparative example 1; (a) shows the change of the color displayed by the pixel, and (b) shows the changes of the luminance values of the cyan, blue, green, magenta, yellow and red sub-pixels.

FIG. 18 is a schematic view for explaining the relationship between the change of the luminance value of each sub-pixel and the change of the color displayed by the pixel in the display device in Comparative example 1. FIG. 18(*a*) shows the change of the color displayed by the pixel, and FIG. 18(*b*) shows the changes of the luminance values of the cyan, blue, green, magenta, yellow and red sub-pixels.

In an initial state, the luminance values of all the sub-pixels, namely, the cyan, blue, green, magenta, yellow and red sub-pixels are "0". The color displayed by the pixel is black. First, the luminance values of the cyan, blue and green sub-pixels start to be increased. The luminance values of the cyan, blue and green sub-pixels increase at an equal increasing rate. As the luminance values of the cyan, blue and green sub-pixels increase, the chroma and the lightness of the color displayed by the pixel increase.

When the luminance values of the cyan, blue and green sub-pixels reach "1", the color displayed by the pixel is the optimal color of the hue (C). Then, in the display device in Comparative example 1, as shown in FIG. 18(*b*), the luminance values of the other sub-pixels (namely, the magenta, yellow and red sub-pixels) start to be increased at the same time. The luminance values of the magenta, yellow and red sub-pixels increase at an equal increasing rate. In this case also, as the luminance values of the sub-pixels increase, the lightness of the color displayed by the pixel increases. When the luminance values of all the sub-pixels become "1", the color displayed by the pixel is white.

As described above, in the display device in Comparative example 1, while the color displayed by the pixel changes from black to the optimal color of the hue (C), the luminance values of the cyan, blue and green sub-pixels increase at an equal increasing rate. As can be understood from the above description, when compared at substantially the same luminance level, the chroma of cyan displayed by the blue and green sub-pixels is generally lower than the chroma of cyan displayed by the cyan sub-pixel. The display device in Comparative example 1 cannot represent a color having a high chroma especially at a low lightness.

Now, the display device in Comparative example 2 will be described. In the display device in Comparative example 2, after the luminance value of the cyan sub-pixel increases and reaches "1", the luminance values of the blue and green sub-pixels start to be increased. The display device in Comparative example 2 corresponds to the display device disclosed in Patent Document 3 except for the position of the optimal color.

Figure 19:
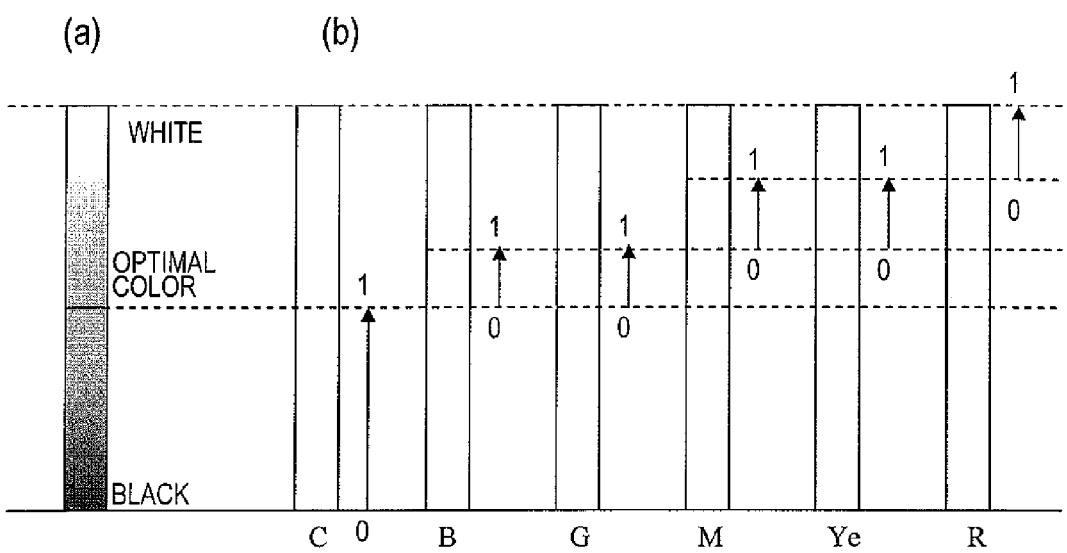
FIG. 19 is a schematic view for explaining the relationship between the change of the luminance value of each sub-pixel and the change of the color displayed by the pixel in the display device in Comparative example 2; (a) shows the change of the color displayed by the pixel, and (b) shows the changes of the luminance values of the cyan, blue, green, magenta, yellow and red sub-pixels.

FIG. 19 is a schematic view for explaining the relationship between the change of the luminance value of each sub-pixel and the change of the color displayed by the pixel in the display device in Comparative example 2. FIG. 19(*a*) shows the change of the color displayed by the pixel, and FIG. 19(*b*) shows the changes of the luminance values of the cyan, blue, green, magenta, yellow and red sub-pixels.

In an initial state, the luminance values of all the sub-pixels, namely, the cyan, blue, green, magenta, yellow and red sub-pixels are "0". The color displayed by the pixel is black. First, the luminance value of the cyan sub-pixel starts to be increased. As the luminance value of the cyan sub-pixel increases, the chroma and the lightness of the color displayed by the pixel increase.

When reaching "1", the luminance value of the cyan sub-pixel is kept "1". Next, the luminance values of the blue and green sub-pixels start to be increased. As the luminance values of the blue and green sub-pixels increase, the lightness of the color displayed by the pixel increases. The increasing rates of the luminance values of the blue and green sub-pixels are set so as not to change the hue (C) of the color displayed by the pixel. Here, the increasing rate of the luminance value of the blue sub-pixel is equal to that of the green sub-pixel.

Since the increasing rate of the luminance value of the blue sub-pixel is equal to that of the green sub-pixel, the luminance values of the blue and green sub-pixels increase and reach "1" at the same time. When reaching "1", the luminance values of the blue and green sub-pixels are kept "1". Next, the luminance values of the magenta and yellow sub-pixels start to be increased. The increasing rates of the luminance values of the magenta and yellow sub-pixels are set so as not to change the hue (C). Here, the increasing rate of the luminance value of the magenta sub-pixel is equal to that of the yellow sub-pixel.

The luminance value of the magenta sub-pixel reaches "1" at the same time as the luminance value of the yellow sub-pixel. Next, the luminance value of the red sub-pixel starts to be increased. When the luminance value of the red sub-pixel increases and reaches "1", the color displayed by the pixel is white.

Figure 20:
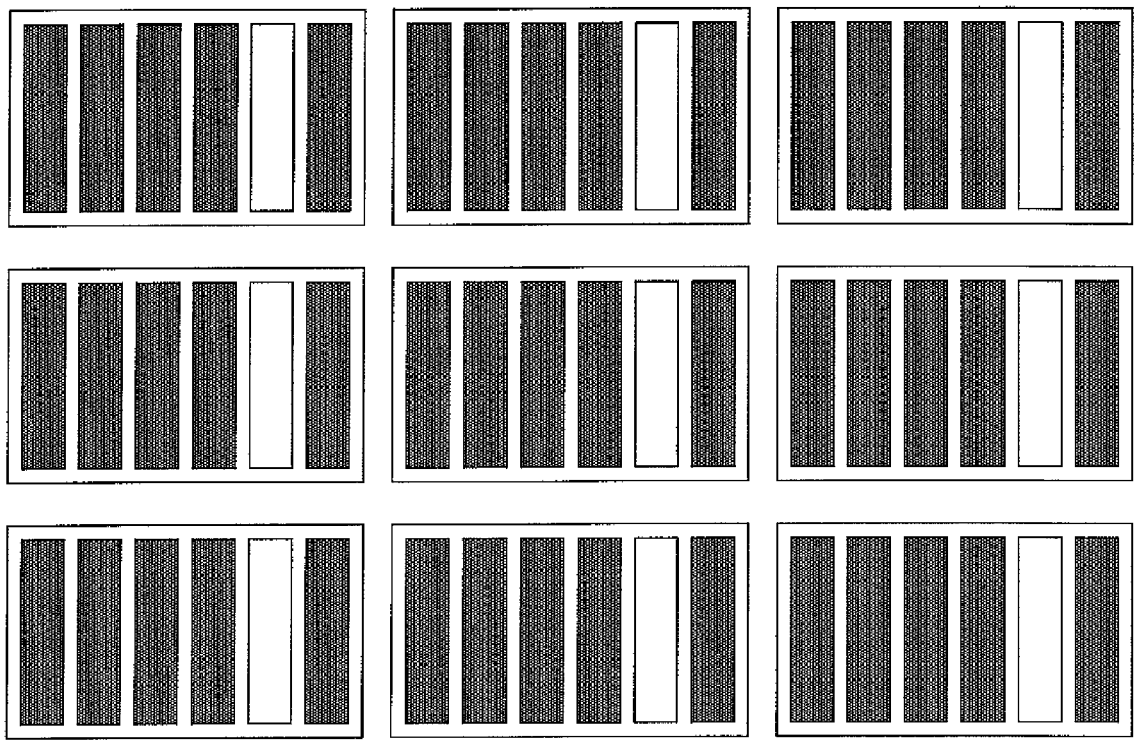
FIG. 20 is a schematic view showing a lit-up/non-lit-up state of the sub-pixels in the display device in Comparative example 2.

In such a display device in Comparative example 2, in the duration of time in which the color displayed by the pixel changes from black to the optimal color of the hue (C), before the luminance values of the blue and green sub-pixels start to be increased, only the cyan sub-pixel is lit up, and the other sub-pixels are not lit up. In this case, as shown in FIG. 20, the area size occupied by the non-lit-up sub-pixels with respect to one pixel is large. As a result, the non-lit-up sub-pixels appear to display black. It is misapprehended that black is also displayed in addition to cyan. In a structure in which the sub-pixels belonging to one pixel are arranged in one row, when only the cyan sub-pixel in each of the pixels in one column is lit up, thick black lines appear to be displayed in addition to thin cyan lines. This is misapprehended as a display of cyan stripes.

In the case where the color displayed by the pixel changes from black to white via the optimal color of the hue (C), the sub-pixels in the display device in Comparative example 3 change in substantially the same manner as in Comparative example 1 described above with reference to FIG. 18. The same description will be omitted.

In the display device 100 in this embodiment, in the case where the color displayed by the pixel changes from black to the optimal color of the hue (C), the luminance value of the cyan sub-pixel starts to be increased, and also the luminance values of the blue and green sub-pixels corresponding to two hues adjacent to the hue (C) (namely, (B) and (G)) start to be increased at an increasing rate lower than that of the cyan sub-pixel.

Figure 21:
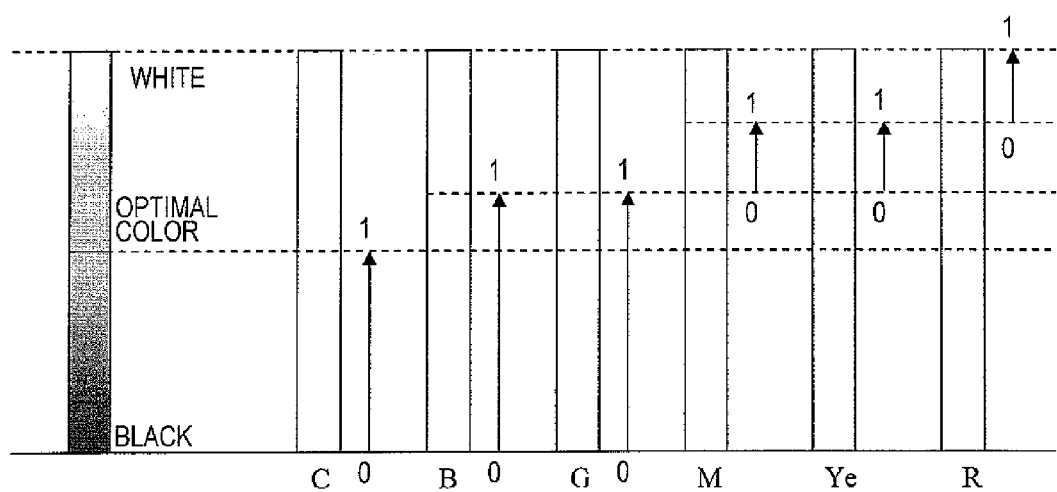
FIG. 21 is a schematic view for explaining the relationship between the change of the luminance value of each sub-pixel and the change of the color displayed by the pixel in the multi-primary color display device in Embodiment 1; (a) shows the change of the color displayed by the pixel, and (b) shows the changes of the luminance values of the cyan, blue, green, magenta, yellow and red sub-pixels.

Hereinafter, with reference to FIG. 21, changes of the luminance values of the sub-pixels in the display device 100 in this embodiment in the case where the color displayed by the pixel changes from black to white via the optimal color of the hue (C) will be described. FIG. 21 is a schematic view for explaining the relationship between the change of the luminance value of each sub-pixel and the change of the color displayed by the pixel in the display device 100 in this embodiment. FIG. 21(a) shows the change of the color displayed by the pixel, and FIG. 21(b) shows the changes of the luminance values of the cyan, blue, green, magenta, yellow and red sub-pixels.

In an initial state, the luminance values of all the sub-pixels, namely, the cyan, blue, green, magenta, yellow and red sub-pixels are "0". The color displayed by the pixel is black. First, the luminance value of the cyan sub-pixel is increased, and also the luminance values of the blue and green sub-pixels are increased at an increasing rate lower than that of the cyan sub-pixel. The increasing rates of the luminance values of the blue and green sub-pixels are set so as not to change the hue (C) of the color displayed by the pixel. The hue angle of the color displayed by the pixel changes within ±20°, preferably ±10°, with respect to the target hue angle. Here, the increasing rate of the luminance value of the blue sub-pixel is equal to that of the green sub-pixel.

As the luminance values of the cyan, blue and green sub-pixels increase, the chroma and the lightness of the color displayed by the pixel increase. The luminance value of the cyan sub-pixel reaches "1" before the luminance values of the blue and green sub-pixels.

When reaching "1", the luminance value of the cyan sub-pixel is kept "1". Then, the luminance values of the blue and green sub-pixels are kept increasing. Since the increasing rate of the luminance value of the blue sub-pixel is equal to that of the green sub-pixel, the luminance values of the blue and green sub-pixels reach "1" at the same time.

When reaching "1", the luminance values of the blue and green sub-pixels are kept "1". Next, in order to further increase the lightness of the pixel, the luminance value of the magenta sub-pixel corresponding to the hue (M), which is on the same side as the hue (B) with respect to the hue (C) and is closest to the hue (C) next to the hue (B), and the luminance value of the yellow sub-pixel corresponding to the hue (Ye), which is on the same side as the hue (G) with respect to the hue (C) and is closest to the hue (C) next to the hue (G), start to be increased. The increasing rates of the luminance values of the magenta and yellow sub-pixels are set so as not to change the hue (C). Here, the increasing rate of the luminance value of the magenta sub-pixel is equal to that of the yellow sub-pixel.

When reaching "1" at the same time, the luminance values of the magenta and yellow sub-pixels are kept "1". Next, the luminance value of the red sub-pixel starts to be increased. When the luminance value of the red sub-pixel increases and reaches "1", the color displayed by the pixel is white.

Now, the display devices in Comparative examples 1 and 2 and the display device 100 in this embodiment will be compared. In the display device in Comparative example 1, while the color displayed by the pixel changes from black to the optimal color of the hue (C), the luminance values of the blue and green sub-pixels are increased at an equal increasing rate. As can be understood from the above description, when compared at substantially the same luminance level, the chroma of cyan displayed by the green and blue sub-pixels is generally lower than the chroma of cyan displayed by the cyan sub-pixel. The display device in Comparative example 1 cannot represent a color having a high chroma especially at a low lightness.

In the display device in Comparative example 2, while the color displayed by the pixel changes from black to the optimal color of the hue (C), first, only the luminance value of the cyan sub-pixel starts to be increased. During this time, as shown in FIG. 20, only the cyan sub-pixel is lit up. Therefore, the area size occupied by the non-lit-up sub-pixels with respect to one pixel is large. As a result, the non-lit-up sub-pixels appear to display black. It is misapprehended that black is also displayed in addition to cyan. Thus, the display quality is declined.

In the display device 100 in this embodiment, the increasing rates of the luminance values of the green and blue sub-pixels are lower than that of the cyan sub-pixel. As described above, when compared at substantially the same luminance level, the chroma of cyan displayed by the blue and green sub-pixels is generally lower than the chroma of cyan displayed by the cyan sub-pixel. Therefore, the display device 100 in this embodiment can represent a color having a higher chroma than the display device in Comparative example 1.

Figure 22:
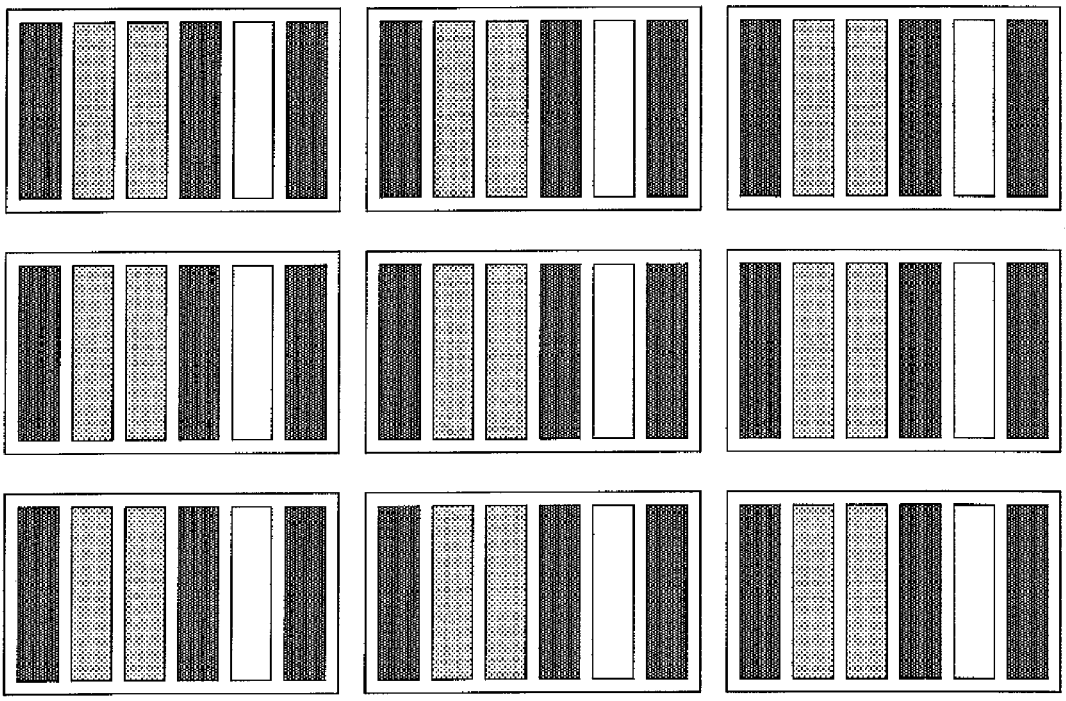
FIG. 22 is a schematic view showing a lit-up/non-lit-up state of the sub-pixels in the multi-primary color display device in Embodiment 1.

In the display device 100 in this embodiment, in the case where the color displayed by the pixel changes from black to the optimal color of the hue (C), the luminance value of the cyan sub-pixel starts to be increased, and also the luminance values of the blue and green sub-pixels start to be increased. As shown in FIG. 22, the cyan sub-pixel is lit up and also the blue and green sub-pixels are lit up. In this case, the area size occupied by the non-lit-up sub-pixels with respect to one pixel is small, and so the misapprehension is suppressed.

The display device in Comparative example 2 utilizes the range of reproducible colors more effectively than the multi-primary color display device 100 in at least a part of the lightness range. Specifically, at a lightness lower than that of the optimal color displayable by the display device 100, the upper limit of the chroma displayable by the display device in Comparative example 2 is higher than that displayable by the display device 100.

Now, with reference to FIG. 23, the relationship between the change of the color displayed by the pixel and the change of each sub-pixel between a lit-up state and a non-lit-up state in the multi-primary color display device 100 in Embodiment 1 will be described. Here, for comparison, the three primary color display device 500 is shown. As an input signal, an RGB primary color signal is used. The input signal may be a signal which can be converted into an RGB primary color signal such as a YCrCb signal generally used for color TVs or the like.

Figure 23:
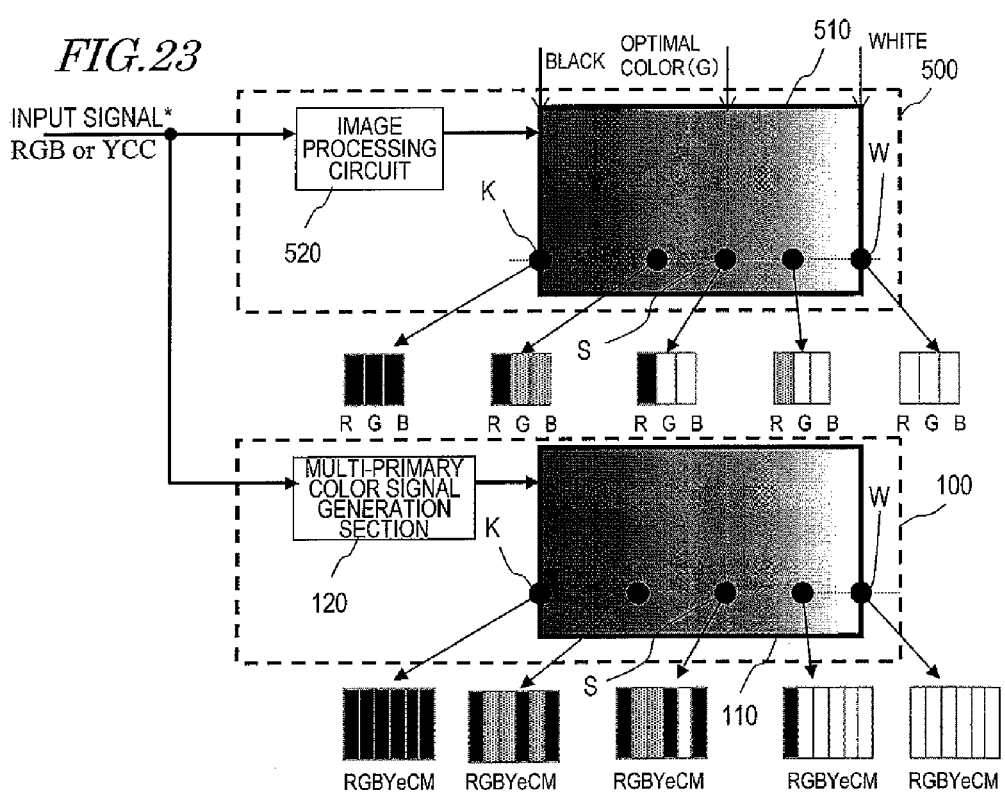
FIG. 23 is a schematic view for explaining the relationship between the change of the color displayed by the pixel and the change of each sub-pixel between the lit-up state and the non-lit-up state in the multi-primary color display device in Embodiment 1 as compared with that in the three primary color display device.

As shown in FIG. 23, the same input signal is input to the display device 100 in this embodiment and the three primary color display device 500. This input signal causes the entire screen of the multi-primary color display panel 110 and the entire screen of the display panel 510 to provide a gradation display which changes from black to white via the optimal color of the hue (C). Using such an input signal, it can be easily checked whether or not a multi-primary color display device is the multi-primary color display panel 110 in this embodiment.

In the conventional display device 500, part K of the display panel 510 displays black. In part K, the luminance values of all the sub-pixels are "0". Part S of the display panel 510 displays the optimal color of the hue (C). In part S, the luminance values of the green and blue sub-pixels are "1" whereas the luminance value of the red sub-pixel is "0". In the display panel 510, the luminance values of the green and blue sub-pixels increase and the lightness of the pixel rises from part K toward part S.

Part W of the display panel 510 displays white. In part W, the luminance values of all the sub-pixels are "1". In the display panel 510, the luminance value of the red sub-pixel increases and the lightness of the pixel rises from part S toward part W.

By contrast, in the display device 100 in this embodiment, part K of the multi-primary color display panel 110 displays black. Therefore, in part K, the luminance values of all the sub-pixels are "0". Part S of the multi-primary color display panel 110 displays the optimal color of the hue (C). In part S, the luminance value of the cyan sub-pixel is "1", the luminance values of the blue and green sub-pixels are "0.31", and the luminance values of the red, yellow and magenta sub-pixels are "0". In the multi-primary color display panel 110, the luminance value of the cyan sub-pixel and also the luminance values of the blue and green sub-pixels increase from part K toward part S. Owing to this, the lightness of the pixel rises.

Part W of the multi-primary color display panel 110 displays white. In part W, the luminance values of all the sub-pixels are "1". In the multi-primary color display panel 110, from part S toward part W, the luminance values of the blue and green sub-pixels are kept increasing, then the luminance values of the magenta and yellow sub-pixels start to be increased, and finally the luminance value of the red sub-pixel starts to be increased. The above-described changes of the luminance values of the sub-pixels can be checked by observing the pixels in the multi-primary color display panel 110 and the display panel 510 during the gradation display in a state of being enlarged by a loupe or the like.

In the above description, the increasing rate of the luminance value of the blue sub-pixel is equal to that of the green sub-pixel, but the present invention is not limited to this. It is sufficient that the increasing rates of the luminance values of the blue and green sub-pixels are set so as not to change the hue (C) of the color displayed by the pixel. For example, in the case where the hue of the color displayed by the pixel changes from the hue (C) toward the hue (G) if the luminance value of the blue sub-pixel and the luminance value of the green sub-pixel are increased at an equal increasing rate, the increasing rate of the luminance value of the blue sub-pixel may be higher than that of the green sub-pixel. Hereinafter, with reference to FIG. 24, changes of the luminance values of the sub-pixels in the display device 100 in this embodiment in the case where the color displayed by the pixel changes from black to white via the optimal color of the hue (C) will be described.

In an initial state, the luminance values of all the sub-pixels, namely, the cyan, blue, green, magenta, yellow and red sub-pixels are "0". The color displayed by the pixel is black. In the display device 100, the luminance value of the cyan sub-pixel is increased, and also the luminance values of the blue and green sub-pixels are increased at an increasing rate lower than that of the cyan sub-pixel.

The increasing rates of the luminance values of the blue and green sub-pixels are set so as not to change the hue (C) of the color displayed by the pixel. Here, the increasing rate of the luminance value of the blue sub-pixel is higher than that of the green sub-pixel. It should be noted that as described above, as a result of quantization or the like of the numerical values in a circuit embodying this control, the luminance value of the cyan sub-pixel may first start to be increased, and then the luminance values of the blue and green sub-pixels may start to be increased.

As the luminance values of the cyan, blue and green sub-pixels increase, the chrome and the lightness of the color displayed by the pixel increase. When reaching "1". the luminance value of the cyan sub-pixel is kept "1". Then, in order to further increase the lightness of the pixel, the luminance values of the blue and green sub-pixels are kept increasing.

Since the increasing rate of the luminance value of the blue sub-pixel is higher than that of the green sub-pixel, the luminance value of the blue sub-pixel reaches "1" before the luminance value of the green sub-pixel. When reaching "1", the luminance value of the blue sub-pixel is kept "1". Next, the luminance value of the magenta sub-pixel starts to be increased. Here again, the increasing rate of the luminance value of the magenta sub-pixel is set so as not to change the hue (C) by the increase of the luminance values of the green and magenta sub-pixels.

The luminance value of the green sub-pixel reaches "1" before the luminance value of the magenta sub-pixel. When reaching "1", the luminance value of the green sub-pixel is kept "1". Next, the luminance value of the yellow sub-pixel starts to be increased. Here again, the increasing rate of the luminance value of the yellow sub-pixel is set so as not to change the hue (C) by the increase of the luminance values of the magenta and yellow sub-pixels.

The luminance values of the magenta and yellow sub-pixels increase and reach "1" approximately at the same time. Then, the luminance value of the red sub-pixel starts to be increased. When the luminance value of the red sub-pixel increases and reaches "1", the color displayed by the pixel is white.

Figure 24:
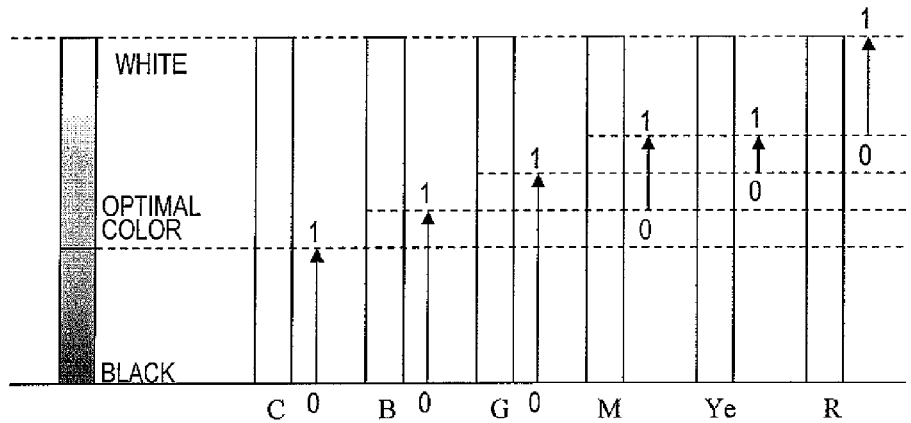
FIG. 24 is a schematic view for explaining the relationship between the change of the luminance value of each sub-pixel and the change of the color displayed by the pixel in the multi-primary color display device in Embodiment 1; (a) shows the change of the color displayed by the pixel, and (b) shows the changes of the luminance values of the cyan, blue, green, magenta, yellow and red sub-pixels.
Figure 25:
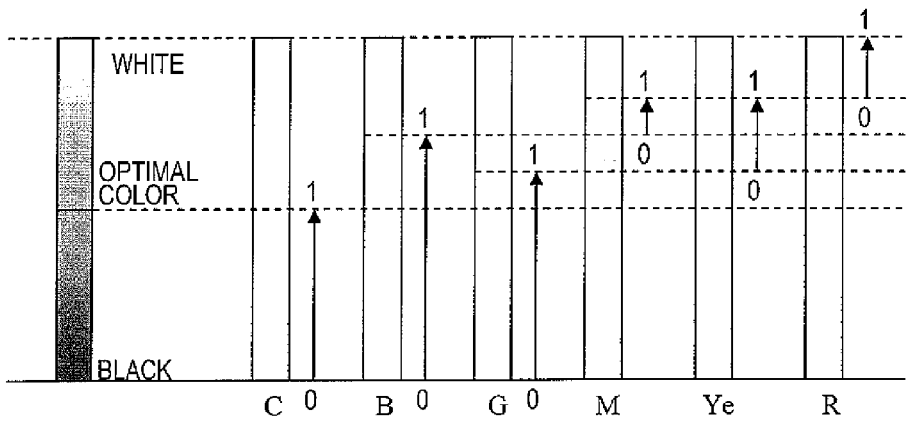
FIG. 25 is a schematic view for explaining the relationship between the change of the luminance value of each sub-pixel and the change of the color displayed by the pixel in the multi-primary color display device in Embodiment 1; (a) shows the change of the color displayed by the pixel, and (b) shows the changes of the luminance values of the cyan, blue, green, magenta, yellow and red sub-pixels.

In the above description given with reference to FIG. 24, the increasing rate of the luminance value of the blue sub-pixel is higher than that of the green sub-pixel, but the present invention is not limited to this. The increasing rate of the luminance value of the green sub-pixel may be higher than that of the blue sub-pixel. In this case, as shown in FIG. 25, after the luminance value of the cyan sub-pixel reaches "1", the luminance values of the blue and green sub-pixels are kept increasing. Then, the luminance value of the green sub-pixel reaches "1" before the luminance value of the blue sub-pixel. When reaching "1", the luminance value of the green sub-pixel is kept "1". Next, the luminance value of the yellow sub-pixel starts to be increased. Here again, the increasing rate of the luminance value of the yellow sub-pixel is set so as not to change the hue (C) by the increase of the luminance values of the blue and yellow sub-pixels.

The luminance value of the blue sub-pixel reaches "1" before the luminance value of the yellow sub-pixel. When reaching "1", the luminance value of the blue sub-pixel is kept "1". Next, the luminance value of the magenta sub-pixel starts to be increased. Here again, the increasing rate of the luminance value of the magenta sub-pixel is set so as not to change the hue (C) by the increase of the luminance values of the yellow and magenta sub-pixels. The changes of the luminance values of the sub-pixels after this are substantially the same as described above with reference to FIG. 21 and FIG. 24.

Figure 26:
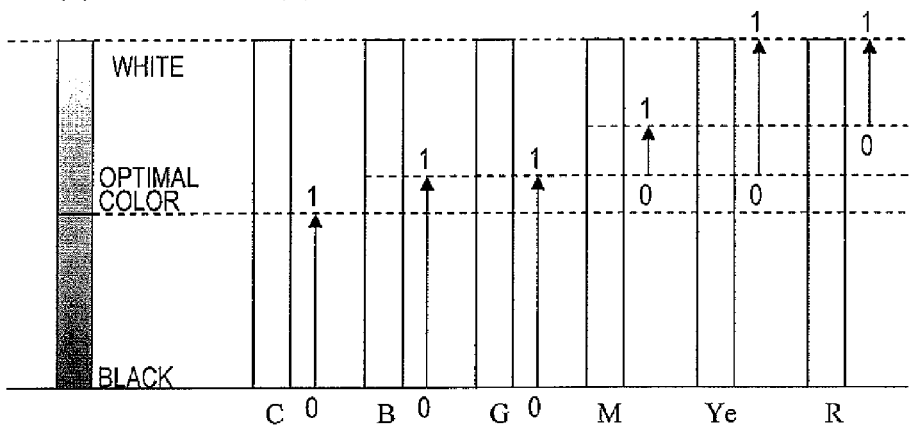
FIG. 26 is a schematic view for explaining the relationship between the change of the luminance value of each sub-pixel and the change of the color displayed by the pixel in the multi-primary color display device in Embodiment 1; (a) shows the change of the color displayed by the pixel, and (b) shows the changes of the luminance values of the cyan, blue, green, magenta, yellow and red sub-pixels.

In the above description given with reference to FIG. 21, the increasing rate of the luminance value of the magenta sub-pixel is equal to that of the yellow sub-pixel, but the present invention is not limited to this. The increasing rate of the luminance value of the magenta sub-pixel may be higher than that of the yellow sub-pixel. In this case, as shown in FIG. 26, after the luminance values of the blue and green sub-pixels reach "1", the luminance values of the yellow and magenta sub-pixels start to be increased. Then, the luminance value of the magenta sub-pixel reaches "1" before the luminance value of the yellow sub-pixel. When reaching "1", the luminance value of the magenta sub-pixel is kept "1". Next, the luminance value of the red sub-pixel starts to be increased. Here again, the increasing rate of the luminance value of the red sub-pixel is set so as not to change the hue (C) by the increase of the luminance values of the yellow and red sub-pixels. When the luminance values of the yellow and red sub-pixels increase and reach "1" at the same time, the color displayed by the pixel is white.

Figure 27:
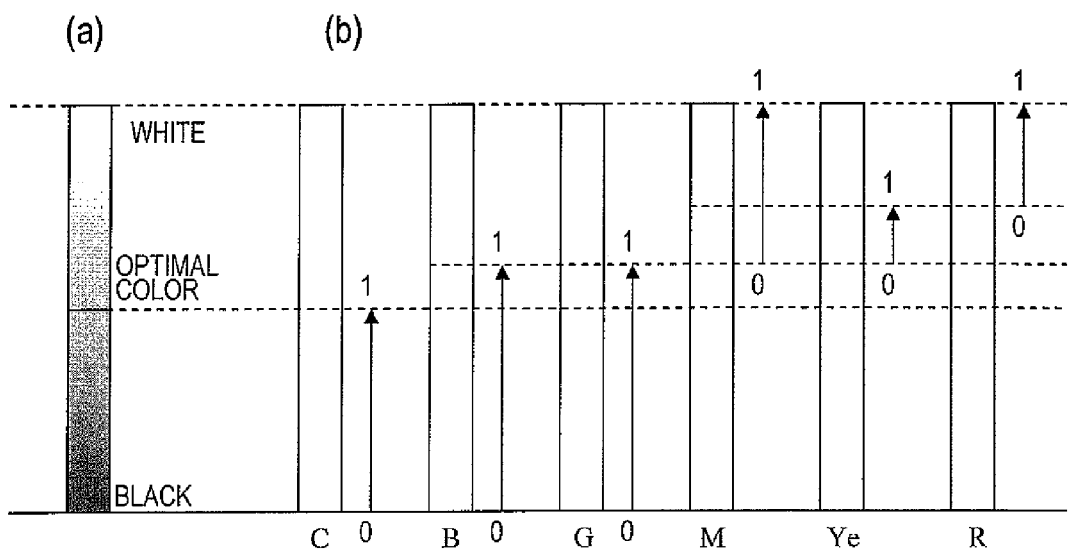
FIG. 27 is a schematic view for explaining the relationship between the change of the luminance value of each sub-pixel and the change of the color displayed by the pixel in the multi-primary color display device in Embodiment 1; (a) shows the change of the color displayed by the pixel, and (b) shows the changes of the luminance values of the cyan, blue, green, magenta, yellow and red sub-pixels.

In the above description given with reference to FIG. 26, the increasing rate of the luminance value of the magenta sub-pixel is higher than that of the yellow sub-pixel, but the present invention is not limited to this. The increasing rate of the luminance value of the yellow sub-pixel may be higher than that of the magenta sub-pixel. In the this case, as shown in FIG. 27, after the luminance values of the blue and green sub-pixels reach "1", the luminance values of the magenta and yellow sub-pixels start to be increased. Then, the luminance value of the yellow sub-pixel reaches "1" before the luminance value of the magenta sub-pixel. When reaching "1", the luminance value of the yellow sub-pixel is kept "1". Next, the luminance value of the red sub-pixel starts to be increased. Here again, the increasing rate of the luminance value of the red sub-pixel is set so as not to change the hue (C) by the increase of the luminance values of the magenta and red sub-pixels. When the luminance values of the magenta and red sub-pixels increase and reach "1" at the same time, the color displayed by the pixel is white.

FIG. 21 and FIGS. 24 through 27 show examples of changes of the luminance values of the sub-pixels in the case where the color displayed by the pixel changes from black to white via the optimal color of the hue (C), but the present invention is not limited to these. The luminance values of the sub-pixels may change in different manners.

In the above description, the changes of the luminance values of the sub-pixels in the case where the color displayed by the pixel changes from black to white via the optimal color of the hue (C) are explained. In the case where the color displayed by the pixel changes from black to white via the optimal color of the hue (Ye) or (M) also, the luminance values of the sub-pixels change in substantially the same manner. For example, while the color displayed by the pixel changes from black to the optimal color of the hue (Ye), the yellow sub-pixel are lit up, and also the red and green sub-pixels corresponding to the hues (R) and (G) adjacent to the hue (Ye) on both sides thereof are lit up. While the color displayed by the pixel changes from black to the optimal color of the hue (M), the magenta sub-pixel is lit up, and also the red and blue sub-pixels corresponding to the hues (R) and (B) adjacent to the hue (M) on both sides thereof are lit up.

In the above description given with reference to FIG. 3, the difference between two hues adjacent to any one of the plurality of hues is equal to the difference between two hues adjacent to any other one of the plurality of hues. The present invention is not limited to this. Such hue differences may be different among the plurality of hues.

Figure 28:
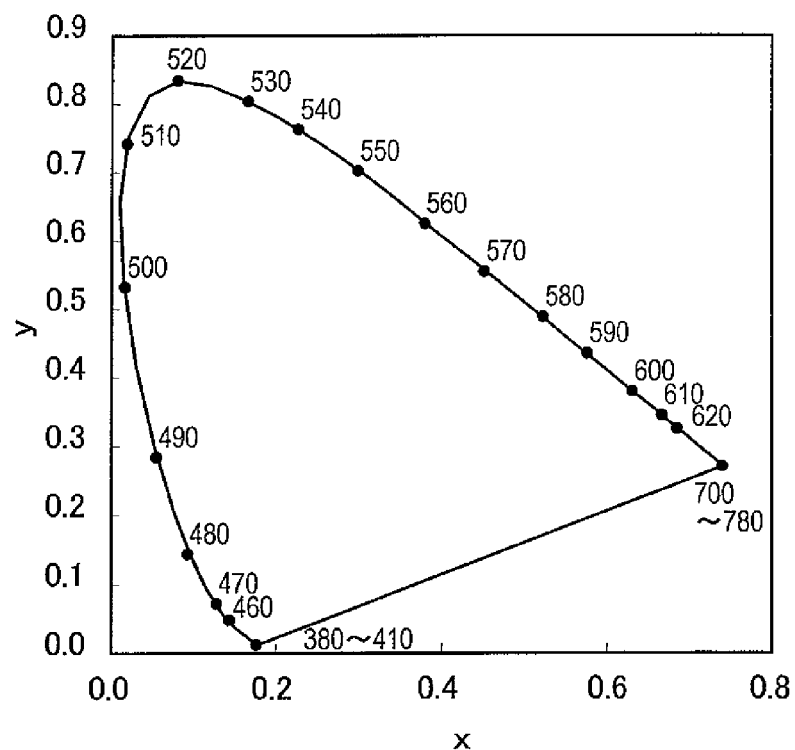
FIG. 28 is a schematic view showing a chromaticity diagram of an XYZ colorimetric system.

FIG. 28 is a schematic view showing a chromaticity diagram of an XYZ colorimetric system. FIG. 28 shows a spectrum locus and a main wavelength. In this specification, a main wavelength of the red sub-pixel is 605 nm or longer and 635 nm or shorter, a main wavelength of the yellow sub-pixel is 565 nm or longer and 580 nm or shorter, a main wavelength of the green sub-pixel is 520 nm or longer and 550 nm or shorter, a main wavelength of the cyan sub-pixel is 475 nm or longer and 500 nm or shorter, and a main wavelength of the blue sub-pixel is 470 nm or shorter. A complementary wavelength of the magenta sub-pixel is 495 nm or longer and 565 nm or shorter.

In the above description, the input signal is conformed to the BT.709 Standard, and the gray scale levels r, g and b represented by the input signal (or the gray scale levels into which the values represented by the input signal can be converted) are in the range of, for example, 0 to 255. The present invention is not limited to this. According to the xvYCC Standard or the like, the value which can be assumed by the input signal is not defined. In this case, arbitrary settings as follows may be performed: regarding a three primary color display device, the value which the luminance level of each sub-pixel can have is set to −0.05 to 1.33, and the gray scale levels r, g and b is set to any of 355 gray scale levels from −65 to 290. In this case, where any of the gray scale levels r, g and b has a negative value, the multi-primary color display panel 110 can represent a color outside the range of reproducible colors when the gray scale levels r, g and b are in the range of 0 to 255.

Figure 29:
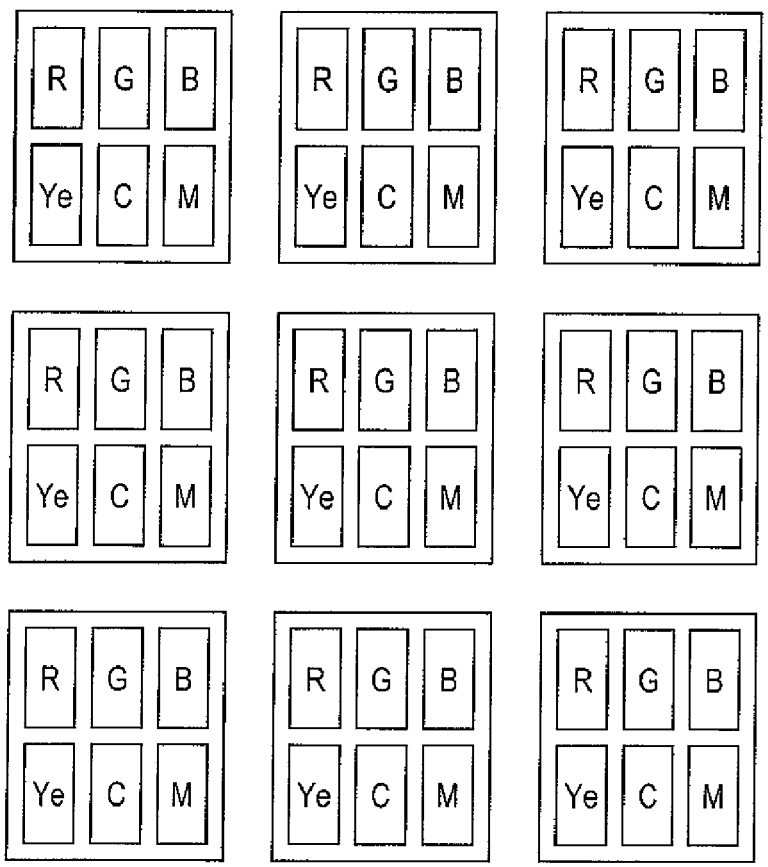
FIG. 29 is a schematic view showing another arrangement of sub-pixels provided in a multi-primary color display panel in the multi-primary color display device in Embodiment 1.

In the above description, the sub-pixels belonging to one pixel are arranged in one line in the row direction, but the present invention is not limited to this. The sub-pixels belonging to one pixel may be arranged in one line in the row direction and also in one line in the column direction. Alternatively, the sub-pixels belonging to one pixel may be arranged in a plurality of rows and a plurality of columns. For example, as shown in FIG. 29, the sub-pixels belonging to one pixel may be arranged in two lines.

Embodiment 2

Hereinafter, a multi-primary color display device in Embodiment 2 according to the present invention will be described.

Figure 30:
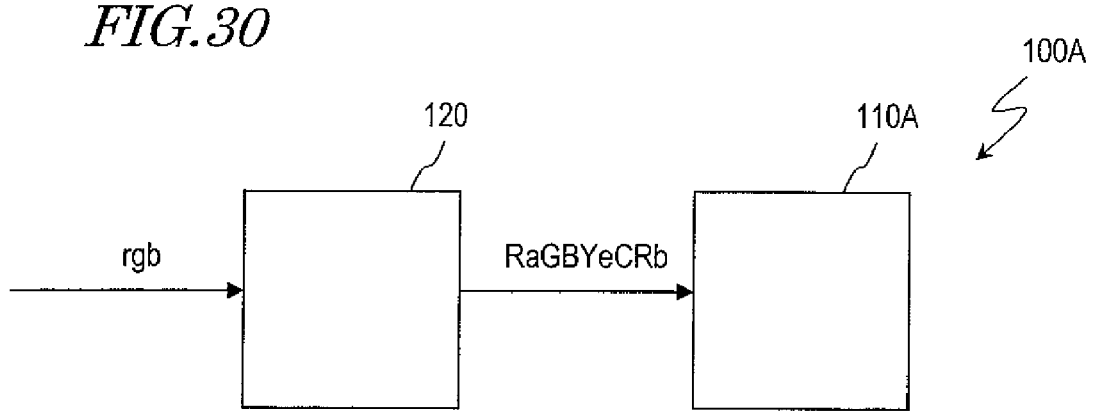
FIG. 30 is a schematic view of a multi-primary color display device in Embodiment 2 according to the present invention.
Figure 31:
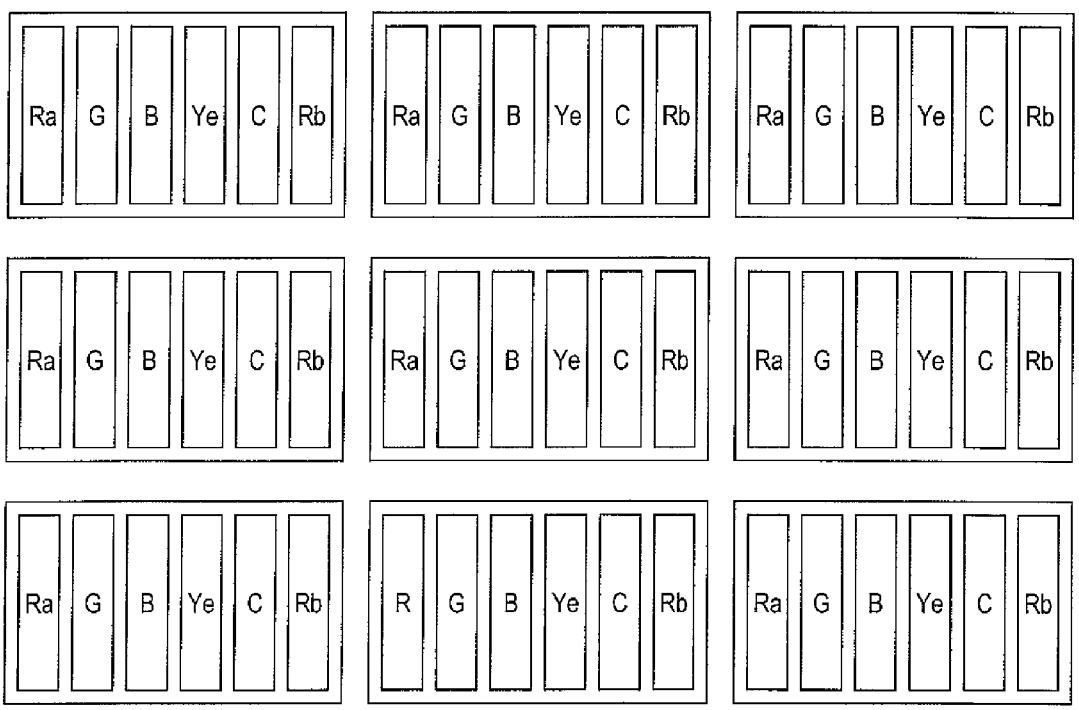
FIG. 31 is a schematic view showing an arrangement of the plurality of sub-pixels provided in a multi-primary color display panel in the multi-primary color display device in Embodiment 2.

FIG. 30 is a schematic view of a multi-primary color display device 100A in this embodiment. FIG. 31 shows an arrangement of a plurality of sub-pixels provided in a multi-primary color display panel 110A. The display device 100A in this embodiment has substantially the same structure as that of the display device in Embodiment 1 except that pixels each include another red sub-pixel instead of the magenta sub-pixel. The same description will not be provided in order to avoid redundancy.

FIG. 31 shows an arrangement of the pixels and the sub-pixels included in the pixels. FIG. 31 shows pixels in three rows and three columns as an example. In the multi-primary color display panel 110A, six types of sub-pixels, namely, a red sub-pixel Ra, a green sub-pixel G, a blue sub-pixel B, a yellow sub-pixel Ye, a cyan sub-pixel C and a red sub-pixel Rb are provided. In the following description of this specification, the red sub-pixel Ra will be referred to also as the "first red sub-pixel", and the red sub-pixel Rb will be referred to also as the "second red sub-pixel". As can be seen, in the multi-primary color display panel 110A, each pixel includes six types of sub-pixels, but the number of primary colors is five. Such an arrangement of the sub-pixels is disclosed in, for example, Patent Document 3.

Here, the second red sub-pixel Rb is produced in substantially the same manner as the first red sub-pixel Ra. The hue and the chroma of the second red sub-pixel are equal to those of the first red sub-pixel Ra. However, the second red sub-pixel Rb is connected to a different signal line (not shown) from that of the first red sub-pixel Ra, and the second red sub-pixel Rb is controllable independently from the first red sub-pixel Ra.

When the number of primary colors used for display is increased, the number of sub-pixels per pixel increases. Therefore, the area size of each sub-pixel is naturally decreased, and so the lightness of the color displayed by each sub-pixel (corresponding to the Y value in the XYZ colorimetric system) is decreased. For example, when the number of primary colors used for display is increased from 3 to 6, the area size of each sub-pixel becomes about half, and so the lightness (Y value) of each sub-pixel becomes about half. "Lightness" is one of three elements defining a color together with "hue" and "chroma". By increasing the number of primary colors, the range of reproducible colors in the xy-chromaticity diagram (namely, the range of "hue" and "chroma" which can be represented) is broadened, but the "lightness" is decreased. For this reason, the actual range of reproducible colors (range of reproducible colors including the "lightness") cannot be sufficiently broadened. Especially when the area size of the red sub-pixel is decreased, the Y value of red is decreased. Thus, only dark red can be displayed, and red of a physical object cannot be sufficiently represented.

By contrast, in the multi-primary color display panel 110A of the display device 100A in this embodiment, two out of six types of sub-pixels (first red sub-pixel Ra and second red sub-pixel Rb) represent red. Therefore, the lightness (Y value) of red can be improved, and so bright red can be displayed. Accordingly, the range of reproducible colors including the hue and chroma represented on the xy-chromaticity diagram and also the lightness can be broadened. In the multi-primary color display panel 110A, the magenta sub-pixel is not provided, but magenta of a physical object can be sufficiently represented by additive color mixture using the first and second red sub-pixels Ra and Rb and the blue sub-pixel B. Regarding the sub-pixels belonging to two pixels adjacent to each other in the row direction, the order in which the first red sub-pixel Ra, the green sub-pixel G, the blue sub-pixel B, the yellow sub-pixel Ye, the cyan sub-pixel C and the second red sub-pixel Rb are arranged in the row direction in one pixel is the same as the order in the other pixel. The sub-pixels are periodically arranged.

A multi-primary color signal generated by the multi-primary color signal generation section 120 shown in FIG. 30 represents gray scale levels of the sub-pixels in the multi-primary color display panel 110A. The gray scale levels of the first red, green, blue, yellow, cyan and the second red sub-pixels will be represented also as Ra, G, B, Ye, C and Rb, respectively. In FIG. 30, the gray scale levels Ra, G, B, Ye, C and Rb are collectively represented as "RaGBYeCRb". Values of Ra, G, B, Ye, C and Rb are respectively gray scale levels corresponding to the luminance values of the six types of sub-pixels. For example, when the color of the pixel is black, the gray scale levels Ra, G, B, Ye, C and Rb are all the minimum gray scale level (for example, gray scale level 0). The luminance levels of the sub-pixels, i.e., $Y_{Ra}, Y_G, Y_B, Y_{Ye}, Y_C$ and $Y_{Rb}$ are represented as "0". By contrast, when the color of the pixel is white, the gray scale levels Ra, G, B, Ye, C and Rb are all the maximum gray scale level (for example, gray scale level 255). The luminance levels of the sub-pixels, i.e., $Y_{Ra}, Y_G, Y_B, Y_{Ye}, Y_C$ and $Y_{Rb}$ are "1".

The multi-primary color signal generation section 120 obtains the gray scale levels Ra, G, B, Ye, C and Rb based on, for example, the gray scale levels rgb of an input signal for a three primary color display device. As can be seen, the multi-primary color signal generation section 120 converts the gray scale levels rgb of the input signal, which is expressed three-dimensionally, into the gray scale levels RaGBYeCRb in order to provide a multi-primary color display.

Here, the color filter for the first red sub-pixel is formed of substantially the same material as that for the second red sub-pixel, and the hue of the first red sub-pixel Ra is equal to that of the second red sub-pixel Rb. The voltage applied to the liquid crystal layer of the first red sub-pixel Ra is equal to the voltage applied to the liquid crystal layer of the second red sub-pixel Rb. The color displayed by the first red sub-pixel Ra is equal to the color displayed by the second red sub-pixel Rb. Therefore, in the following description, the gray scale level (for example, 0 to 255) and the luminance level ("0" to "1") of the red sub-pixel respectively indicate the gray scale level and the luminance level of the entirety of the two red sub-pixels, unless otherwise specified.

Figure 32:
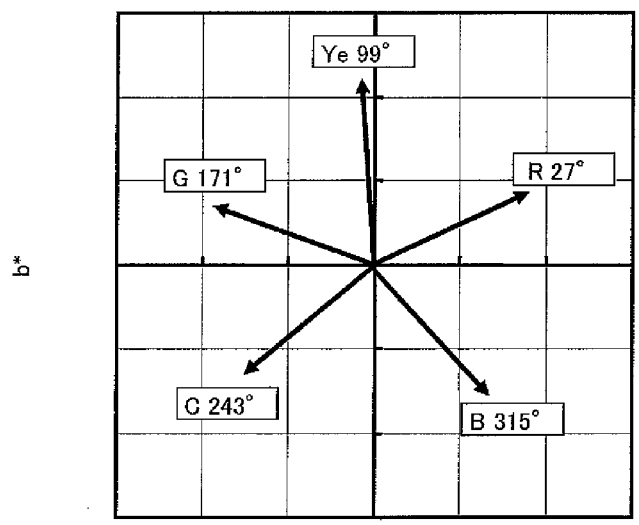
FIG. 32 is a schematic view showing the a*b* plane of the L*a*b* colorimetric system in which a* and b* are plotted regarding the color of each sub-pixel in the multi-primary color display device in Embodiment 2.

FIG. 32 is a schematic view showing the a*b* plane of the L*a*b* colorimetric system in which a* and b* are plotted regarding the color of each of the sub-pixels in the multi-primary color display panel 110A of the multi-primary color display device 100A in this embodiment. FIG. 32 shows hue angles of the colors each displayed only by each one of the sub-pixels. Here, R is 27°, Ye is 99°, G is 171°, C is 243°, and B is 315°. As can be understood from the comparison with FIG. 3, the hue angles of the sub-pixels in the multi-primary color display panel 110A are slightly different from those in FIG. 3 even for the same color. The reason for this is that the pixel design for realizing highly efficient color reproducibility is different depending on the number or colors of the sub-pixels.

Now, with reference to FIG. 32, the closeness and fairness between the hues of the sub-pixels will be discussed. As described above, the closeness and fairness between the hues are represented by the difference between the hue angles. With respect to the hue (G) of the green sub-pixel as the reference, the closeness of the hues of the other sub-pixels will be discussed. The hues closest to the hue (G) are (Ye) and (C) (hue angle difference: 72°). The next closest hues are (R) and (B) (hue angle difference: 144°). Here, (Ye) is in the clockwise direction with respect to (G). (C) is in the counter-clockwise direction with respect to (G). Namely, on the a*b* plane of the L*a*b* colorimetric system, (C) is on the opposite side to (Ye) with respect to (G). On the a*b* plane of the L*a*b* colorimetric system, (R) is on the same side as (Ye) with respect to (G), and (B) is on the same side as (C) with respect to (G). On the a*b* plane of the L*a*b* calorimetric system, (Ye) is closest to (G) in the clockwise direction, and (C) is closest to (G) in the counterclockwise direction. As can be seen, (Ye) and (C) are adjacent to (G) on both sides thereof on the a*b* plane of the L*a*b* calorimetric system.

Now, advantages of the display device 100A in this embodiment will be described as compared with display devices in Comparative examples 4 through 6. The display devices in Comparative examples 4 through 6 each include a multi-primary color display panel substantially the same as that of the multi-primary color display panel 110A of the display device 100A in this embodiment, but are different in the manner in which the luminance values of the sub-pixels change.

Hereinafter, changes of the luminance values of the sub-pixels in the display devices in Comparative examples 4 through 6 and the display device 100A in the case where the color displayed by the pixel changes from black to white via the optimal color of the hue (G) will be described.

First, the display device in Comparative example 4 will be described. As described above with reference to FIG. 65, in a three primary color display device, after the luminance value of the green sub-pixel reaches "1", the luminance values of the other sub-pixels (namely, the red and blue sub-pixels) start to be increased at the same time. In the display device in Comparative example 4, after the luminance value of the green sub-pixel reaches "1", the luminance values of the other sub-pixels (namely, the yellow, cyan, red and blue sub-pixels) start to be increased at the same time like in the three primary color display device.

Figure 33:
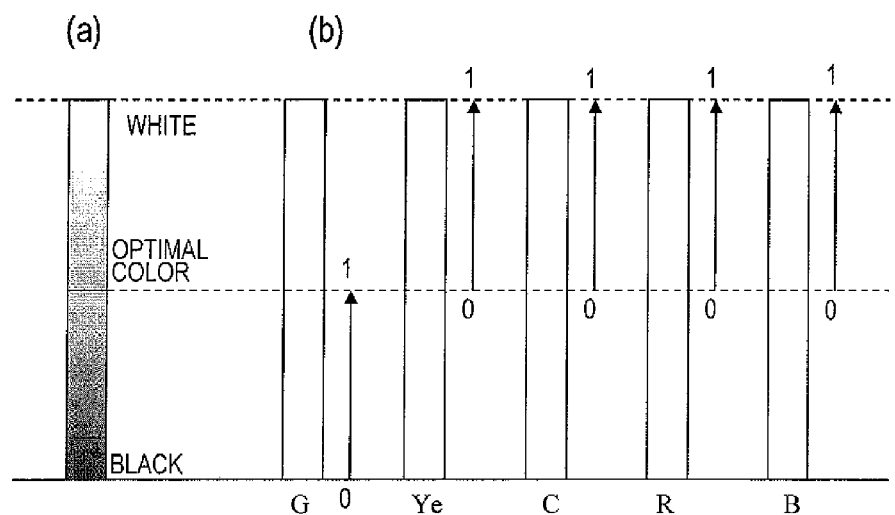
FIG. 33 is a schematic view for explaining the relationship between the change of the luminance value of each sub-pixel and the change of the color displayed by the pixel in a display device in Comparative example 4; (a) shows the change of the color displayed by the pixel, and (b) shows the changes of the luminance values of the green, yellow, cyan, red and blue sub-pixels.

FIG. 33 is a schematic view for explaining the relationship between the change of the luminance value of each sub-pixel and the change of the color displayed by the pixel in the display device in Comparative example 4. FIG. 33(a) shows the change of the color displayed by the pixel, and FIG. 33(b) shows the changes of the luminance values of the green, yellow, cyan, red and blue sub-pixels.

In the display device in Comparative example 4 also, in an initial state, the luminance values of all the sub-pixels, namely, the green, yellow, cyan, red and blue sub-pixels are "0". The color displayed by the pixel is black. First, the luminance value of the green sub-pixel starts to be increased. As the luminance value of the green sub-pixel increases, the chroma and the lightness of the color displayed by the pixel increase.

In the display device in Comparative example 4, after the luminance value of the green sub-pixel reaches "1", the luminance values of the other sub-pixels (namely, the yellow, cyan, red and blue sub-pixels) start to be increased at the same time as shown in FIG. 33(b). The luminance values of the yellow, cyan, red and blue sub-pixels increase at an equal increasing rate. In this case also, by the increase of the luminance values of the sub-pixels, the lightness of the color displayed by the pixel increases. When the luminance values of all the sub-pixels become "1", the color displayed by the pixel is white.

Figure 34:
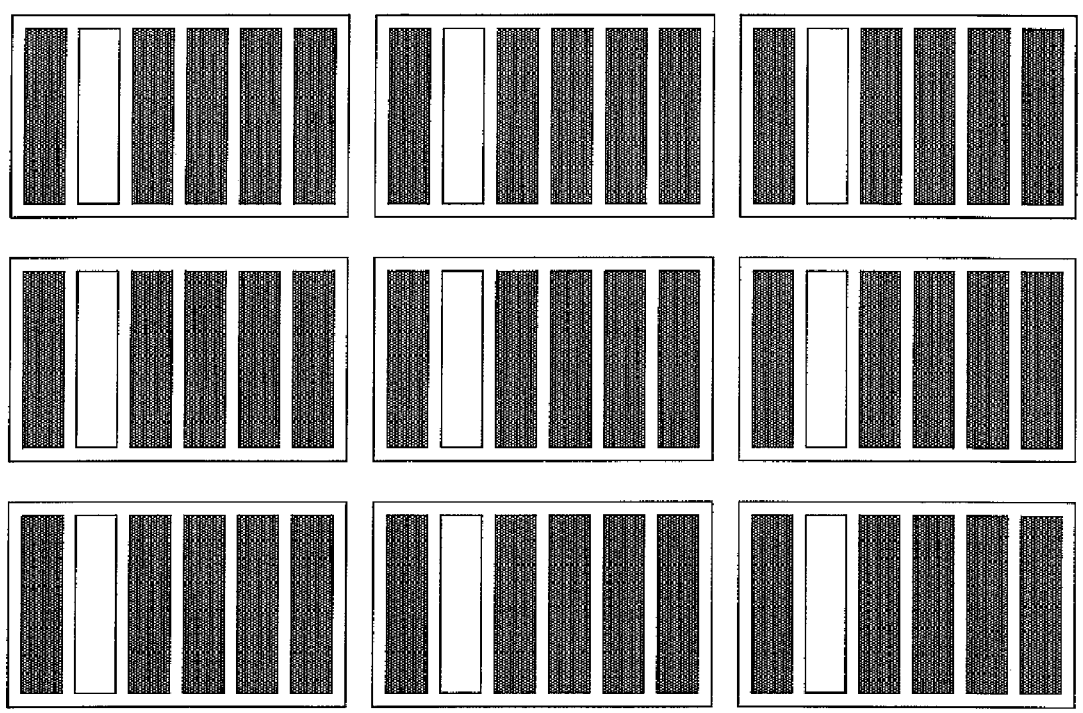
FIG. 34 is a schematic view showing a lit-up/non-lit-up state of the sub-pixels in the display device in Comparative example 4.

In such a display device in Comparative example 4, while the color displayed by the pixel changes from black to the optimal color of the hue (G), only the green sub-pixel is lit up and the other sub-pixels are not lit up. In this case, as shown in FIG. 34, the area size occupied by the non-lit-up sub-pixels with respect to one pixel is large. The non-lit-up sub-pixels appear to display black. It is misapprehended that black is also displayed in addition to green. Especially in a structure in which the sub-pixels belonging to one pixel are arranged in one row, in the case where the pixels in one column each display the optimal color of the hue (G), thick black lines appear to be displayed in addition to thin green lines.

Now, a display device in Comparative example 5 will be described. In the display device in Comparative example 5, after the color displayed by the pixel becomes the optimal color of the hue (G), the luminance values of the yellow and cyan sub-pixels start to be increased. The display device in Comparative example 5 corresponds to the display device disclosed in Patent Document 3.

Figure 35:
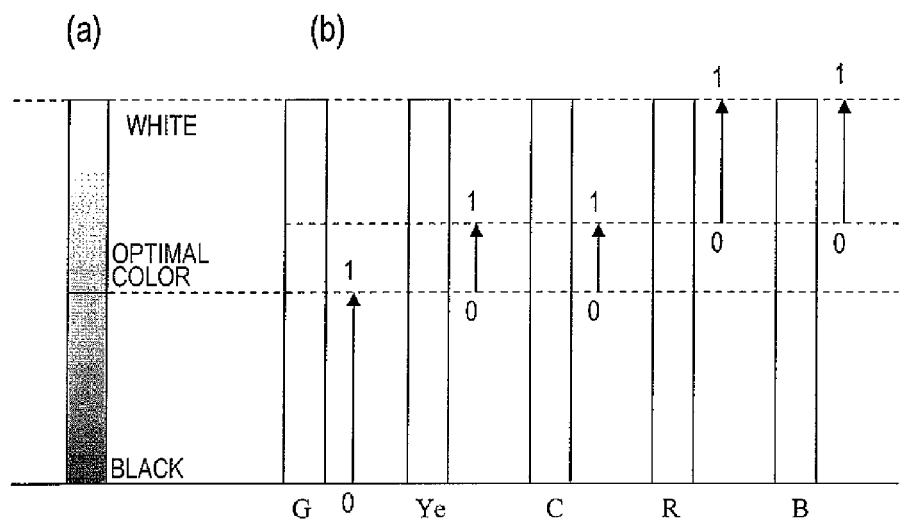
FIG. 35 is a schematic view for explaining the relationship between the change of the luminance value of each sub-pixel and the change of the color displayed by the pixel in a display device in Comparative example 5; (a) shows the change of the color displayed by the pixel, and (b) shows the changes of the luminance values of the green, yellow, cyan, red and blue sub-pixels.

FIG. 35 is a schematic view for explaining the relationship between the change of the luminance value of each sub-pixel and the change of the color displayed by the pixel in the display device in Comparative example 5. FIG. 35(a) shows the change of the color displayed by the pixel, and FIG. 35(b) shows the changes of the luminance values of the green, yellow, cyan, red and blue sub-pixels.

In the display device in Comparative example 5 also, in an initial state, the luminance values of all the sub-pixels, namely, the green, yellow, cyan, red and blue sub-pixels are "0". The color displayed by the pixel is black. First, the luminance value of the green sub-pixel starts to be increased. As the luminance value of the green sub-pixel increases, the chroma and the lightness of the color displayed by the pixel increase. When the luminance value of the green sub-pixel reaches "1", the color displayed by the pixel is the optimal color of the hue (G).

When reaching "1", the luminance value of the green sub-pixel is kept "1". Next, the luminance values of the yellow and cyan sub-pixels start to be increased. The increasing rates of the luminance values of the yellow and cyan sub-pixels are set so as not to change the hue (G). Here, the increasing rare of the luminance value of the yellow sub-pixel is equal to that of the cyan sub-pixel.

Since the increasing rate of the luminance value of the yellow sub-pixel is equal to that of the cyan sub-pixel, the luminance values of the yellow and cyan sub-pixels reach "1" at the same time. When reaching "1", the luminance values of the yellow and cyan sub-pixels are kept "1". Next, the luminance values of the red and blue sub-pixels start to be increased. The increasing rates of the luminance values of the red and blue sub-pixels are set so as not to change the hue (G). When the luminance values of the red and blue sub-pixels increase and reach "1", the color displayed by the pixel is white.

The display device in Comparative example 5 utilizes the wide range of reproducible colors more effectively than the display device in Comparative example 4. A conceivable reason for this is as follows. After the luminance value of the green sub-pixel reaches "1", in order to further increase the lightness of the pixel, the luminance values of the sub-pixels corresponding to the other hues need to be increased. Whichever sub-pixel may be increased in the luminance value, the chroma of the color displayed by the pixel is decreased. When the luminance value of the sub-pixel, among the sub-pixels, corresponding to a hue far from the hue (G) is increased, the chroma of green is significantly decreased. By contrast, when the luminance value of the sub-pixel corresponding to a hue close to the hue (G) is increased, the chroma of green is not much decreased. Therefore, when the luminance value of the sub-pixel corresponding to a hue close to the hue (G) starts to be increased earlier than the sub-pixel corresponding to a hue far from the hue (G), the decrease of the chroma can be suppressed and the lightness can be increased. As a result, in the display device in Comparative example 4, the chroma is relatively low at a lightness higher than that of the optimal color; whereas in the display device in Comparative example 5, the chroma is relatively high even at a lightness higher than that of the optimal color. Therefore, the display device in Comparative example 5 can represent a color having a high chroma, which cannot be represented by the display device in Comparative example 4.

Figure 36:
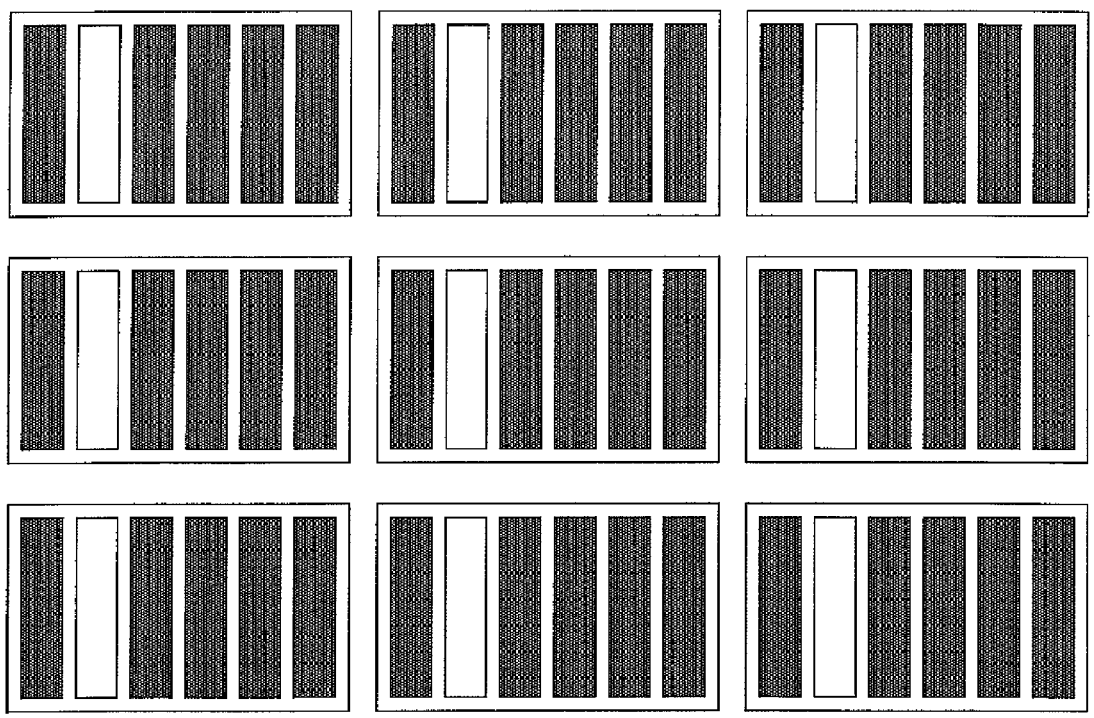
FIG. 36 is a schematic view showing a lit-up/non-lit-up state of the sub-pixels in the display device in Comparative example 5.

However, in the display device in Comparative example 5, while the color displayed by the pixel changes from black to the optimal color of the hue (G), only the green sub-pixel is lit up and the other sub-pixels are not lit up. In this case, as shown in FIG. 36, the area size occupied by the non-lit-up sub-pixels with respect to one pixel is large. The non-lit-up sub-pixels appear to display black. It is misapprehended that black is also displayed in addition to green. Especially in a structure in which the sub-pixels belonging to one pixel are arranged in one row, in the case where the pixels in one column each display the optimal color of the hue (G), thick black lines appear to be displayed in addition to thin green lines.

By contrast, in Comparative example 6, while the color displayed by the pixel changes from black to the optimal color of the hue (G), the luminance values of the green, yellow and cyan sub-pixels start to be increased. Hereinafter, the display device in Comparative example 6 will be described with reference to FIG. 37.

Figure 37:
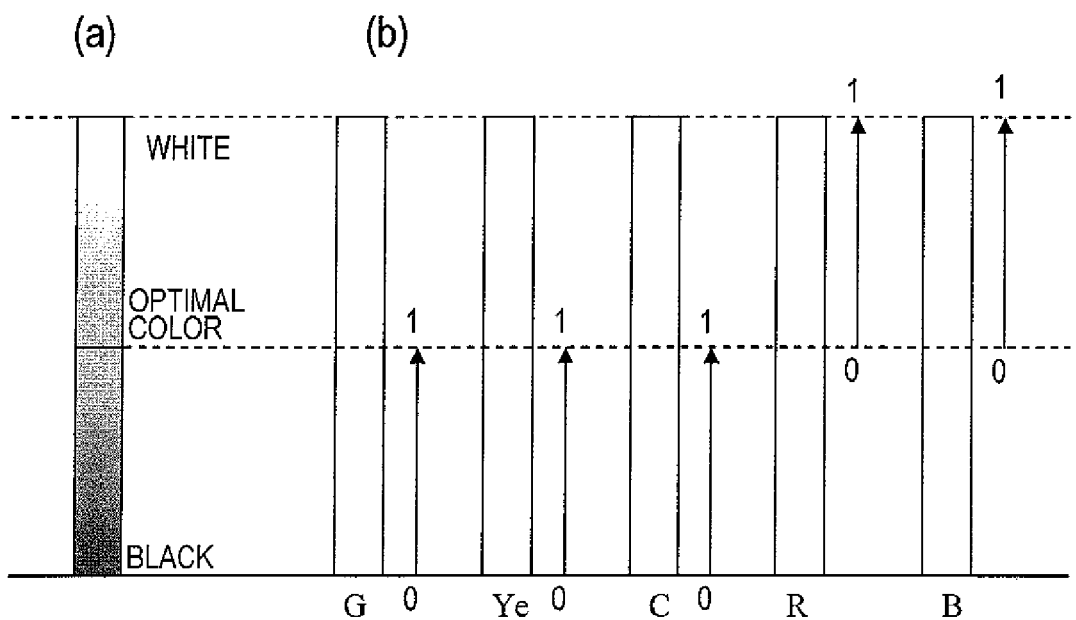
FIG. 37 is a schematic view for explaining the relationship between the change of the luminance value of each sub-pixel and the change of the color displayed by the pixel in a display device in Comparative example 6; (a) shows the change of the color displayed by the pixel, and (b) shows the changes of the luminance values of the green, yellow, cyan, red and blue sub-pixels.

FIG. 37 is a schematic view for explaining the relationship between the change of the luminance value of each sub-pixel and the change of the color displayed by the pixel in the display device in Comparative example 6. FIG. 37(a) shows the change of the color displayed by the pixel, and FIG. 37(b) shows the changes of the luminance values of the green, yellow, cyan, red and blue sub-pixels.

In the display device in Comparative example 6 also, in an initial state, the luminance values of all the sub-pixels, namely, the green, yellow, cyan, red and blue sub-pixels are "0". The color displayed by the pixel is black. First, the luminance value of the green sub-pixel starts to be increased. Together with the luminance value of the green sub-pixel, the luminance values of the yellow and cyan sub-pixels are increased. In the display device in Comparative example 6, the luminance values of the green, yellow and cyan sub-pixels increase at an equal increasing rate. The luminance values of the green, yellow and cyan sub-pixels are set so as not to change the hue (G) as increasing. As the luminance values of the green, yellow and cyan sub-pixels increase, the chroma and the lightness of the color displayed by the pixel increase.

When increasing and reaching "1", the luminance values of the green, yellow and cyan sub-pixels are kept "1". At this point, the color displayed by the pixel is the optimal color of the hue (G). Next, the luminance values of the red and blue sub-pixels start to be increased. The rates of increase of the luminance values of the red and blue sub-pixels are set so as not to change the hue (G). Here again, the rate of increase of the luminance value of the red sub-pixel is equal to that of the blue sub-pixel. When the luminance values of the red and blue sub-pixels increase and reach "1", the color displayed by the pixel is white.

As can be understood from the comparison with Comparative examples 4 and 5 described above, in the display device in Comparative example 6, while the color displayed by the pixel changes from black to the optimal color of the hue (G), the green, yellow and cyan sub-pixels are lit up. This suppresses the misapprehension. However, the display device in Comparative example 6 does not utilize the wide range of reproducible colors effectively. As can be understood from the above description, when compared at substantially the same luminance level, the chroma of green displayed by the yellow and cyan sub-pixels is lower than the chroma of green displayed by the green sub-pixel. The display device in Comparative example 6 cannot represent a color having a high chroma especially at a low lightness.

In the display device 100A in this embodiment, like in the display device in Comparative example 6, while the color displayed by the pixel changes from black to the optimal color of the hue (G), the luminance value of the green sub-pixel is increased, and also the luminance values of the yellow and cyan sub-pixels corresponding to two hues adjacent to the hue (G) (namely, (Ye) and (C)) are increased.

Now, with reference to FIG. 32, the closeness between the hue (G) of the green sub-pixel and the hues of the other sub-pixels will be discussed. With respect to the hue (G) as the reference, the closeness of the other hues will be discussed. The hues closest to the hue (G) are (Ye) and (C) (hue angle difference: 72°). The next closest hues are (R) and (B) (hue angle difference: 144°).

(Ye) is in the clockwise direction with respect to (G). (C) is in the counterclockwise direction with respect to (G). Namely, on the a*b* plane of the L*a*b* calorimetric system, (C) is on the opposite side to (Ye) with respect to (G). On the a*b* plane of the L*a*b* calorimetric system, (R) is on the same side as (Ye) with respect to (G), and (B) is on the same side as (C) with respect to (G). On the a*b* plane of the L*a*b* calorimetric system, (Ye) is closest to (G) in the clockwise direction, and (C) is closest to (G) in the counterclockwise direction. In the above, the closeness of the hues (Ye), (C), (R) and (B) with respect to the hue (G) has been discussed with reference to the a*b* plane of the L*a*b* colorimetric system. Alternatively, the hues (R), (Ye), (G), (C) and (B) may be put on a hue circle to discuss the closeness of the hues (R), (Ye), (C) and (B) with respect to the hue (G).

Figure 38:
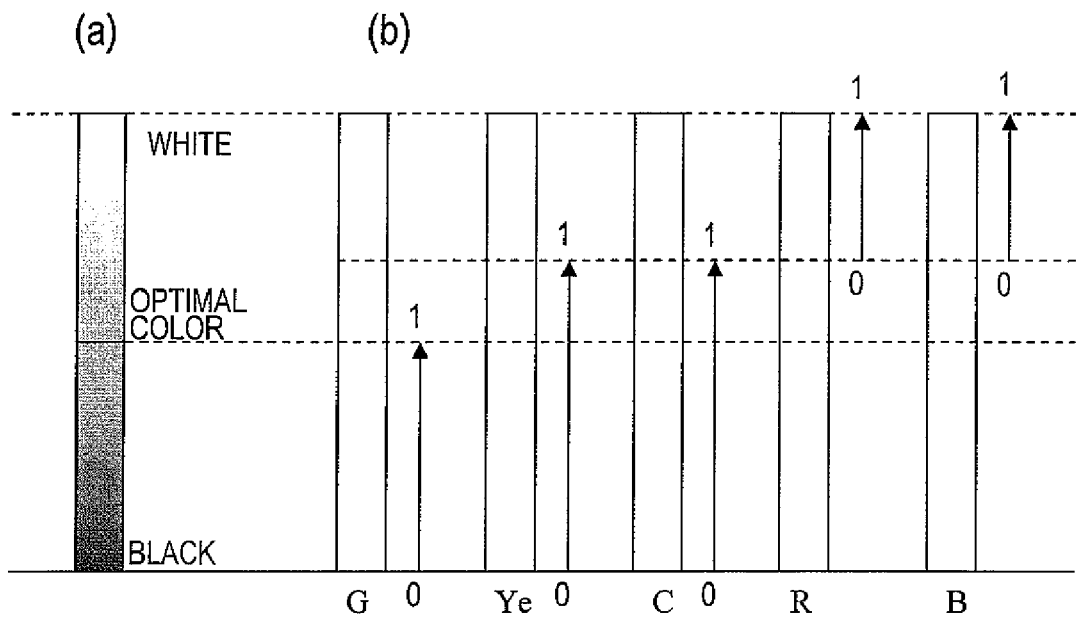
FIG. 38 is a schematic view for explaining the relationship between the change of the luminance value of each sub-pixel and the change of the color displayed by the pixel in the multi-primary color display device in Embodiment 2; (a) shows the change of the color displayed by the pixel, and (b) shows the changes of the luminance values of the green, yellow, cyan, red and blue sub-pixels.

Hereinafter, with reference to FIG. 38, changes of the luminance values of the sub-pixels in the display device 100A in the case where the color displayed by the pixel changes from black to white via the optimal color of the hue (G) will be described. FIG. 38 is a schematic view for explaining the relationship between the change of the luminance value of each sub-pixel and the change of the color displayed by the pixel in the display device in the display device 100A in this embodiment. FIG. 38(a) shows the change of the color displayed by the pixel, and FIG. 38(b) shows the changes of the luminance values of the green, yellow, cyan, red and blue sub-pixels.

In an initial state, the luminance values of all the sub-pixels, namely, the green, yellow, cyan, red and blue sub-pixels are "0". The color displayed by the pixel is black. First, the luminance value of the green sub-pixel starts to be increased, and also the luminance values of the yellow and cyan sub-pixels start to be increased. On the a*b* plane of the L*a*b* colorimetric system shown in FIG. 32, the yellow sub-pixel corresponds to the hue (Ye) closest to the hue (G) in the clockwise direction, and the cyan sub-pixel corresponds to the hue (C) closest to the hue (G) in the counterclockwise direction.

Here, together with the luminance value of the green sub-pixel, the luminance values of the yellow and cyan sub-pixels are increased at an increasing rate lower than that of the green sub-pixel. The increasing rates of the luminance values of the yellow and cyan sub-pixels are set so as not to change the hue (G). Here, the increasing rate of the luminance value of the yellow sub-pixel is equal to that of the cyan sub-pixel.

Ideally, the luminance values of the yellow and cyan sub-pixels start to be increased at the same time as the luminance value of the green sub-pixel. However, as described above, the increasing rate of the luminance value of the green sub-pixel is higher than those of the yellow and cyan sub-pixels. Therefore, in actuality, as a result of quantization or the like of the numerical values in a circuit embodying this control, the luminance value of the green sub-pixel may first start to be increased, and then the luminance values of the yellow and cyan sub-pixels may start to be increased.

As the luminance values of the green, yellow and cyan sub-pixels increase, the chroma and the lightness of the color displayed by the pixel increase. When the luminance value of the green sub-pixel reaches "1", the color displayed by the pixel is the optimal color of the hue (G). At this point, the luminance values of the green, yellow, cyan, red and blue sub-pixels are respectively "1". "0.31", "0.31", "0" and "0".

When reaching "1", the luminance value of the green sub-pixel is kept "1". Then, in order to further increase the lightness of the pixel, the luminance values of the yellow and cyan sub-pixels are kept increasing. Since the increasing rate of the luminance value of the yellow sub-pixel is equal to that of the cyan sub-pixel, the luminance values of the yellow and cyan sub-pixels reach "1" at the same time. When reaching "1", the luminance value of the yellow sub-pixel is kept "1". Next, the luminance value of the red sub-pixel corresponding to (R), which is in the clockwise direction with respect to the hue (G) like the hue (Ye) and is closest to the hue (G) next to the hue (Ye) on the a*b* plane of the L*a*b* colorimetric system, and the luminance value of the blue sub-pixel corresponding to (B), which is in the counterclockwise direction with respect to the hue (G) like the hue (C) and is closest to the hue (G) next to the hue (C) on the a*b* plane of the L*a*b* colorimetric system, start to be increased. Here again, the increasing rates of the luminance values of the red and blue sub-pixels are set so as not to change the hue (G).

When the luminance values of the red and blue sub-pixels increase and reach "1", the color displayed by the pixel is white. At this point, the luminance values of the green, yellow, cyan, red and blue sub-pixels are respectively, "1", "1", "1", "1", and "1".

Now, the display devices in Comparative examples 4 and 5 and the display device 100A in this embodiment will be compared. In the display devices in Comparative examples 4 and 5, while the color displayed by the pixel changes from black to the optimal color of the hue (G), only the luminance value of the green sub-pixel is increased. As shown in FIG. 34 and FIG. 36, only the green sub-pixel is lit up and the other sub-pixels are not lit up.

Figure 39:
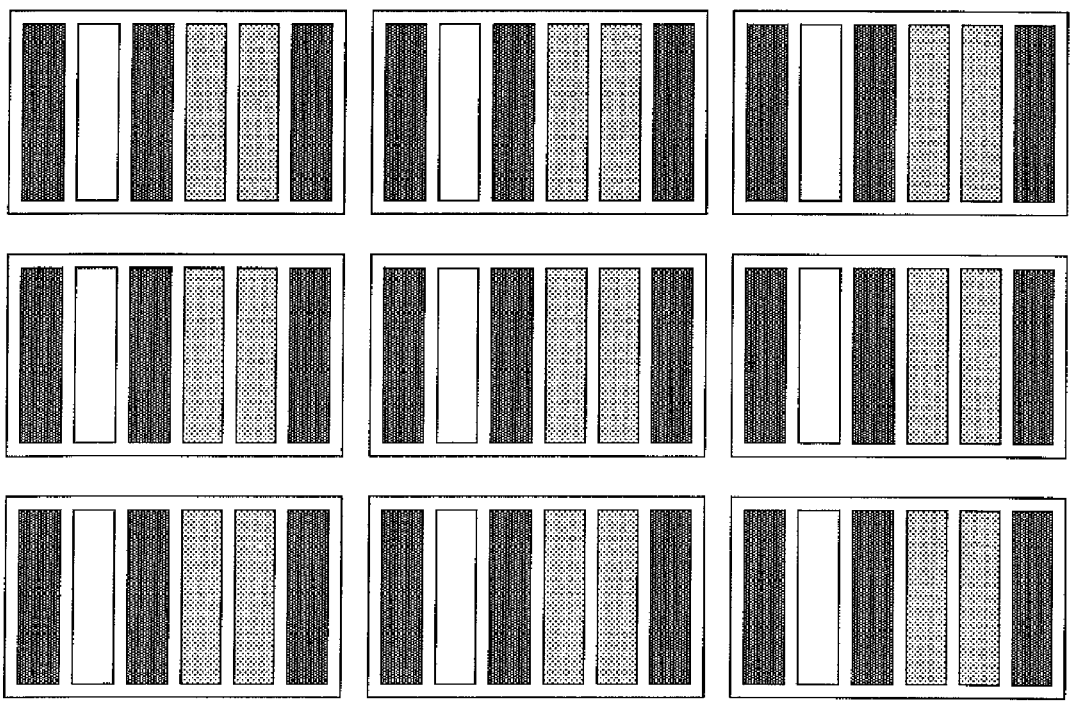
FIG. 39 is a schematic view showing a lit-up/non-lit-up state of the sub-pixels in the multi-primary color display device in Embodiment 2.

By contrast, in the display device 100A in this embodiment, while the color displayed by the pixel changes from black to the optimal color of the hue (G), the luminance value of the green sub-pixel is increased, and also the luminance values of the yellow and cyan sub-pixels are increased. As shown in FIG. 39, the green sub-pixel is lit up and also the yellow and cyan sub-pixels are lit up. Therefore, the area size occupied by the non-lit-up sub-pixels with respect to one pixel is small, and so the misapprehension is suppressed.

In order to light up the sub-pixels other than the green sub-pixel without changing the hue (G), while the color displayed by the pixel changes from black to the optimal color of the hue (G), the red and blue sub-pixels, for example, may be lit up in addition to the green sub-pixel. Alternatively, the red and blue sub-pixels may be lit up in addition to the green, yellow and cyan sub-pixels. However, like in the case of the display device in Comparative example 5 described above, when the luminance value of the sub-pixel corresponding to a hue far from the hue (G) is increased in order to raise the lightness, the chroma of green is significantly decreased. By contrast, when the luminance value of the sub-pixel corresponding to a hue close to the hue (G) is increased, the chroma of green is not much decreased. As described above, in the display device 100A in this embodiment, while the color displayed by the pixel changes from black to the optimal color of the hue (G), the yellow and cyan sub-pixels corresponding to the hues (Ye) and (C) adjacent to the hue (G) on both sides thereof are lit up in addition to the green sub-pixel. This suppresses the decrease of the chroma.

For displaying the optimal color of the hue (G), the gray scale levels of the sub-pixels in the display device in Comparative example 6 are (R, G, B, Ye, C)=(0, 255, 0, 255, 255). By contrast, the gray scale levels of the sub-pixels in the display device 100A in this embodiment are, for example, (R, G, B, Ye, C)=(0, 255, 0, 150, 150). In this case, the chroma of the optimal color in the display device 100A in this embodiment is higher than that in the display device in Comparative example 6. The reason for this is that as the luminance values of the other sub-pixels are more increased with respect to the luminance value of the green sub-pixel having the maximum gray scale level (maximum luminance level), the chroma of the pixel is decreased. As can be seen, the display device 100A in this embodiment utilizes the range of reproducible colors more effectively than the display device in Comparative example 6. Specifically, at a lightness higher than that of the optimal color displayable by the display device 100A, the upper limit of the chroma displayable by the display device 100A is equal to that displayable by the display device in Comparative example 6. However, at a lightness lower than that of the optimal color displayable by the display device 100A, the upper limit of the chroma displayable by the display device 100A is higher than that displayable by the display device in Comparative example 6.

For displaying the optimal color of, for example, the hue (G), the gray scale levels of the sub-pixels in the display devices in Comparative examples 4 and 5 are (R, G, B, Ye, C)=(0, 255, 0, 0, 0). By contrast, the gray scale levels of the sub-pixels in the display device 100A in this embodiment are, for example, (R, G, B, Ye, C)=(0, 255, 0, 150, 150). In this case, the chroma of the optimal color in the display device 100A in this embodiment is lower than those in the display devices in Comparative examples 4 and 5. The reason for this is that as the luminance values of the other sub-pixels are more increased with respect to the luminance value of the green sub-pixel having the maximum gray scale level, the chrome of the pixel is decreased. As can be seen, the display devices in Comparative examples 4 and 5 utilize the range of reproducible colors more effectively than the display device 100A in at least a part of the lightness range. At a lightness lower than that of the optimal color displayable by the display device in Comparative example 4, the upper limit of the chroma displayable by the display device in Comparative example 4 is hither than that displayable by the display device 100A. At a lightness lower than that of the optimal color displayable by the display device 100A, the upper limit of the chroma displayable by the display device in Comparative example 5 is higher than that displayable by the display device 100A.

In the above description, the increasing rate of the luminance value of the yellow sub-pixel is equal to that of the cyan sub-pixel, but the present invention is not limited to this. It is sufficient that the increasing rates of the luminance values of the yellow and cyan sub-pixels are set so as not to change the hue (G) of the color displayed by the pixel. For example, in the case where the hue of the color displayed by the pixel changes from the hue (G) toward the hue (C) if the luminance value of the yellow sub-pixel and the luminance value of the cyan sub-pixel are increased at an equal increasing rate, the increasing rate of the luminance value of the yellow sub-pixel is set to be higher than that of the cyan sub-pixel. Hereinafter, with reference to FIG. 40, changes of the luminance values of the sub-pixels in the display device 100A in this embodiment in the case where the color displayed by the pixel changes from black to white via the optimal color of the hue (G) will be described.

In an initial state, the luminance values of all the sub-pixels, namely, the green, yellow, cyan, red and blue sub-pixels are "0". The color displayed by the pixel is black. In the display device 100A, the luminance value of the green sub-pixel is increased, and also the luminance values of the yellow and cyan sub-pixels are increased at an increasing rate lower than that of the green sub-pixel.

The increasing rates of the luminance values of the yellow and cyan sub-pixels are set so as not to change the hue (G) of the color displayed by the pixel. Here, the increasing rate of the luminance value of the yellow sub-pixel is higher than that of the cyan sub-pixel. It should be noted that as described above, as a result of quantization or the like of the numerical values in a circuit embodying this control, the luminance value of the green sub-pixel may first start to be increased, and then the luminance values of the yellow and cyan sub-pixels may start to be increased.

As the luminance values of the green, yellow and cyan sub-pixels increase, the chroma and the lightness of the color displayed by the pixel increase. When the luminance value of the green sub-pixel reaches "1", the color displayed by the pixel is the optimal color of the hue (G). When reaching "1", the luminance value of the green sub-pixel is kept "1". Next, in order to further increase the lightness of the pixel, the luminance values of the yellow and cyan sub-pixels are kept increasing.

Since the increasing rate of the luminance value of the yellow sub-pixel is higher than that of the cyan sub-pixel, the luminance value of the yellow sub-pixel reaches "1" before the luminance value of the cyan sub-pixel. When reaching "1", the luminance value of the yellow sub-pixel is kept "1". Next, the luminance value of the red sub-pixel starts to be increased. Here again, the increasing rate of the luminance value of the red sub-pixel is set so as not to change the hue (G) by the increase of the luminance values of the cyan and red sub-pixels.

The luminance value of the cyan sub-pixel reaches "1" before the luminance value of the red sub-pixel. When reaching "1", the luminance value of the cyan sub-pixel is kept "1". Next, the luminance value of the blue sub-pixel starts to be increased. Here again, the increasing rate of the luminance value of the blue sub-pixel is set so as not to change the hue (G) by the increase of the luminance values of the red and blue sub-pixels. When the luminance values of the red and blue sub-pixels increase and reach approximately at the same time, the color displayed by the pixel is white. As shown in FIGS. 40(a) and 40(b), by changing the luminance values of the sub-pixels, the color displayed by the pixel changes from black to white via the optimal color of the hue (G).

In the case where the number of primary colors is five and the luminance values of the two red sub-pixels are equal to each other, after the luminance values of the green, yellow and cyan sub-pixels reach "1", the luminance values of the red and blue sub-pixels reach "1" at the same time. As can be understood from this, when the increasing rate of the luminance value of the yellow sub-pixel is higher than that of the cyan sub-pixel, the increasing rate of the luminance value of the red sub-pixel, which starts to be increased next to the luminance value of the yellow sub-pixel, is lower than the increasing rate of the luminance value of the blue sub-pixel, which starts to be increased next to the luminance value of the cyan sub-pixel.

Figure 40:
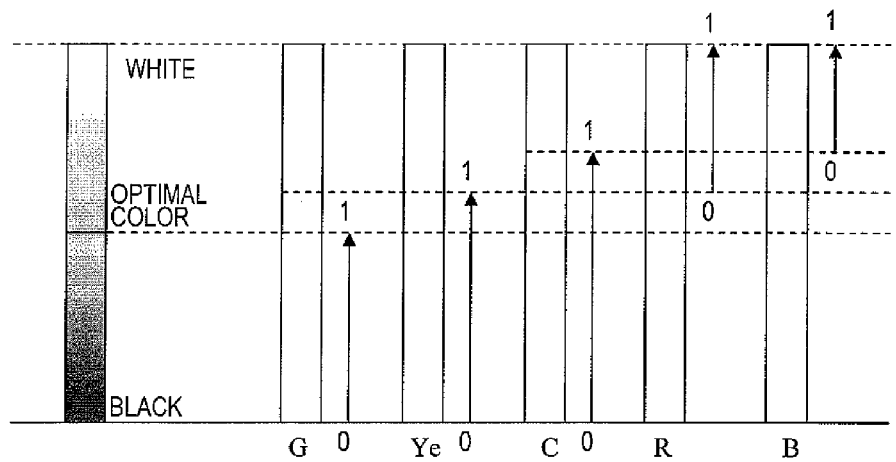
FIG. 40 is a schematic view for explaining the relationship between the change of the luminance value of each sub-pixel and the change of the color displayed by the pixel in the multi-primary color display device in Embodiment 2; (a) shows the change of the color displayed by the pixel, and (b) shows the changes of the luminance values of the green, yellow, cyan, red and blue sub-pixels.
Figure 41:
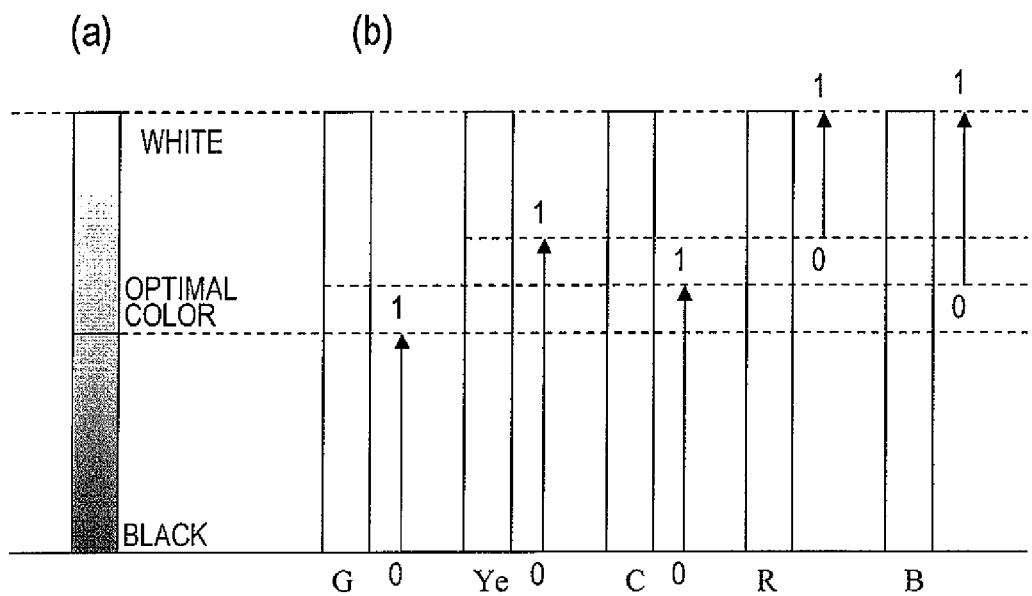
FIG. 41 is a schematic view for explaining the relationship between the change of the luminance value of each sub-pixel and the change of the color displayed by the pixel in the multi-primary color display device in Embodiment 2; (a) shows the change of the color displayed by the pixel, and (b) shows the changes of the luminance values of the green, yellow, cyan, red and blue sub-pixels.

In the above description given with reference to FIG. 40, the increasing rate of the luminance value of the yellow sub-pixel is higher than that of the cyan sub-pixel, but the present invention is not limited to this. The increasing rate of the luminance value of the cyan sub-pixel may be higher than that of the yellow sub-pixel. In this case, as shown in FIG. 41, after the luminance value of the green sub-pixel reaches "1", the luminance values of the yellow and cyan sub-pixels are kept increasing. Then, the luminance value of the cyan sub-pixel reaches "1" before the luminance value of the yellow sub-pixel. When reaching "1", the luminance value of the cyan sub-pixel is kept "1". Next, the luminance value of the blue sub-pixel starts to be increased. Here again, the increasing rate of the luminance value of the blue sub-pixel is set so as not to change the hue (G) by the increase of the luminance values of the yellow and blue sub-pixels.

The luminance value of the yellow sub-pixel reaches "1" before the luminance value of the blue sub-pixel. When reaching "1", the luminance value of the yellow sub-pixel is kept "1". Next, the luminance value of the red sub-pixel starts to be increased. Here again, the increasing rate of the luminance value of the red sub-pixel is set so as not to change the hue (G) by the increase of the luminance values of the blue and red sub-pixels. The changes of the luminance values of the sub-pixels after this are substantially the same as described above with reference to FIG. 38 and FIG. 40.

In the above description, the changes of the luminance values of the sub-pixels in the case where the color displayed by the pixel changes from black to white via the optimal color of the hue (G) are explained. In the case where the color displayed by the pixel changes from black to white via the optimal color of the hue (B), the luminance values of the sub-pixels change in substantially the same manner. For example, while the color displayed by the pixel changes from black to the optimal color of the hue (B), the blue sub-pixel is lit up, and also the two red sub-pixels and the cyan sub-pixel corresponding to the hues (R) and (C) adjacent to the hue (B) on both sides thereof are lit up.

In the display device 100A in this embodiment, the pixel includes the second red sub-pixel instead of the magenta sub-pixel. While the color displayed by the pixel changes from black to the optimal color of the hue (R), the two red sub-pixels are lit up. Therefore, the number of the non-lit-up sub-pixels is small and so the misapprehension is suppressed.

In the above description, the second red sub-pixel Rb is produced in substantially the same manner as the first red sub-pixel Ra, and the hue and the chroma of the second red sub-pixel Rb are equal to those of the first red sub-pixel Ra. The present invention is not limited to this. The second red sub-pixel Rb may be produced so as to have different hue and chroma from those of the first red sub-pixel Ra. In the above description, the two red sub-pixels belonging to one pixel have an equal luminance value, but the luminance values of the two red sub-pixels may be different from each other. In this case, while the color displayed by the pixel changes from black to the optimal color of the hue (R), the blue and yellow sub-pixels corresponding to the hues (B) and (Ye) adjacent to the hue (R) on both sides thereof may be lit up in addition to the red sub-pixels.

As described above, in the case where the color displayed by the pixel changes from black to the optimal color of the hue (G) or (B), in the display devices in Comparative examples 4 and 5, only one sub-pixel is lit up. By contrast, in the display device 100A in this embodiment, a plurality of sub-pixels are lit up and so the misapprehension is suppressed. In the case where the color displayed by the pixel changes from black to white via the optimal color of the hue (Ye), (C) or (M), the luminance values of the sub-pixels change in a slightly different manner. The hue (M) is the hue of the color displayed by the red and blue sub-pixels.

Hereinafter, advantages of the display device 100A in this embodiment will be described as compared with the display devices in Comparative examples 4 and 5. Here, the color displayed by the pixel changes from black to white via the optimal color of the hue (C).

Figure 42:
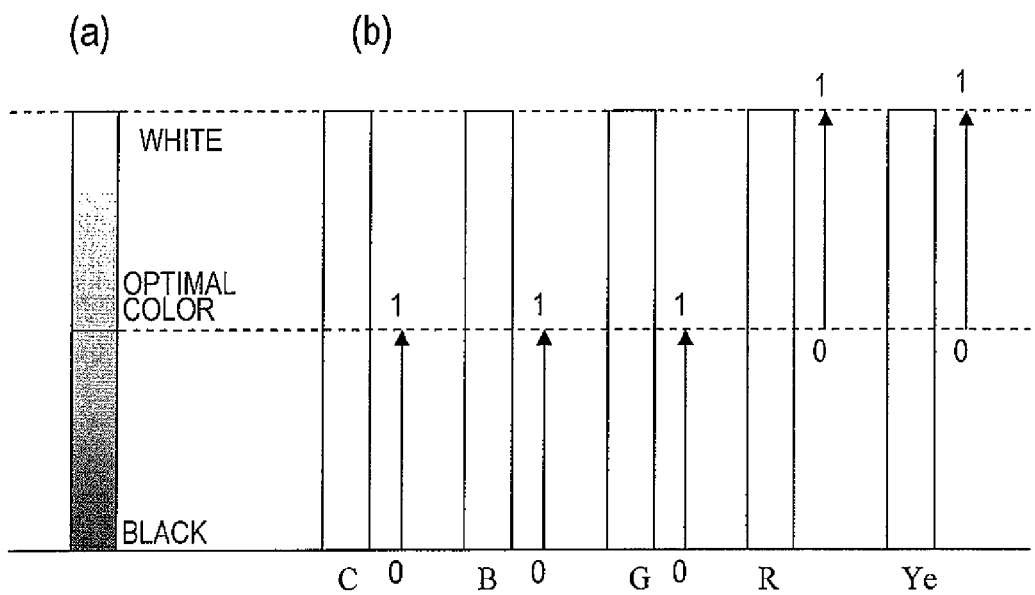
FIG. 42 is a schematic view for explaining the relationship between the change of the luminance value of each sub-pixel and the change of the color displayed by the pixel in the display device in Comparative example 4; (a) shows the change of the color displayed by the pixel, and (b) shows the changes of the luminance values of the cyan, blue, green, red and yellow sub-pixels.

First, the display device in Comparative example 4 will be described with reference to FIG. 42. FIG. 42 is a schematic view for explaining the relationship between the change of the luminance value of each sub-pixel and the change of the color displayed by the pixel in the display device in Comparative example 4. FIG. 42(a) shows the change of the color displayed by the pixel, and FIG. 42(b) shows the changes of the luminance values of the cyan, blue, green, red and yellow sub-pixels.

In an initial state, the luminance values of all the sub-pixels, namely, the cyan, blue, green, red and yellow sub-pixels are "0". The color displayed by the pixel is black. First, the luminance values of the cyan, blue and green sub-pixels start to be increased. The luminance values of the cyan, blue and green sub-pixels increase at an equal increasing rate. As the luminance values of the cyan, blue and green sub-pixels increase, the chroma and the lightness of the color displayed by the pixel increase.

When the luminance values of the cyan, blue and green sub-pixels reach "1", the color displayed by the pixel is the optimal color of the hue (C). Then, in the display device in Comparative example 4, as shown in FIG. 42(b), the luminance values of the red and yellow sub-pixels start to be increased approximately at the same time. The luminance values of the red and yellow sub-pixels increase at an equal increasing rate. In this case also, by the increase of the luminance values of the sub-pixels, the lightness of the color displayed by the pixel increases. When the luminance values of all the sub-pixels become "1", the color displayed by the pixel is white.

In such a display device in Comparative example 4, the luminance values of the cyan, blue and green sub-pixels increase at an equal increasing rate. As described above, when compared at substantially the same luminance level, the chroma of cyan displayed by the blue and green sub-pixels is generally lower than the chroma of cyan displayed by the cyan sub-pixel. The display device in Comparative example 4 cannot represent a color having a high chroma especially at a low lightness.

Now, the display device in Comparative example 5 will be described with reference to FIG. 43. In the display device in Comparative example 5, after the luminance value of the cyan sub-pixel reaches "1", the luminance values of the blue and green sub-pixels start to be increased.

Figure 43:
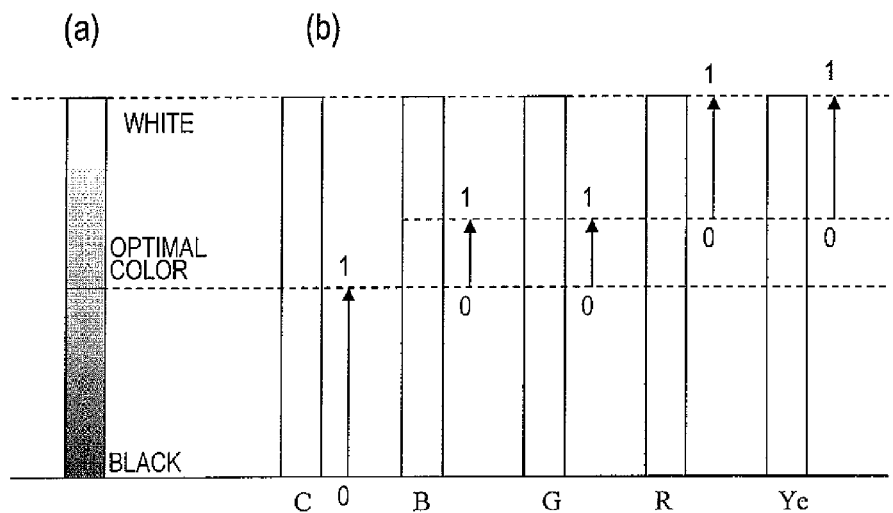
FIG. 43 is a schematic view for explaining the relationship between the change of the luminance value of each sub-pixel and the change of the color displayed by the pixel in the display device in Comparative example 5; (a) shows the change of the color displayed by the pixel, and (b) shows the changes of the luminance values of the cyan, blue, green, red and yellow sub-pixels.

FIG. 43 is a schematic view for explaining the relationship between the change of the luminance value of each sub-pixel and the change of the color displayed by the pixel in the display device in Comparative example 5. FIG. 43(a) shows the change of the color displayed by the pixel, and FIG. 43(b) shows the changes of the luminance values of the cyan, blue, green, red and yellow sub-pixels.

In an initial state, the luminance values of all the sub-pixels, namely, the cyan, blue, green, red and yellow sub-pixels are "0". The color displayed by the pixel is black. First, the luminance value of the cyan sub-pixel starts to be increased. As the luminance value of the cyan sub-pixel increases, the chroma and the lightness of the color displayed by the pixel increase.

When reaching "1", the luminance value of the cyan sub-pixel is kept "1". Next, the luminance values of the blue and green sub-pixels start to be increased. As the luminance values of the blue and green sub-pixels increase, the lightness of the color displayed by the pixel increases. The increasing rates of the luminance values of the blue and green sub-pixels are set so as not to change the hue (C) of the color displayed. Here, the increasing rate of the luminance value of the blue sub-pixel is equal to that of the green sub-pixel.

When reaching "1", the luminance values of the blue and green sub-pixels are kept "1". Next, the luminance values of the red and yellow sub-pixels start to be increased. The increasing rates of the luminance values of the red and yellow sub-pixels are set so as not to change the hue (C). When the luminance values of the red and yellow sub-pixels reach "1", the color displayed by the pixel is white.

Figure 44:
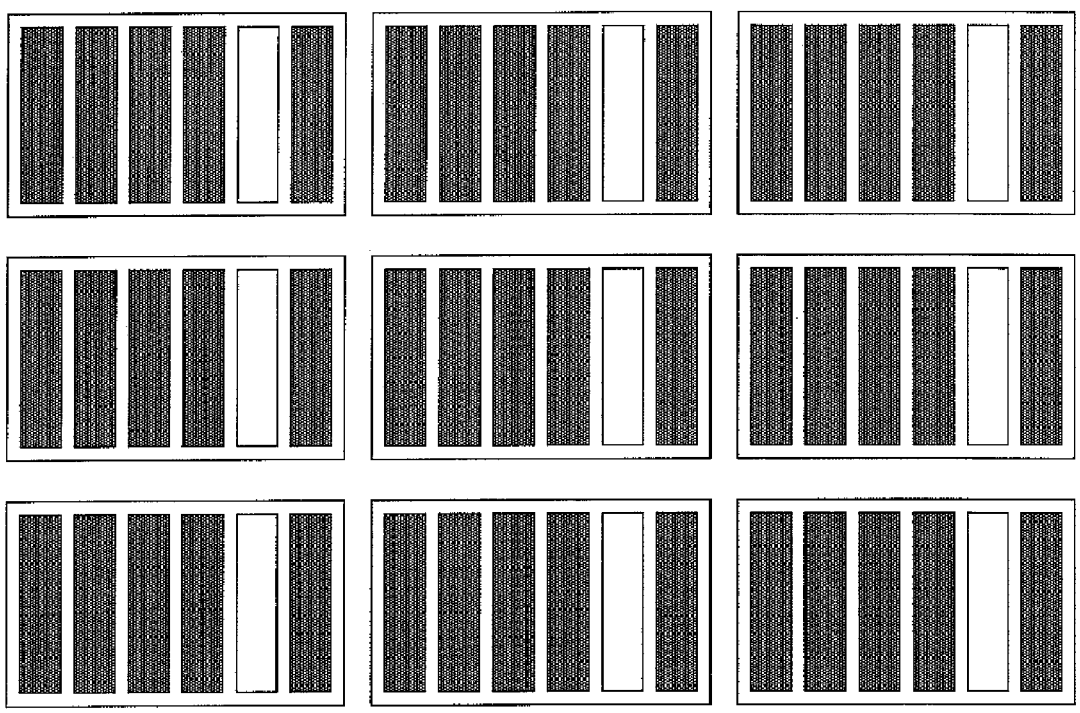
FIG. 44 is a schematic view showing a lit-up/non-lit-up state of the sub-pixels in the display device in Comparative example 5.

In such a display device in Comparative example 5, in the case where the color displayed by the pixel changes from black to the optimal color of the hue (C), first, only the luminance value of the cyan sub-pixel starts to be increased. During this time, as shown in FIG. 44, only the cyan sub-pixel is lit up and the other sub-pixels are not lit up. In this case, the area size occupied by the non-lit-up sub-pixels with respect to one pixel is large. As a result, the non-lit-up sub-pixels appear to display black. It is misapprehended that black is also displayed in addition to cyan. Especially in a structure in which the sub-pixels belonging to one pixel are arranged in one row, in the case where only the cyan sub-pixel is lit up in each of the pixels in one column, thick black lines appear to be displayed in addition to thin cyan lines.

In the case where the color displayed by the pixel changes from black to white via the optimal color of the hue (C), the sub-pixels in the display device in Comparative example 6 change in substantially the same manner as in Comparative example 4 described above with reference to FIG. 42. The same description will not be provided.

Figure 45:
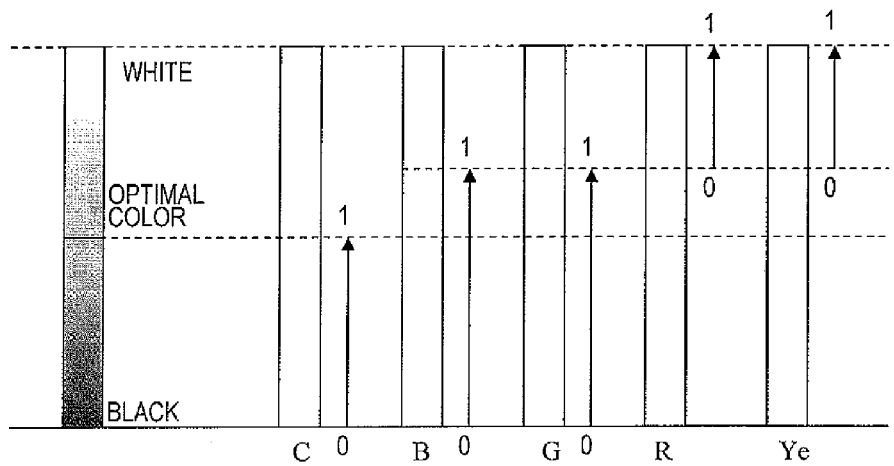
FIG. 45 is a schematic view for explaining the relationship between the change of the luminance value of each sub-pixel and the change of the color displayed by the pixel in the multi-primary color display device in Embodiment 2; (a) shows the change of the color displayed by the pixel, and (b) shows the changes of the luminance values of the cyan, blue, green, red and yellow sub-pixels.

In the display device 100A in this embodiment, in the case where the color displayed by the pixel changes from black to the optimal color of the hue (C), the luminance value of the cyan sub-pixel starts to be increased, and also the luminance values of the blue and green sub-pixels corresponding to two hues adjacent to the hue (C) (namely, (B) and (G)) start to be increased. Hereinafter, with reference to FIG. 45, changes of the luminance values of the sub-pixels in the display device 100A in this embodiment in the case where the color displayed by the pixel changes from black to white via the optimal color of the hue (C) will be described. FIG. 45 is a schematic view for explaining the relationship between the change of the luminance value of each sub-pixel and the change of the color displayed by the pixel in the display device 100A in this embodiment. FIG. 45(a) shows the change of the color displayed by the pixel, and FIG. 45(b) shows the changes of the luminance values of the cyan, blue, green, red and yellow sub-pixels.

In an initial state, the luminance values of all the sub-pixels, namely, the cyan, blue, green, red and yellow sub-pixels are "0". The color displayed by the pixel is black. The luminance value of the cyan sub-pixel first starts to be increased, and also the luminance values of the blue and green sub-pixels start to be increased. In addition to the luminance value of the cyan sub-pixel, the luminance values of the blue and green sub-pixels are increased at an increasing rate lower than that of the cyan sub-pixel. The increasing rates of the luminance values of the blue and green sub-pixels are set so as not to change the hue (C) of the color displayed by the pixel. Here, the increasing rate of the luminance value of the blue sub-pixel is equal to that of the green sub-pixel.

As the luminance values of the cyan, blue and green sub-pixels increase, the chroma and the lightness of the color displayed by the pixel increase. The luminance value of the cyan sub-pixel reaches "1" before the luminance values of the blue and green sub-pixels. When reaching "1", the luminance value of the cyan sub-pixel is kept "1". Then, the luminance values of the blue and green sub-pixels are kept increasing.

Since the increasing rate of the luminance value of the blue sub-pixel is equal to that of the green sub-pixel, the luminance values of the blue and green sub-pixels reach "1" at the same time.

When reaching "1", the luminance values of the blue and green sub-pixels are kept "1". Next, in order to further increase the lightness of the pixel, the luminance value of the red sub-pixel corresponding to the hue (R), which is on the same side as the hue (B) with respect to the hue (C) and is closest to the hue (C) next to the hue (B), and the luminance value of the yellow sub-pixel corresponding to the hue (Ye), which is on the same side as the hue (G) with respect to the hue (C) and is closest to the hue (C) next to the hue (G), start to be increased. Here again, the increasing rates of the luminance values of the red and yellow sub-pixels are set so as not to change the hue (C). Here again, the increasing rate of the luminance value of the yellow sub-pixel is equal to that of the red sub-pixel. When the luminance values of the red and yellow sub-pixels increase and reach "1", the color displayed by the pixel is white.

Now, the display devices in Comparative examples 4 and 5 and the display device 100A in this embodiment will be compared. In the display device in Comparative example 4, while the color displayed by the pixel changes from black to the optimal color of the hue (C), the luminance values of the blue and green sub-pixels are increased at an equal increasing rate to that of the cyan sub-pixel. As described above, when compared at substantially the same luminance level, the chroma of cyan displayed by the green and blue sub-pixels is generally lower than the chroma of cyan displayed by the cyan sub-pixel. The display device in Comparative example 4 cannot represent a color having a high chroma especially at a low lightness.

In the display device in Comparative example 5, while the color displayed by the pixel changes from black to the optimal color of the hue (C), first, only the luminance value of the cyan sub-pixel starts to be increased. During this time, as shown in FIG. 44, only the cyan sub-pixel is lit up and the other sub-pixels are not lit up. In this case, the area size occupied by the non-lit-up sub-pixels with respect to one pixel is large. As a result, the non-lit-up sub-pixels appear to display black. It is misapprehended that black is also displayed in addition to cyan. Especially in a structure in which the sub-pixels belonging to one pixel are arranged in one row, in the case where only the cyan sub-pixel is lit up in each of the pixels in one column, thick black lines appear to be displayed in addition to thin cyan lines.

Figure 46:
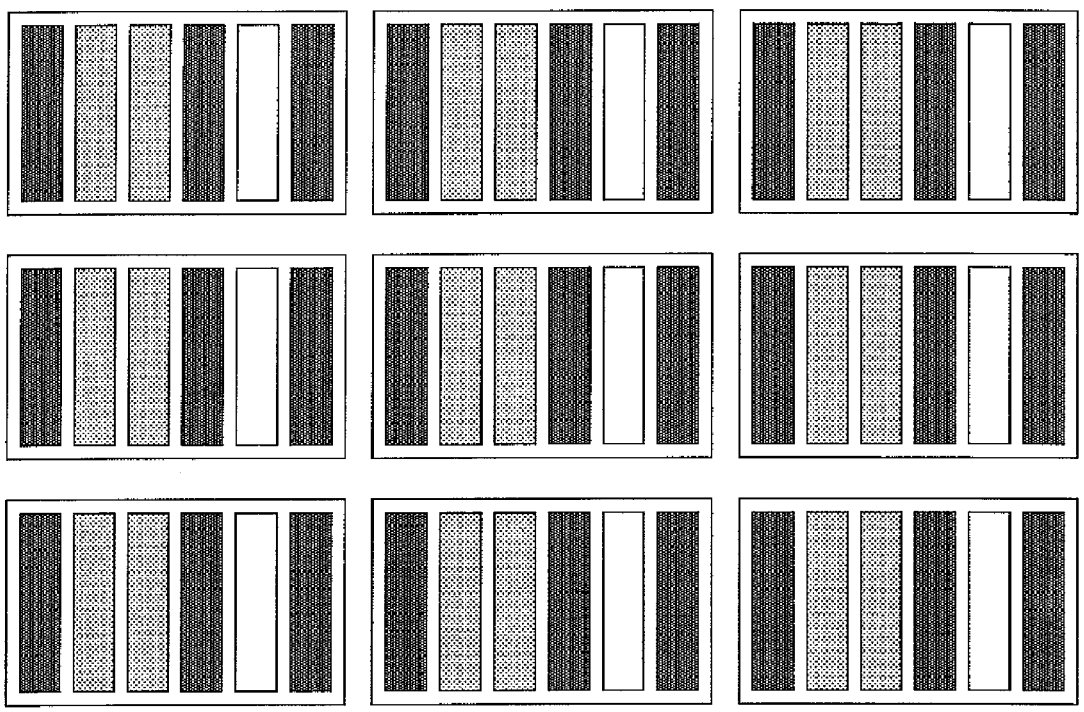
FIG. 46 is a schematic view showing a lit-up/non-lit-up state of the sub-pixels in the multi-primary color display device in Embodiment 2.

By contrast, in the display device 100A in this embodiment, in the case where the color displayed by the pixel changes from black to the optimal color of the hue (C), the luminance value of the cyan sub-pixel starts to be increased, and also the luminance values of the blue and green sub-pixels start to be increased. Therefore, as shown in FIG. 46, the cyan sub-pixel is lit up and also the blue and green sub-pixels are lit up. Therefore, the area size occupied by the non-lit-up sub-pixels with respect to one pixel is small, and so the misapprehension is suppressed.

For displaying the optimal color of the hue (C), in any of the display devices in the Comparative examples 4 and 5 and the display device 100A in this embodiment, the gray scale levels of the sub-pixels are (R, G, B, Ye, C)=(0, 255, 255, 0, 255). The display device in Comparative example utilizes the range of reproducible colors more effectively than the display device 100A in at least a part of the lightness range. At a lightness lower than that of the optimal color displayable by the display device 100A, the upper limit of the chroma displayable by the display device in Comparative example 5 is higher than that displayable by the display device 100A.

In the above description, the increasing rate of the luminance value of the blue sub-pixel is equal to that of the green sub-pixel, but the present invention is not limited to this. It is sufficient that the increasing rates of the luminance values of the blue and green sub-pixels are set so as not to change the hue (C) of the color displayed by the pixel. For example, in the case where the hue of the color displayed by the pixel changes from the hue (C) toward the hue (G) if the luminance value of the blue sub-pixel and the luminance value of the green sub-pixel are increased at an equal increasing rate, the increasing rate of the luminance value of the blue sub-pixel may be higher than that of the green sub-pixel. Hereinafter, with reference to FIG. 47, changes of the luminance values of the sub-pixels in the display device 100A in this embodiment in the case where the color displayed by the pixel changes from black to white via the optimal color of the hue (C) will be described.

In an initial state, the luminance values of all the sub-pixels, namely, the cyan, blue, green, red and yellow sub-pixels are "0". The color displayed by the pixel is black. In the display device 100A, the luminance value of the cyan sub-pixel is increased, and also the luminance values of the blue and green sub-pixels are increased at an increasing rate lower than that of the cyan sub-pixel.

The increasing rates of the luminance values of the blue and green sub-pixels are set so as not to change the hue (C) of the color displayed by the pixel. Here, the increasing rate of the luminance value of the blue sub-pixel is higher than that of the green sub-pixel. It should be noted that as described above, as a result of quantization or the like of the numerical values in a circuit embodying this control, the luminance value of the cyan sub-pixel may first start to be increased, and then the luminance values of the blue and green sub-pixels may start to be increased.

As the luminance values of the cyan, blue and green sub-pixels increase, the chroma and the lightness of the color displayed by the pixel increase. When reaching "1", the luminance value of the cyan sub-pixel is kept "1". Then, in order to further increase the lightness of the pixel, the luminance values of the blue and green sub-pixels are kept increasing.

Since the increasing rate of the luminance value of the blue sub-pixel is higher than that of the green sub-pixel, the luminance value of the blue sub-pixel reaches "1" before the luminance value of the green sub-pixel. When reaching "1", the luminance value of the blue sub-pixel is kept "1". Next, the luminance value of the red sub-pixel starts to be increased. Here again, the increasing rate of the luminance value of the red sub-pixel is set so as not to change the hue (C) by the increase of the luminance values of the green and red sub-pixels.

The luminance value of the green sub-pixel reaches "1" before the luminance value of the red sub-pixel. When reaching "1", the luminance value of the green sub-pixel is kept "1". Next, the luminance value of the yellow sub-pixel starts to be increased. Here again, the increasing rate of the luminance value of the yellow sub-pixel is set so as not to change the hue (C) by the increase of the luminance values of the red and yellow sub-pixels. When the luminance values of the red and yellow sub-pixels increase and reach "1" at the same time, the color displayed by the pixel is white.

In the case where the number of primary colors is five, after the luminance values of the cyan, blue and green sub-pixels reach "1", the luminance values of the red and yellow sub-pixels reach "1" at the same time. Therefore, when the increasing rate of the luminance value of the blue sub-pixel is higher than that of the green sub-pixel, the increasing rate of the luminance value of the red sub-pixel, which starts to be increased next to the luminance value of the blue sub-pixel, is lower than the increasing rate of the luminance value of the yellow sub-pixel, which starts to be increased next to the luminance value of the green sub-pixel.

Figure 47:
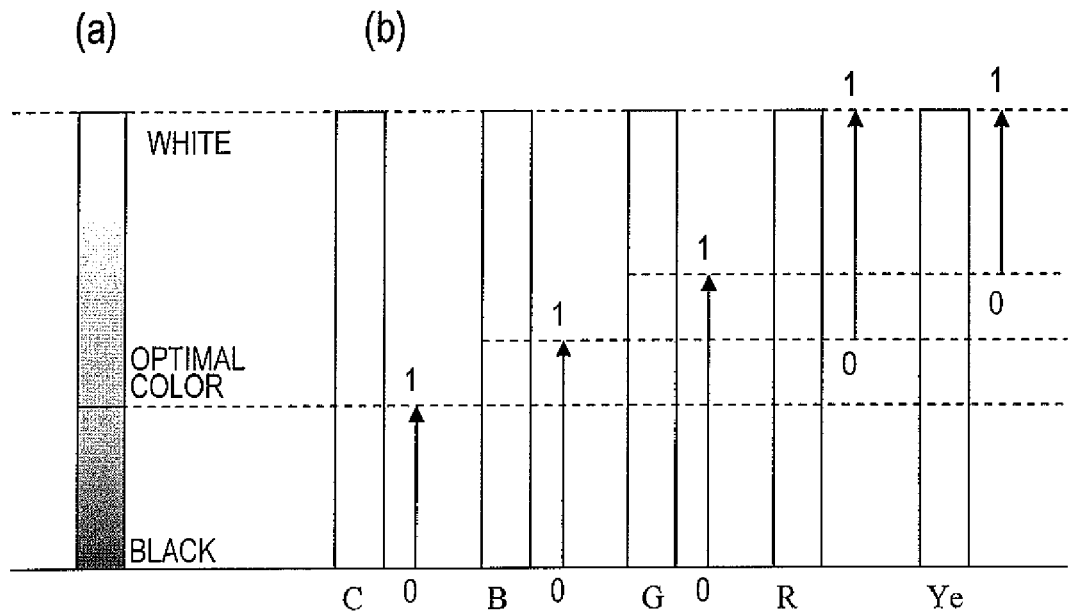
FIG. 47 is a schematic view for explaining the relationship between the change of the luminance value of each sub-pixel and the change of the color displayed by the pixel in the multi-primary color display device in Embodiment 2; (a) shows the change of the color displayed by the pixel, and (b) shows the changes of the luminance values of the cyan, blue, green, red and yellow sub-pixels.
Figure 48:
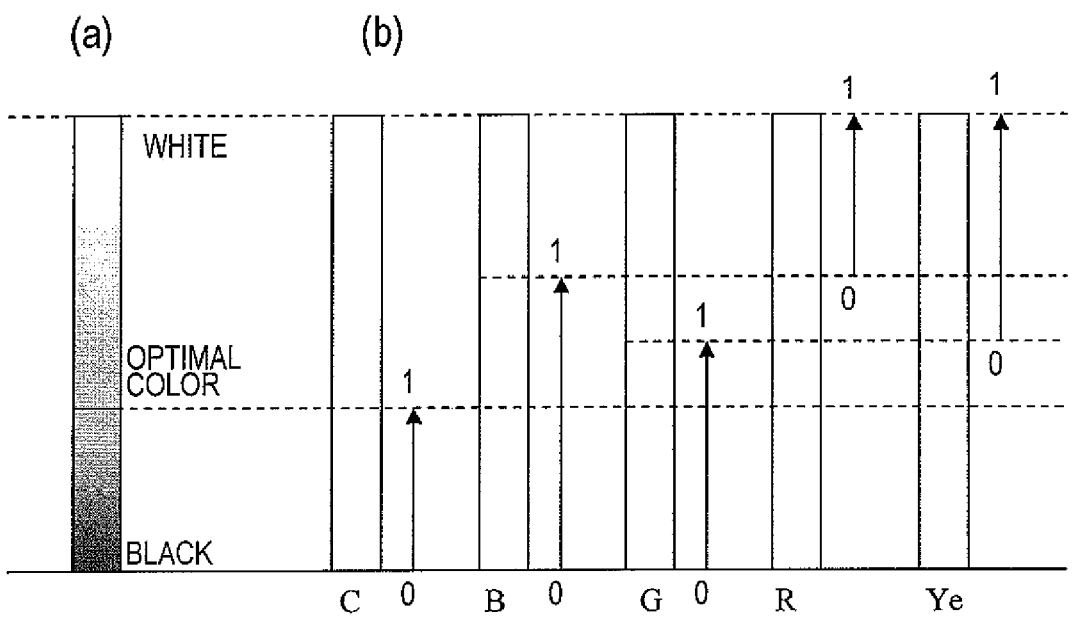
FIG. 48 is a schematic view for explaining the relationship between the change of the luminance value of each sub-pixel and the change of the color displayed by the pixel in the multi-primary color display device in Embodiment 2; (a) shows the change of the color displayed by the pixel, and (b) shows the changes of the luminance values of the cyan, blue, green, red and yellow sub-pixels.

In the above description given with reference to FIG. 47, the increasing rate of the luminance value of the blue sub-pixel is higher than that of the green sub-pixel, but the present invention is not limited to this. The increasing rate of the luminance value of the green sub-pixel may be higher than that of the blue sub-pixel. In this case, as shown in FIG. 48, after the luminance value of the cyan sub-pixel reaches "1", the luminance values of the green and blue sub-pixels are kept increasing. Then, the luminance value of the green sub-pixel reaches "1" before the luminance value of the blue sub-pixel. When reaching "1", the luminance value of the green sub-pixel is kept "1". Next, the luminance value of the yellow sub-pixel starts to be increased. Here again, the increasing rate of the luminance value of the yellow sub-pixel is set so as not to change the hue (C) by the increase of the luminance values of the blue and yellow sub-pixels.

The luminance value of the blue sub-pixel reaches "1" before the luminance value of the yellow sub-pixel. When reaching "1", the luminance value of the blue sub-pixel is kept "1". Next, the luminance value of the red sub-pixel starts to be increased. Here again, the increasing rate of the luminance value of the red sub-pixel is set so as not to change the hue (C) by the increase of the luminance values of the yellow and red sub-pixels. When the luminance values of the yellow and red sub-pixels increase and reach "1" at the same time, the color displayed by the pixel is white.

In the display device 100A in this embodiment, the pixel includes the second red sub-pixel instead of the magenta sub-pixel. When the color displayed by the pixel starts changing from black to the optimal color of the hue (M), the two red sub-pixels and the blue sub-pixel are lit up. When the color displayed by the pixel starts changing from black to the optimal color of the hue (Ye), the yellow sub-pixel is lit up, and also the red and green sub-pixels corresponding to the hues (R) and (G) adjacent to the hue (Ye) on both sides thereof are lit up. Therefore, the number of non-lit-up sub-pixels is small and so the misapprehension is suppressed.

As described above, the luminance values of the two red sub-pixels may be different from each other. For example, after the luminance value of one red sub-pixel reaches "1", the luminance value of the other red sub-pixel may start to be increased. When the color displayed by the pixel starts changing from black to the optimal color of the hue (R), one of the two red sub-pixels may be lit up in addition to at least one other sub-pixel.

The luminance values of the red sub-pixels Ra and Rb may be controlled independently, so that the viewing angle dependence of the γ characteristic that the γ characteristic obtained when the display plane is observed from the front direction is different from the γ characteristic obtained when the display plane is observed in an oblique direction can be alleviated. For alleviating the viewing angle dependence of the γ characteristic, Japanese Laid-Open Patent Publications Nos. 2004-62146 and 2004-78157 propose a technique called "multi-pixel driving". According to this technique, the viewing angle dependence of the γ characteristic is alleviated by dividing one sub-pixel into two areas and applying different voltages to the two areas. By use of a structure in which the first red sub-pixel Ra and the second red sub-pixel Rb are controlled independently from each other, different voltages can be applied to the liquid crystal layer of the first red sub-pixel Ra and the liquid crystal layer of the second red sub-pixel Rb, naturally. Therefore, like by the multi-pixel driving disclosed in Japanese Laid-Open Patent Publications Nos. 2004-62146 and 2004-78157, the effect of alleviating the viewing angle dependence of the γ characteristic can be provided.

FIG. 31 shows an example of the arrangement pattern of the sub-pixels. Needless to say, there are other patterns. It is described that when the color displayed by the pixel starts changing from black to an optimal color in the display device 100A, the misapprehension is suppressed when three sub-pixels are lit up. More precisely, the display quality varies in accordance with the arrangement pattern of the sub-pixels.

In the case where, among six sub-pixels belonging to one pixel, three continuous sub-pixels on the left or on the right are lit up, the three remaining non-lit-up sub-pixels are continuous. As described above, the sub-pixels are periodically arranged pixel by pixel in the row direction. Therefore, also in the case where among six sub-pixels belonging to one pixel, for example, three continuous sub-pixels at the center are lit up, it is regarded that there are three continuous non-lit-up sub-pixels, in consideration of the pixels adjacent to the one pixel in the row direction. When three non-lit-up sub-pixels are continuous in this manner, it may occasionally appear that black is displayed. Accordingly, it is preferable that three continuous lit-up sub-pixels are not existent.

Figures 50, 51:
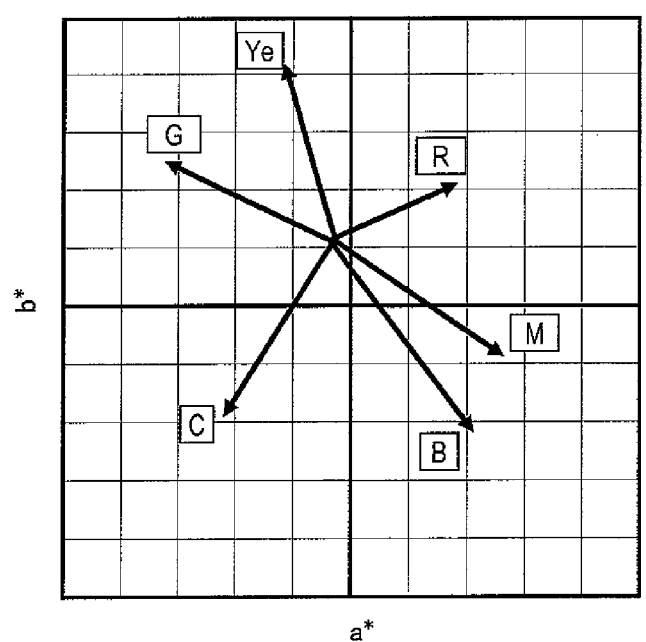
FIG. 50 is a schematic view for explaining a preferable arrangement pattern of the sub-pixels in the multi-primary color display device in Embodiment 2.
FIG. 51 is a schematic view showing the a*b* plane of the L*a*b* colorimetric system in which a* and b* are plotted regarding the color of each sub-pixel in a multi-primary color display device in Embodiment 3.

Hereinafter, with reference to FIGS. 49 and 50, arrangement patterns of the sub-pixels preferably usable for the display device 100A in this embodiment will be described. FIG. 49 shows arrangement patterns of the sub-pixels and the display quality thereof. "○" indicates that the display quality is high, whereas "X" indicates that the display quality is low. In FIGS. 49 and 50, both of the first and second red sub-pixels are represented simply with "R".

For example, the display characteristic of a pattern including the red, red, blue, cyan, green and yellow sub-pixels in this order from right to left is equivalent to the display characteristic of a pattern including the red, red, blue, cyan, green and yellow sub-pixels in this order from left to right (namely, including the red, red, yellow, green, cyan and blue sub-pixel in this order from right to left). FIGS. 49 and 50 omit patterns exhibiting such equivalent display characteristic. The 12 sub-pixels in each of the arrangement patterns shown in FIGS. 49 and 50 do not need to belong to two pixels, and may belong to three pixels.

Hereinafter, the arrangement patterns providing a low display quality and reasons for that will be described. As described above with reference to FIG. 38, when the color displayed by the pixel starts changing from black to the optimal color of the hue (C), the cyan sub-pixel is lit up and also the blue and green sub-pixels are lit up. In this case, where the cyan, blue and green sub-pixels are continuously located, three non-lit-up pixels (namely, the two red sub-pixels and the yellow sub-pixel) are continuously located. When three sub-pixels, which correspond to approximately half the length of one pixel pitch, are not lit up, it may occasionally appear that black lines are displayed. In order to suppress the black lines, it is preferred that the cyan, blue and green sub-pixels are not continuously located. Namely, it is preferable that at least one of the other sub-pixels (i.e., the two red sub-pixels and the yellow sub-pixel) is provided between two among the cyan, blue and green sub-pixels.

When the color displayed by the pixel starts changing from black to the optimal color of the hue (M), the two red sub-pixels and the blue sub-pixel are lit up. In this case also, where the two red sub-pixels and the blue sub-pixel are continuously located, three non-lit-up pixels (namely, the green, cyan and yellow sub-pixels) are continuously located. When three sub-pixels, which correspond to approximately half the length of one pixel pitch, are not lit up, it may occasionally appear that black lines are displayed. In order to suppress the black lines, it is preferred that the two red sub-pixels and the blue sub-pixel are not continuously located. Namely, it is preferable that at least one of the other sub-pixels (i.e., the green, yellow and cyan sub-pixels) is provided between two among the two red sub-pixels and the blue sub-pixel.

When the color displayed by the pixel starts changing from black to the optimal color of the hue (G), the green sub-pixel is lit up and also the cyan and yellow sub-pixels are lit up. In this case also, where the green, cyan and yellow sub-pixels are continuously located, three non-lit-up pixels (namely, the two red sub-pixels and the blue sub-pixel) are continuously located. When three sub-pixels, which correspond to approximately half the length of one pixel pitch, are not lit up, it may occasionally appear that black lines are displayed. In order to suppress the black lines, it is preferred that the green, cyan and yellow sub-pixels are not continuously located. Namely, it is preferable that at least one of the other sub-pixels (i.e., the two red sub-pixels and the blue sub-pixel) is provided between two among the green, cyan and yellow sub-pixels.

In the display device 100A, while the color displayed by the pixel changes from black to the optimal color of the hue (R), the two red sub-pixels are lit up. Therefore, it is not necessary to consider the display of the color of the hue (R).

In the display device 100A, in the case where the color displayed by the pixel changes from black to the optimal color of the hue (B), the blue sub-pixel is lit up and also the two red sub-pixels and the cyan sub-pixel are lit up. Therefore, the misapprehension is unlikely to occur. As compared with red or green, blue is unlikely to cause misapprehension. The ratio of the pyramidal cells in the human eye for the three primary colors of ink are L pyramidal cells:M pyramidal cells:S pyramidal cells=32:16:1. It is considered that the L pyramidal cells, the M pyramidal cells and the S pyramidal cells respectively correspond to red, green and blue. The number of the pyramidal cells responsive to blue is relatively small, and the resolution of the human eye to blue is low. For example, when green/black/green/black stripes are displayed, the human eye can perceive the green/black/green/black stripe pattern. However, when blue/black/blue/black stripes are displayed, the human eye cannot perceive the stripe pattern. This stripe pattern appears to the human eye as a uniform blue area of the half luminance value. Therefore, it is not necessary to consider the display of the color of the hue (B).

In the display device 100A, when the color displayed by the pixel starts changing from black to the optimal color of the hue (Ye), the yellow sub-pixel is lit up and also the two red sub-pixels and the green sub-pixel are lit up. Thus, the misapprehension is unlikely to occur. Therefore, it is not necessary to consider the display of the color of the hue (Ye).

FIGS. 49 and 50 shows the arrangement patterns of the sub-pixels based on the two red sub-pixels. The two red sub-pixels are continuous in two of the preferable patterns, namely, the pattern including the red, red, green, yellow, blue and cyan sub-pixels in this order, and the pattern including the red, red, green, blue, yellow and cyan sub-pixels in this order.

The red, green and red sub-pixels are continuous in three of the preferable patterns, namely, the pattern including the red, green, red, yellow, cyan and blue sub-pixels in this order, the pattern including the red, green, red, yellow, blue and cyan sub-pixels in this order, and the pattern including the red, green, red, cyan, yellow and blue sub-pixels in this order.

The red, cyan and red sub-pixels are continuous in three of the preferable patterns, namely, the pattern including the red, cyan, red, yellow, green and blue sub-pixels in this order, the pattern including the red, cyan, red, yellow, blue and green sub-pixels in this order, and the pattern including the red, cyan, red, green, yellow and blue sub-pixels in this order.

The yellow and green sub-pixels are continuous between the two red sub-pixels in two of the preferable patterns, namely, the pattern including the red, yellow, green, red, cyan and blue sub-pixels in this order, and the pattern including the red, yellow, green, red, blue and cyan sub-pixels in this order.

The yellow and cyan sub-pixels are continuous between the two red sub-pixels in two of the preferable patterns, namely, the pattern including the red, yellow, cyan, red, green and blue sub-pixels in this order, and the pattern including the red, yellow, cyan, red, blue and green sub-pixels in this order.

The yellow and blue sub-pixels are continuous between the two red sub-pixels in two of the preferable patterns, namely, the pattern including the red, yellow, blue, red, green and cyan sub-pixels in this order, and the pattern including the red, yellow, blue, red, cyan and green sub-pixels in this order. As can be seen from the above, there are 14 preferable patterns. With such patterns, the misapprehension can be further suppressed.

The above description is given while attention is paid to suppression of black lines. It is preferable that three lit-up sub-pixels are discontinuously located. For example, it is described that the cyan, blue and green sub-pixels are discontinuously located. Suppression of black lines is not the only element to which attention should be paid regarding the arrangement patterns of the sub-pixels. For example, when cyan lines extending in a longitudinal direction are to be displayed, it is preferable that the cyan, blue and green sub-pixels are continuously located in order to realize uniformity of the cyan lines.

Embodiment 3

In the above description, the luminance values of the sub-pixels are changed so as not to change the hue of one sub-pixel (for example, the hue (G)) in the multi-primary color display panels 110 and 110A shown in FIG. 1 and FIG. 30. The present invention is not limited to this. The luminance values of the sub-pixels may be changed so as not to change a hue other than the hue of the one sub-pixel (for example, the hue (G)).

In the above description, for example, the increasing rates of the luminance values of the yellow and cyan sub-pixels after the luminance value of the green sub-pixel reaches "1" are equal to the increasing rates of the luminance values of the yellow and cyan sub-pixels before the luminance value of the green sub-pixel reaches "1". The present invention is not limited to this. For example, the increasing rates of the luminance values of the yellow and cyan sub-pixels after the luminance value of the green sub-pixel reaches "1" may be different from the increasing rates of the luminance values of the yellow and cyan sub-pixels before the luminance value of the green sub-pixel reaches "1". In this case, before the luminance value of the green sub-pixel reaches "1", the yellow and cyan sub-pixels display a color which compensates for the difference between the hue of the color displayed by the pixel and the hue displayed by the green sub-pixel. After the luminance value of the green sub-pixel reaches "1", the yellow and cyan sub-pixels display a hue of the color displayed by the pixel itself.

Hereinafter, a multi-primary color display device in Embodiment 3 according to the present invention will be described. A multi-primary color display device in this embodiment has substantially the same structure as that of the display device in Embodiment 1 described above with reference to FIGS. 1 and 2 except that the color of each sub-pixel is slightly different. The same description will not be provided in order to avoid redundancy.

FIG. 51 is a schematic view showing the a*b* plane of the L*a*b* colorimetric system in which a* and b* are plotted regarding the color of each of the sub-pixels in the display device in this embodiment. Table 1 shows XYZ values and xy values for the colors of the six sub-pixels and white. The values for the colors of the six sub-pixels and white correspond to the values of the respective colors when the gray scale levels of the sub-pixels are maximum. The XYZ values are regulated such that the Y value is 1.0.

TABLE 1

|  | X | Y | Z | x | y |
| --- | --- | --- | --- | --- | --- |
| Red sub-pixel | 0.1433 | 0.0659 | 0.0020 | 0.678 | 0.312 |
| Yellow sub-pixel | 0.3666 | 0.4663 | 0.0078 | 0.436 | 0.555 |
| Green sub-pixel | 0.0849 | 0.2313 | 0.0233 | 0.250 | 0.681 |
| Cyan sub-pixel | 0.0398 | 0.1080 | 0.1121 | 0.153 | 0.418 |
| Blue sub-pixel | 0.1092 | 0.0456 | 0.6026 | 0.144 | 0.060 |
| Magenta sub-pixel | 0.2071 | 0.0834 | 0.3412 | 0.328 | 0.132 |
| White | 0.9504 | 1.0000 | 1.0884 | 0.313 | 0.329 |

Figure 52:
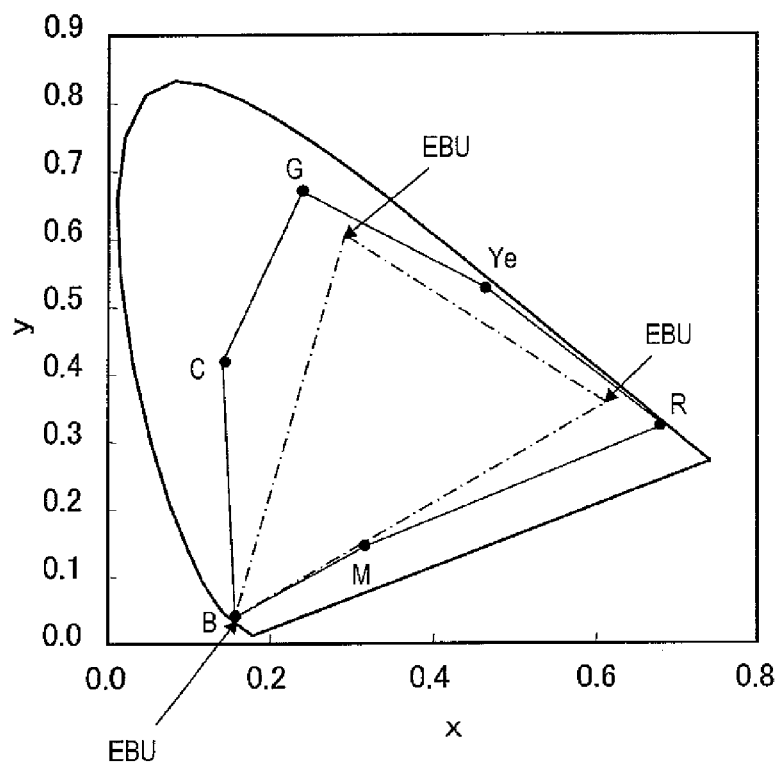
FIG. 52 is a CIE chromaticity diagram showing a chromaticity point of each sub-pixel and chromaticity points of the EBU Standard in the multi-primary color display device in Embodiment 3.

The range of reproducible colors of the display device in this embodiment may occasionally be wider than the range of reproducible colors of the standard to which the input signal is conformed. FIG. 52 is a CIE chromaticity diagram showing the chromaticity points corresponding to the display device in this embodiment and the chromaticity points of the EBU Standard. As can be understood from FIG. 52, when the input signal is conformed to the EBU Standard, the range of reproducible colors of the display device is wider than the range of reproducible colors of the input signal. Therefore, when multi-primary color conversion is simply performed in the case where the input signal is conformed to the EBU Standard, a color different from the color specified by the input signal may be displayed. For example, in the case where the input signal represents the optimal color of green having the gray scale levels of (r, g, b)=(0, 255, 0), when the multi-primary color signal generation section 120 shown in FIG. 1 performs general multi-primary color conversion on the gray scale levels of the input signal, the gray scale levels of the multi-primary color display panel 110 are (R, G, B, Ye, C, M)=(0, 255, 0, 0, 0, 0). Thus, the multi-primary color display panel 110 displays a color different from the color specified by the input signal.

In this case, in order to allow the multi-primary color display panel to display the color specified by the input signal conformed to the EBU Standard, it is necessary to adjust the gray scale levels to be different from the gray scale levels obtained by simply performing multi-primary color conversion on the gray scale levels represented by the input signal. In the display device in this embodiment, the multi-primary color signal generation section 120 (see FIG. 1) generates a multi-primary color signal such that the color displayed by the multi-primary color display panel 110 matches the color specified by the input signal, and the multi-primary color display panel 110 displays the color substantially the same as the color specified by the input signal. For example, in the case where the gray scale levels represented by the input signal are (r, g, b)=(0, 255, 0), before multi-primary color conversion is performed, the gray scale level G of the green sub-pixel is adjusted to 255 and also the gray scale levels of the other sub-pixels are adjusted to a value other than zero. Thus, the adjustment of color including the hue, chroma and luminance value is performed.

Figure 53:
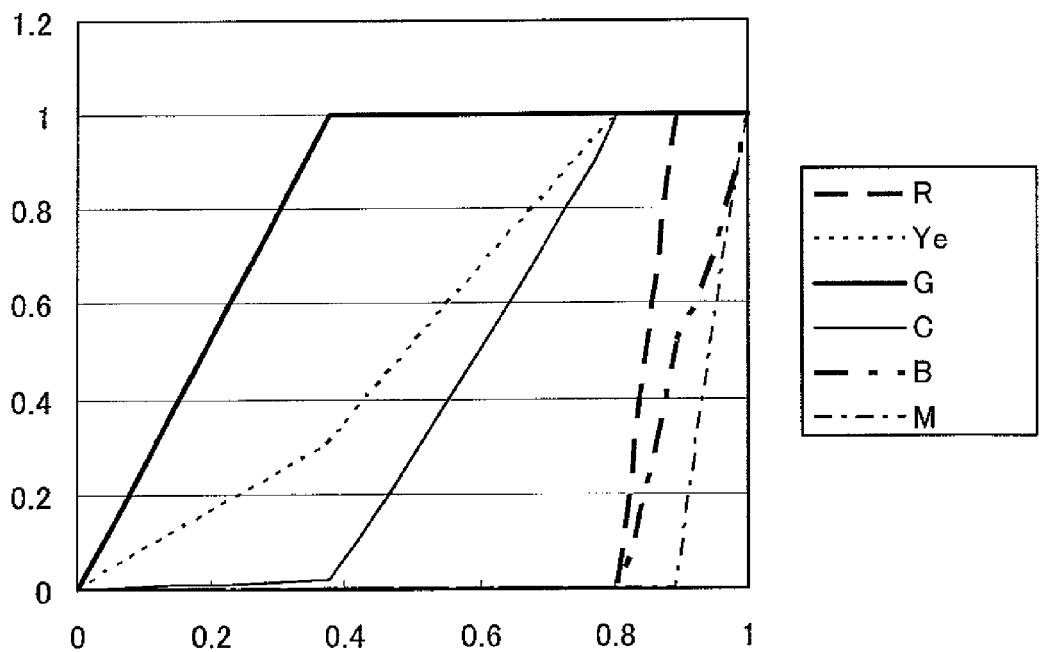
FIG. 53 is a graph for explaining the changes of the luminance values of the sub-pixels in the multi-primary color display device in Embodiment 3.

Hereinafter, with reference to FIG. 53, changes of the luminance values of the sub-pixels in the case where the color displayed by the pixel changes from black to white via the optimal color of a specific hue of green will be described. In FIG. 53, the horizontal axis represents the ratio of the luminance value of the pixel with respect to the luminance value of white, and the vertical axis represents the change of the luminance value of each sub-pixel.

Here, the specific hue of the color displayed by the pixel (green) is close to the hue of the green sub-pixel, but precisely, the hue angle of the color displayed by the pixel (green) is different from the hue angle of the green sub-pixel. Therefore, the hue of the color displayed by the pixel (green) will be described as being different from the hue of the green sub-pixel. In the following description, the specific hue of the color displayed by the pixel (green) will be represented as the "hue (G")" or simply as "(G")" as being distinguished from the hue (G) of the green sub-pixel. For example, the hue angle of the hue (G) is 139°, and the hue angle of the hue (G") is 127°. On the a*b* plane of the L*a*b* colorimetric system, the hue (G") is close to the hue (G) of the green sub-pixel than the hues of the other sub-pixels.

In an initial state, the luminance values of all the sub-pixels, namely, the green, yellow, cyan, red, blue and magenta sub-pixels are "0". The color displayed by the pixel is black. In the display device in this embodiment, the luminance value of the green sub-pixel starts to be increased, and also the luminance values of the yellow and cyan sub-pixels start to be increased. As described above, the green sub-pixel corresponds to (G) closest to the hue (G") on the a*b* plane of the L*a*b* colorimetric system. The yellow sub-pixel corresponds to (Ye) closest to the hue (G) in the clockwise direction on the a*b* plane of the L*a*b* calorimetric system, and the cyan sub-pixel corresponds to (C) closest to the hue (G) in the clockwise direction on the a*b* plane of the L*a*b* colorimetric system.

In the display device in this embodiment, the increasing rates of the luminance values of the yellow and cyan sub-pixels are lower than that of the green sub-pixel. The increasing rates of the luminance values of the green, yellow and cyan sub-pixels are set so as not to change the hue (G") of the color displayed by the pixel. The increasing rate of the luminance value of the yellow sub-pixel with respect to that of the green sub-pixel is 31%, and the increasing rate of the luminance value of the cyan sub-pixel with respect to that of the green sub-pixel is 2%.

As the luminance values of the green, yellow and cyan sub-pixels increase, the chroma and the lightness of the color displayed by the pixel increase. When reaching "1", the luminance value of the green sub-pixel is kept "1". At this point, the color displayed by the pixel is the optimal color of the hue (G"). The luminance values of the green, yellow, cyan, red, blue and magenta sub-pixels are respectively "1", "0.31", "0.02", "0", "0" and "0".

Next, in order to further increase the lightness of the pixel, the luminance values of the yellow and cyan sub-pixels are kept increasing. Here, the increasing rate of the luminance value of the cyan sub-pixel is higher than that of the yellow sub-pixel, and the luminance value of the yellow sub-pixel reaches "1" approximately at the same time as the luminance value of the cyan sub-pixel. For example, the increasing rate of the luminance value of the cyan sub-pixel with respect to that of the yellow sub-pixel is about 142% (=98/69). When reaching "1", the luminance values of the yellow and cyan sub-pixels are kept "1".

Next, the luminance value of the red sub-pixel corresponding to (R), which is in the clockwise direction with respect to the hue (G) like the hue (Ye) and is closest to the hue (G) next to the hue (Ye) on the a*b* plane of the L*a*b* colorimetric system, and the luminance value of the blue sub-pixel corresponding to (B), which is in the counterclockwise direction with respect to the hue (G) like the hue (C) and is closest to the hue (G) next to the hue (C) on the a*b* plane of the L*a*b* colorimetric system, start to be increased. The increasing rates of the luminance values of the red and blue sub-pixels are set so as not to change the hue (G"). For example, the increasing rate of the luminance value of the red sub-pixel is about twice as high as that of the blue sub-pixel.

The luminance value of the red sub-pixel reaches "1" before the luminance value of the blue sub-pixel. Next, the luminance value of the magenta sub-pixel corresponding to the hue (M) starts to be increased. When the luminance values of the blue and magenta sub-pixels increase and reach "1", the color displayed by the pixel is white. At this point, the luminance values of the green, yellow, cyan, red, blue and magenta sub-pixels are respectively "1", "1", "1", "1", "1" and "1".

In the above description, the luminance value of the yellow sub-pixel reaches "1" approximately at the same time as the luminance value of the cyan sub-pixel, but present invention is not limited to this. The luminance value of the yellow sub-pixel may reach "1" at a different timing from the luminance value of the cyan sub-pixel. Hereinafter, with reference to FIG. 54, changes of the luminance values of the sub-pixels will be described. Here, the hue angle of the hue (G") is 134°.

In an initial state, the luminance values of all the sub-pixels, namely, the green, yellow, cyan, red, blue and magenta sub-pixels are "0". The color displayed by the pixel is black. First, the luminance values of the green, yellow and cyan sub-pixels start to be increased. The increasing rates of the luminance values of the yellow and cyan sub-pixels are lower than that of the green sub-pixel. The increasing rates of the luminance values of the green, yellow and cyan sub-pixels are set so as not to change the hue (G") of the color displayed by the pixel. Here, the increasing rate of the luminance value of the yellow sub-pixel is approximately equal to that of the cyan sub-pixel.

As the luminance values of the green, yellow and cyan sub-pixels increase, the chroma and the lightness of the color displayed by the pixel increase. When reaching "1", the luminance value of the green sub-pixel is kept "1". At this point, the color displayed by the pixel is the optimal color of the hue (G"). The luminance values of the green, yellow, cyan, red, blue and magenta sub-pixels are respectively "1", "0.29", "0.30", "0", "0" and "0".

Next, in order to further increase the lightness of the pixel, the luminance values of the yellow and cyan sub-pixels are kept increasing. Here, the increasing rate of the luminance value of the cyan sub-pixel is higher than that of the yellow sub-pixel, and the luminance value of the cyan sub-pixel reaches "1" before the luminance value of the yellow sub-pixel. When reaching "1", the luminance value of the cyan sub-pixel is kept "1".

Next, the luminance value of the blue sub-pixel corresponding to (B), which is in the counterclockwise direction with respect to the hue (G) like the hue (C) and is closest to the hue (G) next to the hue (C) on the a*b* plane of the L*a*b* colorimetric system, starts to be increased. The increasing rates of the luminance values of the yellow and blue sub-pixels are set so as not to change the hue (G"). The luminance value of the yellow sub-pixel reaches "1" before the luminance value of the blue sub-pixel.

Next, the luminance value of the red sub-pixel corresponding to (R), which is in the clockwise direction with respect to the hue (G) like the hue (Ye) and is closest to the hue (G) next to the hue (Ye) on the a*b* plane of the L*a*b* colorimetric system, starts to be increased. The increasing rates of the luminance values of the blue and red sub-pixels are set so as not to change the hue (G"). The increasing rate of the luminance value of the red sub-pixel is higher than that of the blue sub-pixel, and the luminance value of the red sub-pixel reaches "1" before the luminance value of the blue sub-pixel.

Next, the luminance value of the magenta sub-pixel corresponding to the hue (M) starts to be increased. When the luminance values of the blue and magenta sub-pixels increase and reach "1", the color displayed by the pixel is white. At this point, the luminance values of the green, yellow, cyan, red, blue and magenta sub-pixels are respectively "1", "1", "1", "1", "1" and "1".

Figure 54:
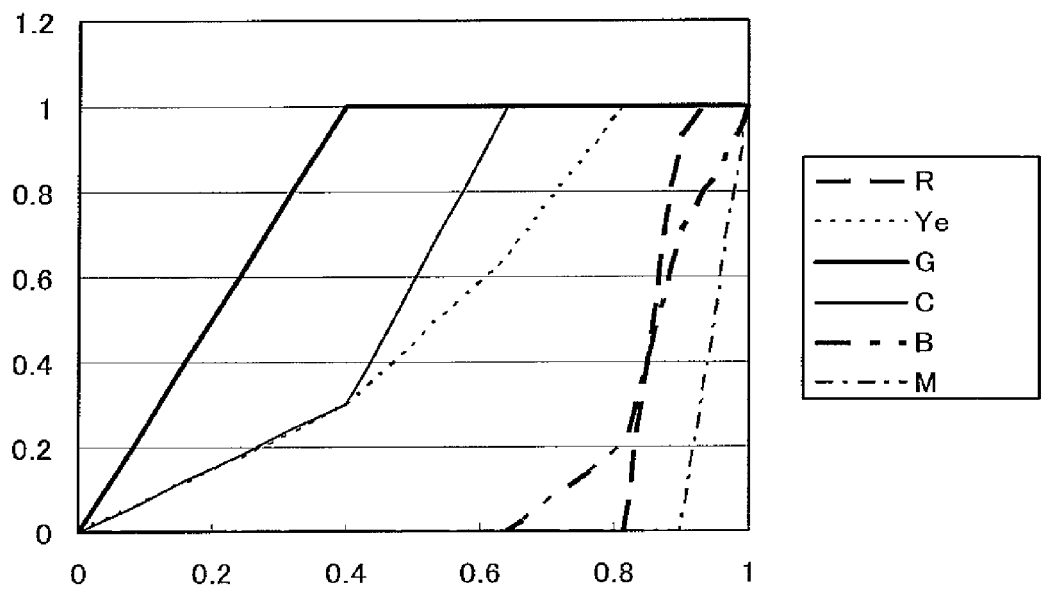
FIG. 54 is a graph for explaining the changes of the luminance values of the sub-pixels in the multi-primary color display device in Embodiment 3.

FIG. 53 and FIG. 54 show examples of the changes of the luminance values of the sub-pixels in the case where the color displayed by the pixel changes from black to white via the optimal color of the hue (G"), but the present invention is not limited to these. The luminance values of the sub-pixels may change in different manners.

In the above description, the changes of the luminance values of the sub-pixels in the case where the color displayed by the pixel changes from black to white via the optimal color of the hue (G") are explained. In the case where the color displayed by the pixel changes from black to white via the optimal color of the hue (R") or (B") also, the luminance values of the sub-pixels change in substantially the same manner. Here, the hue (R") is closest to the hue (R) among the hues corresponding to the plurality of sub-pixels, and the hue (B") is closest to the hue (B) among the hues corresponding to the plurality of sub-pixels. For example, while the color displayed by the pixel changes from black to the optimal color of the hue (R"), the luminance value of the red sub-pixel having the hue (R) close to the hue (R") is lit up, and also the luminance values of the yellow and magenta sub-pixels corresponding to the hues (Ye) and (M) adjacent to the hue (R) on both sides thereof are lit up. While the color displayed by the pixel changes from black to the optimal color of the hue (B"), the luminance value of the blue sub-pixel having the hue (B) close to the hue (B") is lit up, and also the luminance values of the magenta and cyan sub-pixels corresponding to the hues (M) and (C) adjacent to the hue (B) on both sides thereof are lit up.

As described above, in the display device in this embodiment, while the color displayed by the pixel changes from black to the optimal color of the hue (R"), (G") or (B"), three sub-pixels are lit up and so the misapprehension is suppressed. In the case where the color displayed by the pixel changes from black to white via the optimal color of the hue (Ye"), (C") or (M"), the luminance values of the sub-pixels change in a slightly different manner. Here, the hues (Ye"), (C") or (M") is respectively closest to the hue (Ye), (C) or (M) among the hues corresponding to the sub-pixels.

Hereinafter, changes of the luminance values of the sub-pixels in the case where the color displayed by the pixel changes from black to white via the optimal color of a specific hue of cyan will be described. The hue of the color displayed by the pixel (cyan) is close to the hue of the cyan sub-pixel, but precisely, the hue angle of the color displayed by the pixel (cyan) is different from the hue angle of the cyan sub-pixel. Here, the hue of the color displayed by the pixel (cyan) will be described as being different from the hue of the cyan sub-pixel. In the following description, the specific hue of the color displayed by the pixel (cyan) will be represented as the "hue (C")" or simply as "(C")" as being distinguished from the hue (C) of the cyan sub-pixel. For example, the hue angle of the hue (C) is 219°, and the hue angle of the hue (C") is 211°.

In the display device in this embodiment, in the case where the color displayed by the pixel changes from black to the optimal color of the hue (C"), the luminance value of the cyan sub-pixel corresponding to the hue (C) closest to the hue (C") starts to be increased, and also the luminance values of the blue and green sub-pixels corresponding to two hues adjacent to the hue (C) (namely, the hues (B) and (G)) start to be increased at an increasing rate lower than that of the cyan sub-pixel.

Figure 55:
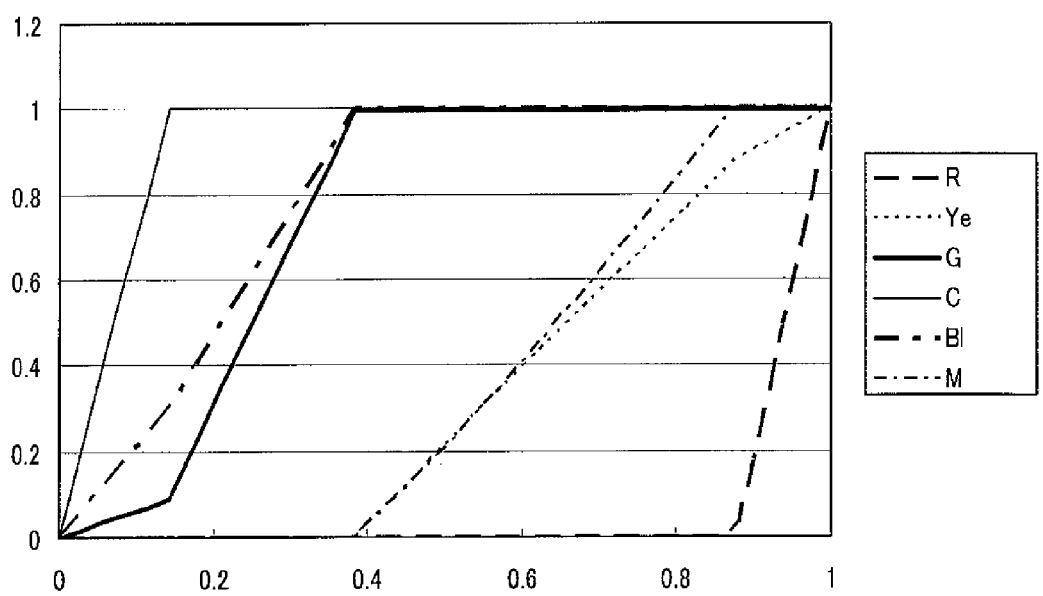
FIG. 55 is a graph for explaining the changes of the luminance values of the sub-pixels in the multi-primary color display device in Embodiment 3.

Hereinafter, with reference to FIG. 55, changes of the luminance values of the sub-pixels in the display device in this embodiment in the case where the color displayed by the pixel changes from black to white via the optimal color of the hue (C") will be described.

In an initial state, the luminance values of all the sub-pixels, namely, the cyan, blue, green, magenta, yellow and red sub-pixels are "0". The color displayed by the pixel is black. First, the luminance value of the cyan sub-pixel having the hue (C) closest to the hue (C") starts to be increased, and also the luminance values of the blue and green sub-pixels start to be increased at an increasing rate lower than that of the cyan sub-pixel. The increasing rates of the luminance values of the blue and green sub-pixels are set so as not to change the hue (C") of the color displayed by the pixel. Here, the increasing rate of the luminance value of the blue sub-pixel is higher than that of the green sub-pixel.

As the luminance values of the cyan, blue and green sub-pixels increase, the chroma and the lightness of the color displayed by the pixel increase. The luminance value of the cyan sub-pixel reaches "1" before the luminance values of the blue and green sub-pixels.

When reaching "1", the luminance value of the cyan sub-pixel is kept "1". Then, the luminance values of the blue and green sub-pixels are kept increasing. After the luminance value of the cyan sub-pixel reaches "1", the increasing rate of the luminance value of the green sub-pixel is higher than that of the blue sub-pixel, and the luminance values of the blue and green sub-pixels reach approximately at the same time.

When reaching "1", the luminance values of the blue and green sub-pixels are kept "1". Next, in order to further increase the lightness of the pixel, the luminance value of the magenta sub-pixel corresponding to the hue (M), which is on the same side as the hue (B) with respect to the hue (C) and is closest to the hue (C) next to the hue (B), and the luminance value of the yellow sub-pixel corresponding to the hue (Ye), which is on the same side as the hue (G) with respect to the hue (C) and is closest to the hue (C) next to the hue (G), start to be increased. The increasing rates of the luminance values of the magenta and yellow sub-pixels are set so as not to change the hue (C"). Initially, the increasing rate of the luminance value of the magenta sub-pixel is equal to that of the yellow sub-pixel. After the luminance values of the magenta and yellow sub-pixels increase to a certain degree, the increasing rate of the luminance value of the yellow sub-pixel becomes lower than that of the magenta sub-pixel. Therefore, the luminance value of the magenta sub-pixel reaches "1" before the luminance value of the yellow sub-pixel.

When reaching "1", the luminance value of the magenta sub-pixel is kept "1". Next, the luminance value of the red sub-pixel starts to be increased. When the luminance values of the yellow and red sub-pixels increase and reach "1", the color displayed by the pixel is white.

In the above description, the luminance values of the blue and green sub-pixels reach "1" approximately at the same time, but present invention is not limited to this. The luminance values of the blue and green sub-pixels may reach "1" at different timings from each other.

Figure 56:
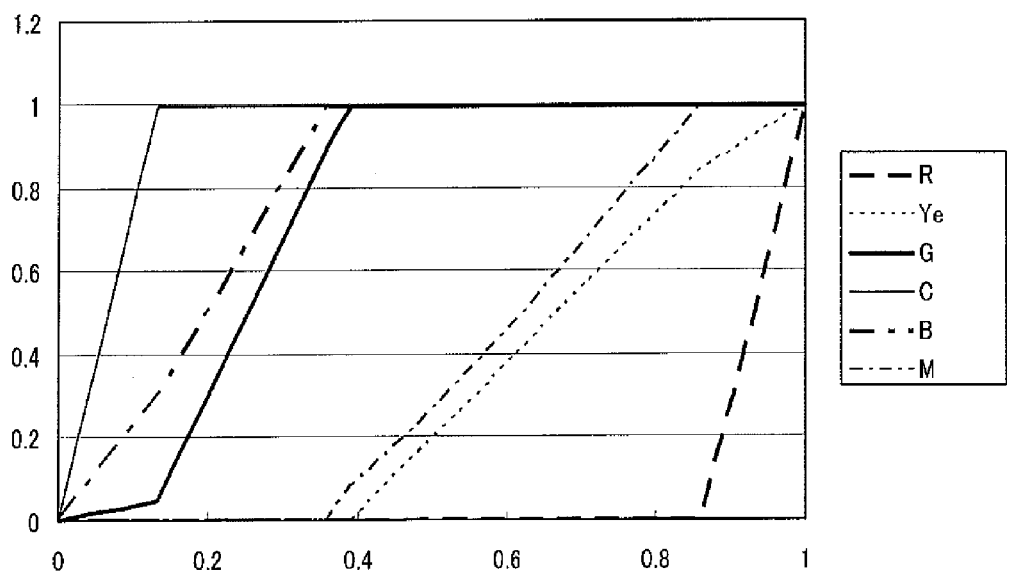
FIG. 56 is a graph for explaining the changes of the luminance values of the sub-pixels in the multi-primary color display device in Embodiment 3.

Hereinafter, with reference to FIG. 56, changes of the luminance values of the sub-pixels will be described. Here, the hue angle of the color displayed by the pixel is 215°.

In an initial state, the luminance values of all the sub-pixels, namely, the cyan, blue, green, magenta, yellow and red sub-pixels are "0". The color displayed by the pixel is black. First, the luminance value of the cyan sub-pixel having the hue (C) closest to the hue (C") is increased, and also the luminance values of the blue and green sub-pixels start to be increased at an increasing rate lower than that of the cyan sub-pixel. The increasing rates of the luminance values of the blue and green sub-pixels are set so as not to change the hue (C") of the color displayed by the pixel. Here, the increasing rate of the luminance value of the blue sub-pixel is higher than that of the green sub-pixel.

As the luminance values of the cyan, blue and green sub-pixels increase, the chroma and the lightness of the color displayed by the pixel increase. The luminance value of the cyan sub-pixel reaches "1" before the luminance values of the blue and green sub-pixels.

When reaching "1", the luminance value of the cyan sub-pixel is kept "1". Then, the luminance values of the blue and green sub-pixels are kept increasing. After the luminance value of the cyan sub-pixel reaches "1", the increasing rate of the luminance value of the green sub-pixel is higher than that of the blue sub-pixel, but the luminance value of the blue sub-pixel reaches "1" before the luminance value of the green sub-pixel.

When reaching "1", the luminance value of the blue sub-pixel is kept "1". Next, in order to further increase the lightness of the pixel, the luminance value of the magenta sub-pixel corresponding to the hue (M), which is on the same side as the hue (B) with respect to the hue (C) and is closest to the hue (C) next to the hue (B), starts to be increased. The increasing rates of the luminance values of the green and magenta sub-pixels are set so as not to change the hue (C"). The luminance value of the green sub-pixel reaches "1" before the luminance value of the magenta sub-pixel.

When reaching "1", the luminance value of the green sub-pixel is kept "1". Next, in order to further increase the lightness of the pixel, the luminance value of the yellow sub-pixel corresponding to the hue (Ye), which is on the same side as the hue (G) with respect to the hue (C) and is closest to the hue (C) next to the hue (G), starts to be increased. The increasing rates of the luminance values of the magenta and yellow sub-pixels are set so as not to change the hue (C"). The luminance value of the magenta sub-pixel reaches "1" before the luminance value of the yellow sub-pixel.

When reaching "1", the luminance value of the magenta sub-pixel is kept "1". Next, the luminance value of the red sub-pixel starts to be increased. When the luminance values of the yellow and red sub-pixels increase and reach "1", the color displayed by the pixel is white.

In the above description, the luminance value of the blue sub-pixel reaches "1" before the luminance value of the green sub-pixel, but present invention is not limited to this. The luminance value of the green sub-pixel may reach "1" before the luminance value of the blue sub-pixel.

Figure 57:
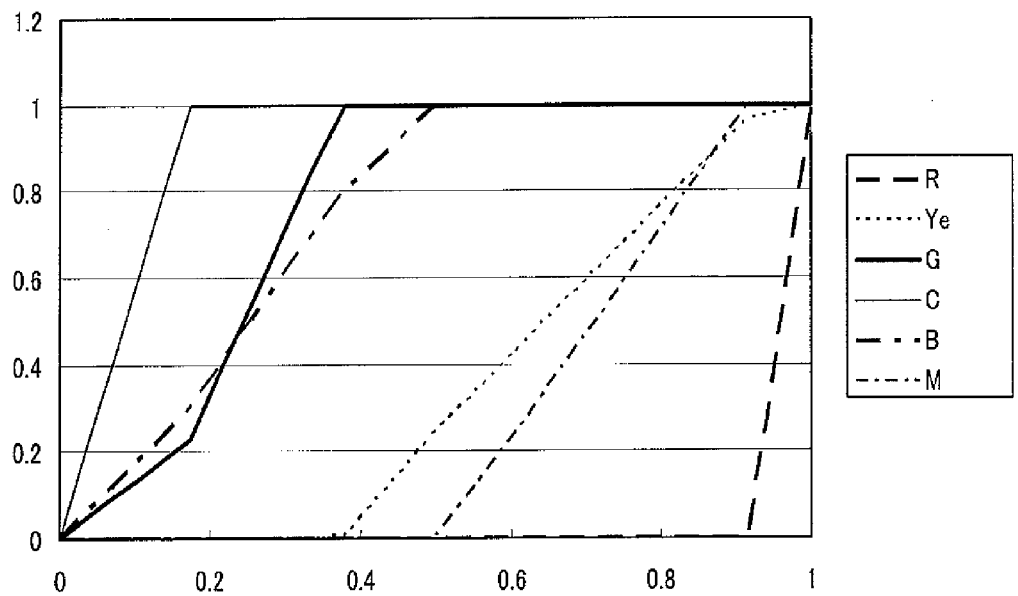
FIG. 57 is a graph for explaining the changes of the luminance values of the sub-pixels in the multi-primary color display device in Embodiment 3.

Hereinafter, with reference to FIG. 57, changes of the luminance values of the sub-pixels will be described. Here, the hue angle of the color displayed by the pixel is 200°.

In an initial state, the luminance values of all the sub-pixels, namely, the cyan, blue, green, magenta, yellow and red sub-pixels are "0". The color displayed by the pixel is black. First, the luminance value of the cyan sub-pixel having the hue (C) closest to the hue (C") is increased, and also the luminance values of the blue and green sub-pixels start to be increased at an increasing rate lower than that of the cyan sub-pixel. The increasing rates of the luminance values of the blue and green sub-pixels are set so as not to change the hue (C") of the color displayed by the pixel. Here, the increasing rate of the luminance value of the blue sub-pixel is higher than that of the green sub-pixel.

As the luminance values of the cyan, blue and green sub-pixels increase, the chroma and the lightness of the color displayed by the pixel increase. The luminance value of the cyan sub-pixel reaches "1" before the luminance values of the blue and green sub-pixels.

When reaching "1", the luminance value of the cyan sub-pixel is kept "1". Then, the luminance values of the blue and green sub-pixels are kept increasing. After the luminance value of the cyan sub-pixel reaches "1", the increasing rate of the luminance value of the green sub-pixel is higher than that of the blue sub-pixel, and the luminance value of the green sub-pixel reaches "1" before the luminance value of the blue sub-pixel.

When reaching "1", the luminance value of the green sub-pixel is kept "1". Next, in order to further increase the lightness of the pixel, the luminance value of the yellow sub-pixel corresponding to the hue (Ye), which is on the same side as the hue (G) with respect to the hue (C) and is closest to the hue (C) next to the hue (G), starts to be increased. The increasing rates of the luminance values of the blue and yellow sub-pixels are set so as not to change the hue (C"). The luminance value of the blue sub-pixel reaches "1" before the luminance value of the yellow sub-pixel.

When reaching "1", the luminance value of the blue sub-pixel is kept "1". Next, in order to further increase the lightness of the pixel, the luminance value of the magenta sub-pixel corresponding to the hue (M), which is on the same side as the hue (B) with respect to the hue (C) and is closest to the hue (C) next to the hue (B), starts to be increased. The increasing rates of the luminance values of the yellow and magenta sub-pixels are set so as not to change the hue (C"). The increasing rate of the luminance value of the magenta sub-pixel is higher than that of the yellow sub-pixel, and the luminance value of the magenta sub-pixel reaches "1" before the luminance value of the yellow sub-pixel.

When reaching "1", the luminance value of the magenta sub-pixel is kept "1". Next, the luminance value of the red sub-pixel starts to be increased. When the luminance values of the yellow and red sub-pixels increase and reach "1", the color displayed by the pixel is white.

Embodiment 4

The display device in Embodiment 3 above performs display using six primary colors, but the present invention is not limited to this. The display device may perform display using five primary colors.

Hereinafter, a multi-primary color display device in Embodiment 4 according to the present invention will be described. A multi-primary color display device in this embodiment has substantially the same structure as that of the display device in Embodiment 2 described above with reference to FIGS. 30 and 31 except that the color of each sub-pixel is slightly different. The same description will not be provided in order to avoid redundancy.

Figure 58:
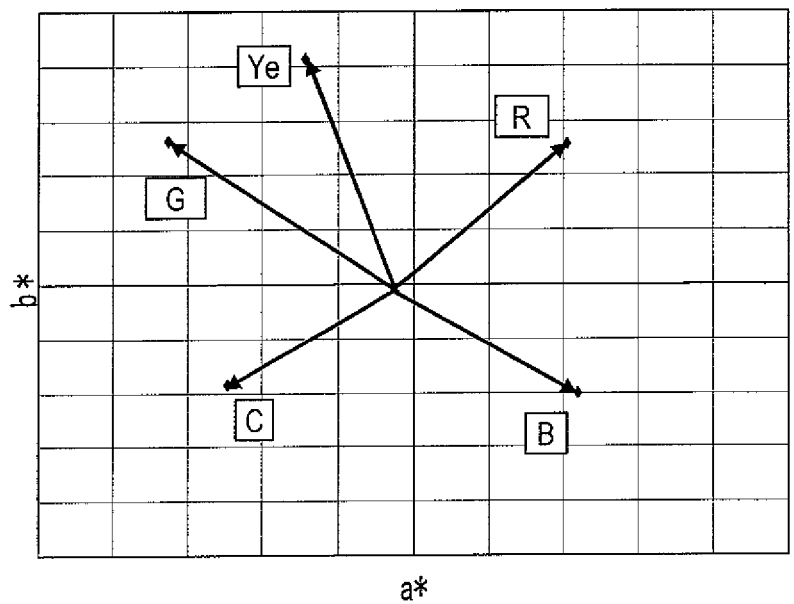
FIG. 58 is a schematic view showing the a*b* plane of the L*a*b* colorimetric system in which a* and b* are plotted regarding the color of each sub-pixel in a multi-primary color display device in Embodiment 4.

FIG. 58 is a schematic view showing the a*b* plane of the L*a*b* colorimetric system in which a* and b* are plotted regarding the color of each of the sub-pixels in the display device in this embodiment. Table 2 shows XYZ values and xy values for the colors of the six sub-pixels. The values for the colors of the six sub-pixels correspond to the values of the respective colors when the gray scale levels of the sub-pixels are maximum. The XYZ values are regulated such that the Y value is 1.0.

TABLE 2

|  | X | Y | Z | x | y |
|---|---|---|---|---|---|
| Red sub-pixels | 0.2973 | 0.1364 | 0.0055 | 0.677 | 0.311 |
| Yellow sub-pixel | 0.3650 | 0.4578 | 0.0088 | 0.439 | 0.550 |
| Green sub-pixel | 0.0827 | 0.2312 | 0.0278 | 0.242 | 0.677 |
| Cyan sub-pixel | 0.0445 | 0.1162 | 0.1519 | 0.142 | 0.372 |
| Blue sub-pixel | 0.1619 | 0.0587 | 0.8947 | 0.145 | 0.053 |
| White | 0.9510 | 1.0000 | 1.0883 | 0.313 | 0.329 |

Figure 59:
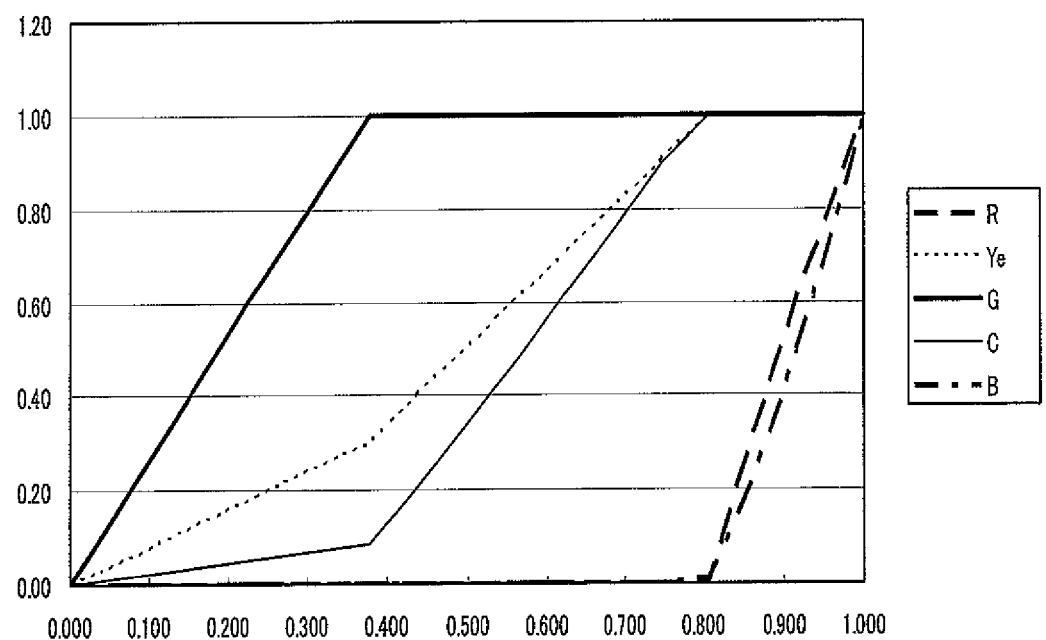
FIG. 59 is a graph for explaining the changes of the luminance values of the sub-pixels in the multi-primary color display device in Embodiment 4.

Hereinafter, with reference to FIG. 59, changes of the luminance values of the sub-pixels in the case where the color displayed by the pixel changes from black to white via the optimal color of a specific hue of green will be described. In FIG. 59, the horizontal axis represents the ratio of the luminance value of the pixel with respect to the luminance value of white, and the vertical axis represents the change of the luminance value of each sub-pixel.

Here, the hue angle of the hue (G") of the color displayed by the pixel (green) is different from the hue angle of the hue (G) of the green sub-pixel. For example, the hue angle of the hue (G) is 141°, and the hue angle of the hue (G") is 131°.

In an initial state, the luminance values of all the sub-pixels, namely, the green, yellow, cyan, red and blue sub-pixels are "0". The color displayed by the pixel is black. In the display device in this embodiment, the luminance value of the green sub-pixel starts to be increased, and also the luminance values of the yellow and cyan sub-pixels start to be increased. The green sub-pixel corresponds to (G) closest to the hue (G") on the a*b* plane of the L*a*b* colorimetric system. The yellow sub-pixel corresponds to (Ye) closest to the hue (G) in the clockwise direction on the a*b* plane of the L*a*b* colorimetric system shown in FIG. 58, and the cyan sub-pixel corresponds to (C) closest to the hue (G) in the clockwise direction on the a*b* plane of the L*a*b* colorimetric system.

In the display device in this embodiment, the increasing rates of the luminance values of the yellow and cyan sub-pixels are lower than that of the green sub-pixel. The increasing rates of the luminance values of the green, yellow and cyan sub-pixels are set so as not to change the hue (G") of the color displayed by the pixel.

As the luminance values of the green, yellow and cyan sub-pixels increase, the chroma and the lightness of the color displayed by the pixel increase. When reaching "1", the luminance value of the green sub-pixel is kept "1". At this point, the color displayed by the pixel is the optimal color of the hue (G"). The luminance values of the green, yellow, cyan, red and blue sub-pixels are respectively "1", "0.30", "0.08", "0" and "0".

Next, in order to further increase the lightness of the pixel, the luminance values of the yellow and cyan sub-pixels are kept increasing. Here, the increasing rate of the luminance value of the cyan sub-pixel is higher than that of the yellow sub-pixel, and the luminance value of the yellow sub-pixel reaches "1" approximately at the same time as the luminance value of the cyan sub-pixel. For example, the increasing rate of the luminance value of the cyan sub-pixel with respect to that of the yellow sub-pixel is about 131% (=92/70). When reaching "1", the luminance values of the yellow and cyan sub-pixels are kept "1".

Next, the luminance value of the red sub-pixel corresponding to (R), which is in the clockwise direction with respect to the hue (G) like the hue (Ye) and is closest to the hue (G) next to the hue (Ye) on the a*b* plane of the L*a*b* colorimetric system, and the luminance value of the blue sub-pixel corresponding to (B), which is in the counterclockwise direction with respect to the hue (G) like the hue (C) and is closest to the hue (G) next to the hue (C) on the a*b* plane of the L*a*b* colorimetric system, start to be increased. The increasing rates of the luminance values of the red and blue sub-pixels are set so as not to change the hue (G").

The luminance values of the red and blue sub-pixels start to be increased approximately at the same time. Initially, the increasing rate of the luminance value of the red sub-pixel is higher than that of the blue sub-pixel. In the middle, the increasing rate of the luminance value of the blue sub-pixel is changed to be higher than that of the red sub-pixel, and the luminance value of the red sub-pixel reaches "1" approximately at the same time as the luminance value of the blue sub-pixel. When the luminance values of the red and blue sub-pixels increase and reach "1", the color displayed by the pixel is white. At this point, the luminance values of the green, yellow, cyan, red and blue sub-pixels are respectively "1", "1", "1", "1" and "1".

In the above description, the luminance value of the yellow sub-pixel reaches "1" approximately at the same time as the luminance value of the cyan sub-pixel, but present invention is not limited to this. The luminance value of the yellow sub-pixel may reach "1" at a different timing from the luminance value of the cyan sub-pixel. Hereinafter, with reference to FIG. 60, changes of the luminance values of the sub-pixels will be described. Here, the hue angle of the hue (G") is 129°.

In an initial state, the luminance values of all the sub-pixels, namely, the green, yellow, cyan, red and blue sub-pixels are "0". The color displayed by the pixel is black. First, the luminance values of the green, yellow and cyan sub-pixels start to be increased. The increasing rates of the luminance values of the yellow and cyan sub-pixels are lower than that of the green sub-pixel. The increasing rates of the luminance values of the green, yellow and cyan sub-pixels are set so as not to change the hue (G") of the color displayed by the pixel. As the luminance values of the green, yellow and cyan sub-pixels increase, the chroma and the lightness of the color displayed by the pixel increase. When reaching "1", the luminance value of the green sub-pixel is kept "1". At this point, the color displayed by the pixel is the optimal color of the hue (G"). The luminance values of the green, yellow, cyan, red and blue sub-pixels are respectively "1", "0.30", "0.02", "0" and "0".

Next, in order to further increase the lightness of the pixel, the luminance values of the yellow and cyan sub-pixels are kept increasing. Here, the increasing rate of the luminance value of the cyan sub-pixel is higher than that of the yellow sub-pixel. The luminance value of the yellow sub-pixel reaches "1" approximately at the same time as the luminance value of the cyan sub-pixel. The luminance value of the yellow sub-pixel reaches "1" before the luminance value of the cyan sub-pixel. When reaching "1", the luminance value of the yellow sub-pixel is kept "1".

Next, the luminance value of the red sub-pixel corresponding to (R), which is in the clockwise direction with respect to the hue (G) like the hue (Ye) and is closest to the hue (G) next to the hue (Ye) on the a*b* plane of the L*a*b* colorimetric system, starts to be increased. The increasing rates of the luminance values of the cyan and red sub-pixels are set so as not to change the hue (G"). The luminance value of the cyan sub-pixel reaches "1" before the luminance value of the red sub-pixel. When reaching "1", the luminance value of the cyan sub-pixel is kept "1". The increasing rates of the luminance values of the red and blue sub-pixels are set so as not to change the hue (G"). The luminance value of the red sub-pixel reaches approximately at the same time as the luminance value of the blue sub-pixel.

In the above description, the luminance value of the yellow sub-pixel reaches "1" before the luminance value of the cyan sub-pixel, but present invention is not limited to this. The luminance value of the cyan sub-pixel may reach "1" before the luminance value of the yellow sub-pixel. Hereinafter, with reference to FIG. 61, changes of the luminance values of the sub-pixels will be described. Here, the hue angle of the hue (G") is 143°.

In an initial state, the luminance values of all the sub-pixels, namely, the green, yellow, cyan, red and blue sub-pixels are "0". The color displayed by the pixel is black. The luminance values of the green, yellow and cyan sub-pixels start to be increased. The increasing rates of the luminance values of the yellow and cyan sub-pixels are lower than that of the green sub-pixel. The increasing rates of the luminance values of the green, yellow and cyan sub-pixels are set so as not to change the hue (G") of the color displayed by the pixel. Here, the increasing rate of the luminance value of the cyan sub-pixel is higher than that of the yellow sub-pixel.

As the luminance values of the green, yellow and cyan sub-pixels increase, the chroma and the lightness of the color displayed by the pixel increase. When reaching "1", the luminance value of the green sub-pixel is kept "1". At this point, the color displayed by the pixel is the optimal color of the hue (G"). The luminance values of the green, yellow, cyan, red and blue sub-pixels are respectively "1", "0.16", "0.30", "0" and "0".

Next, in order to further increase the lightness of the pixel, the luminance values of the yellow and cyan sub-pixels are kept increasing. Even after the luminance value of the green sub-pixel reaches "1", the increasing rate of the luminance value of the cyan sub-pixel is higher than that of the yellow sub-pixel. The luminance value of the cyan sub-pixel reaches "1" before the luminance value of the yellow sub-pixel.

Next, the luminance value of the blue sub-pixel corresponding to (B), which is in the counterclockwise direction with respect to the hue (G) like the hue (C) and is closest to the hue (G) next to the hue (C) on the a*b* plane of the L*a*b* colorimetric system, starts to be increased. The increasing rates of the luminance values of the yellow and blue sub-pixels are set so as not to change the hue (G"). The luminance value of the yellow sub-pixel reaches "1" before the luminance value of the blue sub-pixel.

Next, the luminance value of the red sub-pixel corresponding to (R), which is in the clockwise direction with respect to the hue (G) like the hue (Ye) and is closest to the hue (G) next to the hue (Ye) on the a*b* plane of the L*a*b* calorimetric system, starts to be increased. The increasing rates of the luminance values of the blue and red sub-pixels are set so as not to change the hue (G"). When the luminance values of the red and blue sub-pixels increase and reach "1", the color displayed by the pixel is white. At this point, the luminance values of the green, yellow, cyan, red and blue sub-pixels are respectively "1", "1", "1", "1" and "1".

Figure 60:
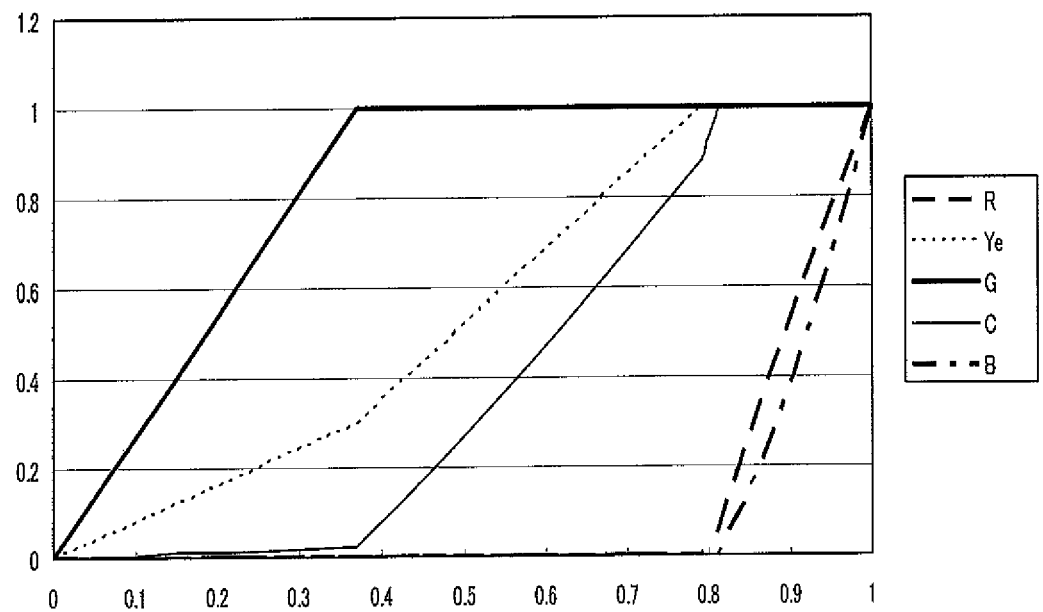
FIG. 60 is a graph for explaining the changes of the luminance values of the sub-pixels in the multi-primary color display device in Embodiment 4.
Figure 61:
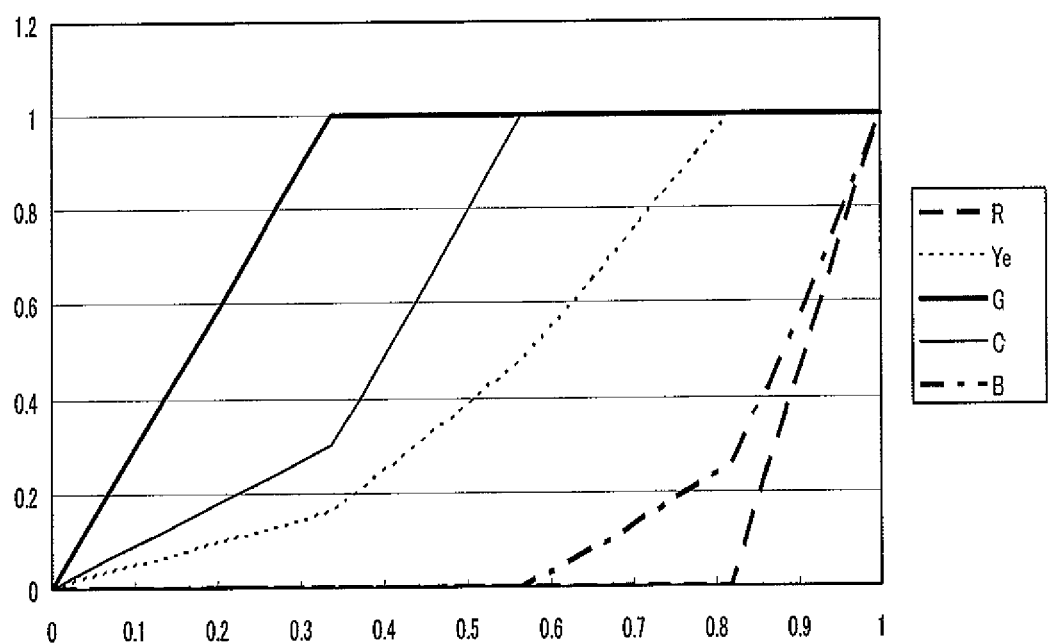
FIG. 61 is a graph for explaining the changes of the luminance values of the sub-pixels in the multi-primary color display device in Embodiment 4.

FIGS. 59 through 61 show examples of the changes of the luminance values of the sub-pixels in the case where the color displayed by the pixel changes from black to white via the optimal color of the hue (G"), but the present invention is not limited to these. The luminance values of the sub-pixels may change in different manners.

In the above description, the changes of the luminance values of the sub-pixels in the case where the color displayed by the pixel changes from black to white via the optimal color of the hue (G") are explained. In the case where the color displayed by the pixel changes from black to white via the optimal color of the hue (R") or (B") also, the luminance values of the sub-pixels change in substantially the same manner. For example, while the color displayed by the pixel changes from black to the optimal color of the hue (R"), the luminance value of the red sub-pixel having the hue (R) close to the hue (R") is lit up, and also the luminance values of the yellow and blue sub-pixels corresponding to the hues (Ye) and (B) adjacent to the hue (R) on both sides thereof are lit up. While the color displayed by the pixel changes from black to the optimal color of the hue (B"), the luminance value of the blue sub-pixel having the hue (B) close to the hue (B") is lit up, and also the luminance values of the red and cyan sub-pixels corresponding to the hues (R) and (C) adjacent to the hue (B) on both sides thereof are lit up.

As described above, in the display device in this embodiment, while the color displayed by the pixel changes from black to the optimal color of the hue (R"), (G") or (B"), three sub-pixels are lit up and so the misapprehension is suppressed. In the case where the color displayed by the pixel changes from black to white via the optimal color of the hue (Ye"), (C") or (M"), the luminance values of the sub-pixels change in a slightly different manner.

Hereinafter, changes of the luminance values of the sub-pixels in the case where the color displayed by the pixel changes from black to white via the optimal color of a specific hue of cyan will be described. Here, the hue (C") of the color displayed by the pixel (cyan) is different from the hue (C) of the cyan sub-pixel. For example, the hue angle of the hue (C) is 217°, and the hue angle of the hue (C") is 236°.

In the display device in this embodiment, in the case where the color displayed by the pixel changes from black to the optimal color of the hue (C"), the luminance value of the cyan sub-pixel corresponding to the hue (C) closest to the hue (C") starts to be increased, and also the luminance values of the blue and green sub-pixels corresponding to two hues adjacent to the hue (C) (namely, the hues (B) and (G)) start to be increased at an increasing rate lower than that of the cyan sub-pixel.

Figure 62:
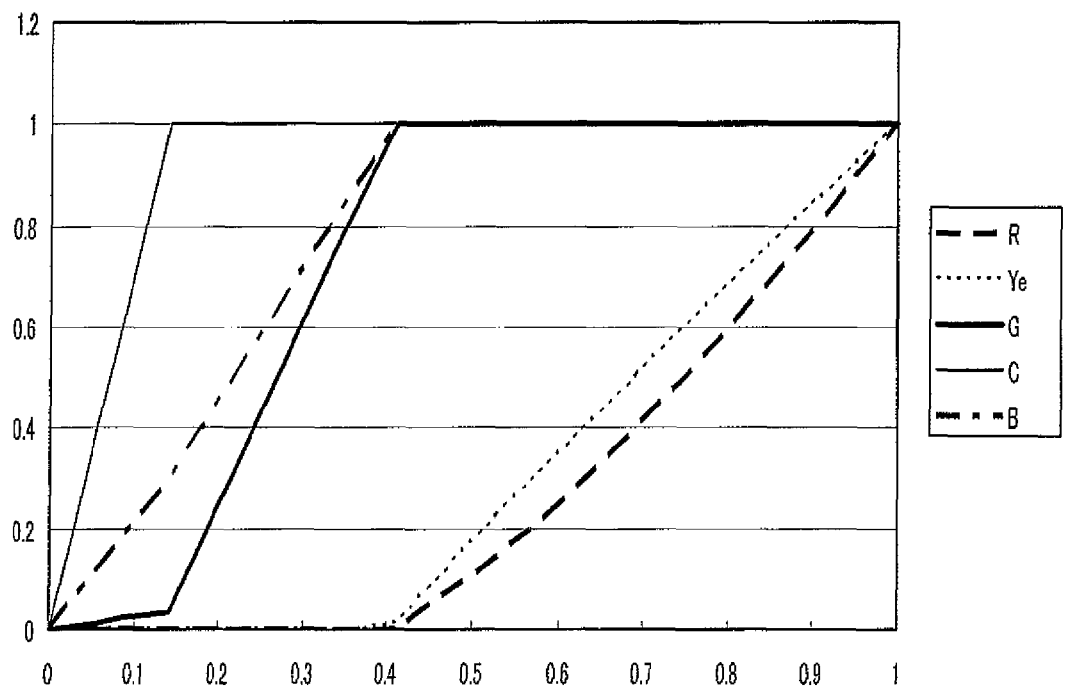
FIG. 62 is a graph for explaining the changes of the luminance values of the sub-pixels in the multi-primary color display device in Embodiment 4.

Hereinafter, with reference to FIG. 62, changes of the luminance values of the sub-pixels in the display device in this embodiment in the case where the color displayed by the pixel changes from black to white via the optimal color of the hue (C") will be described.

In an initial state, the luminance values of all the sub-pixels, namely, the cyan, blue, green, yellow and red sub-pixels are "0". The color displayed by the pixel is black. First, the luminance value of the cyan sub-pixel having the hue (C) closest to the hue (C") starts to be increased, and also the luminance values of the blue and green sub-pixels start to be increased at an increasing rate lower than that of the cyan sub-pixel. The increasing rates of the luminance values of the blue and green sub-pixels are set so as not to change the hue (C") of the color displayed by the pixel. Here, the increasing rate of the luminance value of the blue sub-pixel is higher than that of the green sub-pixel.

As the luminance values of the cyan, blue and green sub-pixels increase, the chroma and the lightness of the color displayed by the pixel increase. The luminance value of the cyan sub-pixel reaches "1" before the luminance values of the blue and green sub-pixels.

When reaching "1", the luminance value of the cyan sub-pixel is kept "1". Then, the luminance values of the blue and green sub-pixels are kept increasing. After the luminance value of the cyan sub-pixel reaches "1", the increasing rate of the luminance value of the green sub-pixel is higher than that of the blue sub-pixel, and the luminance values of the blue and green sub-pixels reach "1" approximately at the same time.

When reaching "1", the luminance values of the blue and green sub-pixels are kept "1". Next, in order to further increase the lightness of the pixel, the luminance value of the red sub-pixel corresponding to the hue (R), which is on the same side as the hue (B) with respect to the hue (C) and is closest to the hue (C) next to the hue (B), and the luminance value of the yellow sub-pixel corresponding to the hue (Ye), which is on the same side as the hue (G) with respect to the hue (C) and is closest to the hue (C) next to the hue (G), start to be increased. The increasing rates of the luminance values of the red and yellow sub-pixels are set so as not to change the hue (C"). Initially, the increasing rate of the luminance value of the yellow sub-pixel is higher than that of the red sub-pixel. In the middle, the increasing rate of the luminance value of the red sub-pixel is changed to be higher than that of the yellow sub-pixel. The luminance value of the red sub-pixel reaches "1" approximately at the same time as the luminance value of the yellow sub-pixel. When the luminance values of the yellow and red sub-pixels increase and reach "1", the color displayed by the pixel is white.

In the above description, the luminance values of the blue and green sub-pixels reach "1" approximately at the same time, but present invention is not limited to this. The luminance values of the blue and green sub-pixels may reach "1" at different timings from each other.

Figure 63:
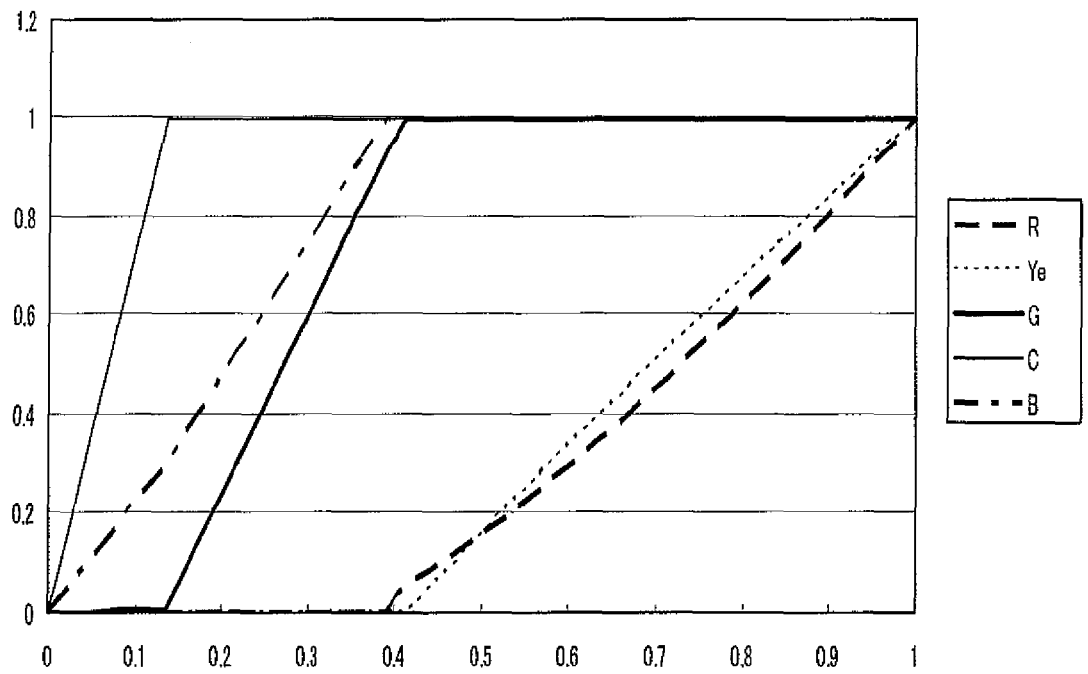
FIG. 63 is a graph for explaining the changes of the luminance values of the sub-pixels in the multi-primary color display device in Embodiment 4.

Hereinafter, with reference to FIG. 63, changes of the luminance values of the sub-pixels will be described. Here, the hue angle of the color displayed by the pixel is 239°.

In an initial state, the luminance values of all the sub-pixels, namely, the cyan, blue, green, yellow and red sub-pixels are "0". The color displayed by the pixel is black. First, the luminance value of the cyan sub-pixel having the hue (C) closest to the hue (C") is increased, and also the luminance values of the blue and green sub-pixels start to be increased at an increasing rate lower than that of the cyan sub-pixel. The increasing rates of the luminance values of the blue and green sub-pixels are set so as not to change the hue (C") of the color displayed by the pixel. Here, the increasing rate of the luminance value of the blue sub-pixel is higher than that of the green sub-pixel.

As the luminance values of the cyan, blue and green sub-pixels increase, the chroma and the lightness of the color displayed by the pixel increase. The luminance value of the cyan sub-pixel reaches "1" before the luminance values of the blue and green sub-pixels.

When reaching "1", the luminance value of the cyan sub-pixel is kept "1". Then, the luminance values of the blue and green sub-pixels are kept increasing. After the luminance value of the cyan sub-pixel reaches "1", the increasing rate of the luminance value of the green sub-pixel is higher than that of the blue sub-pixel, but the luminance value of the blue sub-pixel reaches "1" before the luminance value of the green sub-pixel.

When reaching "1", the luminance value of the blue sub-pixel is kept "1". Next, in order to further increase the lightness of the pixel, the luminance value of the red sub-pixel corresponding to the hue (R), which is on the same side as the hue (B) with respect to the hue (C) and is closest to the hue (C) next to the hue (B), starts to be increased. The increasing rates of the luminance values of the green and red sub-pixels are set so as not to change the hue (C"). When the luminance values of the green and red sub-pixels are increased, the luminance value of the green sub-pixel reaches "1" before the luminance value of the red sub-pixel.

When reaching "1", the luminance value of the green sub-pixel is kept "1". Next, in order to further increase the lightness of the pixel, the luminance value of the yellow sub-pixel corresponding to the hue (Ye), which is on the same side as the hue (G) with respect to the hue (C) and is closest to the hue (C) next to the hue (G), starts to be increased. The increasing rates of the luminance values of the red and yellow sub-pixels are set so as not to change the hue (C"). Initially, the increasing rate of the luminance value of the yellow sub-pixel is higher than that of the red sub-pixel. In the middle, the increasing rate of the luminance value of the red sub-pixel is changed to be higher than that of the yellow sub-pixel. The luminance value of the red sub-pixel reaches "1" approximately at the same time as the luminance value of the yellow sub-pixel. When the luminance values of the red and yellow sub-pixels increase and reach "1", the color displayed by the pixel is white.

In the above description, the luminance value of the blue sub-pixel reaches "1" before the luminance value of the green sub-pixel, but present invention is not limited to this. The luminance value of the green sub-pixel may reach "1" before the luminance value of the blue sub-pixel.

Figure 64:
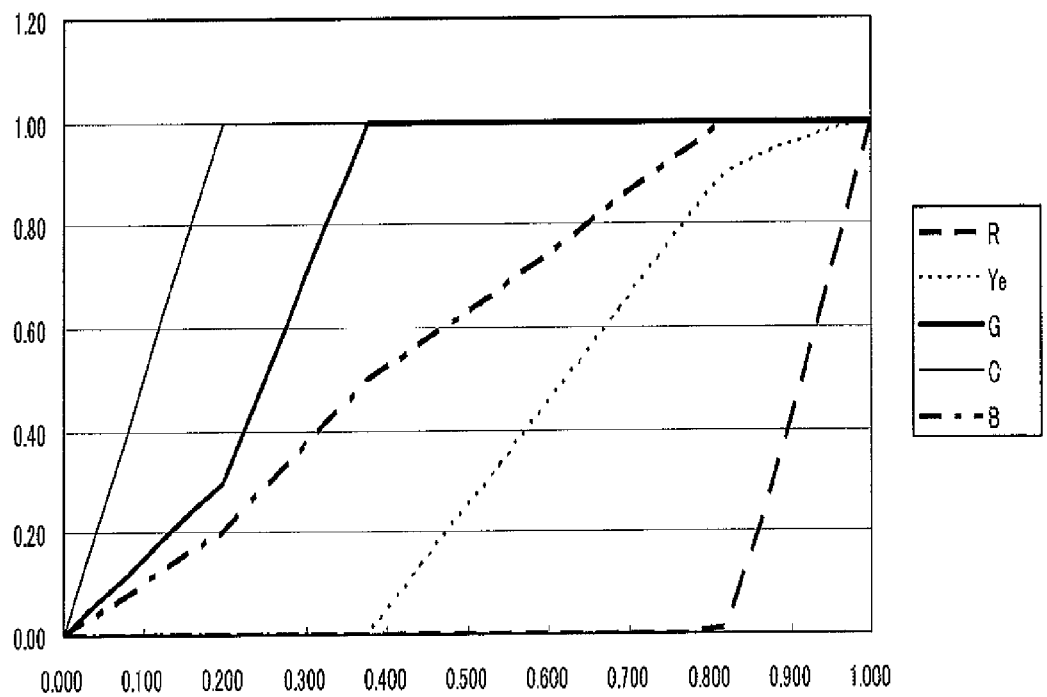
FIG. 64 is a graph for explaining the changes of the luminance values of the sub-pixels in the multi-primary color display device in Embodiment 4.

Hereinafter, with reference to FIG. 64, changes of the luminance values of the sub-pixels will be described. Here, the hue angle of the color displayed by the pixel is 200°.

In an initial state, the luminance values of all the sub-pixels, namely, the cyan, blue, green, yellow and red sub-pixels are "0". The color displayed by the pixel is black. First, the luminance value of the cyan sub-pixel having the hue (C) closest to the hue (C") is increased, and also the luminance values of the blue and green sub-pixels start to be increased at an increasing rate lower than that of the cyan sub-pixel. The increasing rates of the luminance values of the blue and green sub-pixels are set so as not to change the hue (C") of the color displayed by the pixel. Here, the increasing rate of the luminance value of the green sub-pixel is higher than that of the blue sub-pixel.

As the luminance values of the cyan, blue and green sub-pixels increase, the chroma and the lightness of the color displayed by the pixel increase. The luminance value of the cyan sub-pixel reaches "1" before the luminance values of the blue and green sub-pixels.

When reaching "1", the luminance value of the cyan sub-pixel is kept "1". Then, the luminance values of the blue and green sub-pixels are kept increasing. Even after the luminance value of the cyan sub-pixel reaches "1", the increasing rate of the luminance value of the green sub-pixel is higher than that of the blue sub-pixel, and the luminance value of the green sub-pixel reaches "1" before the luminance value of the blue sub-pixel.

When reaching "1", the luminance value of the green sub-pixel is kept "1". Next, in order to further increase the lightness of the pixel, the luminance value of the yellow sub-pixel corresponding to the hue (Ye), which is on the same side as the hue (G) with respect to the hue (C) and is closest to the hue (C) next to the hue (G), starts to be increased. The increasing rates of the luminance values of the blue and yellow sub-pixels are set so as not to change the hue (C"). The luminance value of the blue sub-pixel reaches "1" before the luminance value of the yellow sub-pixel.

When reaching "1", the luminance value of the blue sub-pixel is kept "1". Next, in order to further increase the lightness of the pixel, the luminance value of the red sub-pixel corresponding to the hue (R), which is on the same side as the hue (B) with respect to the hue (C) and is closest to the hue (C) next to the hue (B), starts to be increased. The increasing rates of the luminance values of the yellow and red sub-pixels are set so as not to change the hue (C"). When the luminance values of the yellow and red sub-pixels reach "1", the color displayed by the pixel is white.

In the above description, the pixel includes six sub-pixels, but the present invention is not limited to this. The number of sub-pixels belonging to each pixel may be four or five. When, for example, four sub-pixels belong to each pixel, each pixel may include the red, green, blue and yellow sub-pixels. When, for example, five sub-pixels belong to each pixel, each pixel may include the red, green, blue, yellow and cyan sub-pixels.

The display devices in Embodiments 1 through 4 are liquid crystal display devices, but the present invention is not limited to this. The display device may be any display device capable of providing multi-primary color display such as a cathode ray tube (CRT) display, a plasma display, an organic EL (electroluminescence) display, an SED (Surface-conduction Electron-emitter Display), a liquid crystal projector or the like.

The elements included in the multi-primary color signal generation section 120 in each of the display devices in Embodiments 1 through 4 may be realized by hardware, or may be partially or entirely realized by software. When these elements are realized by software, a computer may be used. Such a computer includes a CPU (central processing unit) for executing various programs, a RAM (random access memory) acting as a work area for executing the programs, and the like. A program for realizing the function of each element is executed by the computer, and the computer is operated as each of the elements.

Such a program may be supplied to the computer from a storage medium or via a communication network. The storage medium may be separable from the computer or may be incorporated into the computer. Such a storage medium may be mounted on the computer such that the computer can directly read the recorded program code, or may be mounted such that the computer can read the recorded program code via a program reading device connected to the computer as an external storage device. The storage medium may be, for example, a tape such as a magnetic tape, a cassette tape or the like; a disc including a magnetic disc such as a flexible disc, a hard disc or the like, a magneto-optic disc such as an MO, an MD or the like, and an optical disc such as a CD-ROM, a DVD, a CD-R or the like; a card such as an IC card (including a memory card), an optical card or the like; a semiconductor memory such as a mask ROM, an EPROM (Erasable Programmable Read Only Memory), an EEPROM (Electrically Erasable Programmable Read Only Memory), a flash ROM or the like; etc. In the case where a program is supplied via a communication network, the program may be in the form of a carrier wave or a data signal by which the program code is embodied by electronic transmission.

The disclosure of Japanese Patent Application No. 2008-193889, based upon which the present application claims priority, is incorporated herein for reference.

INDUSTRIAL APPLICABILITY

A multi-primary color display device according to the present invention can suppress the decline of the display quality while making effective use of the range of reproducible colors.

REFERENCE SIGNS LIST 100, 100A Multi-primary color display device
110, 110A Multi-primary color display panel
120 Multi-primary color signal generation section

The invention claimed is:

1. A multi-primary color display device including a plurality of pixels, each having a plurality of sub-pixels, wherein:
   the plurality of sub-pixels include a first sub-pixel for displaying a first color having a first hue, a second sub-pixel for displaying a second color having a second hue, a third sub-pixel for displaying a third color having a third hue, and a fourth sub-pixel for displaying a fourth color having a fourth hue;
   the second hue and the third hue are adjacent to the first hue on both sides thereof, among the hues corresponding to the plurality of sub-pixels on an a*b* plane of an L*a*b* colorimetric system; and
   when a color displayed by each pixel changes from black to an optimal color of the first hue or an optimal color of a specific hue which is closest to the first hue among the hues corresponding to the plurality of sub-pixels, luminance values of the plurality of sub-pixels are set such that the luminance value of the first sub-pixel starts to be increased and also the luminance values of the second and third sub-pixels start to be increased at a rate of increase lower than the rate of increase of the first sub-pixel.

2. The multi-primary color display device of claim 1, wherein the plurality of sub-pixels are arranged in one direction.

3. The multi-primary color display device of claim 2, wherein:
   the plurality of pixels are arranged in a matrix of a plurality of rows and a plurality of columns; and
   in each of the plurality of pixels, the plurality of sub-pixels are arranged in a row direction.

4. The multi-primary color display device of claim 3, wherein an order in which the plurality of sub-pixels are arranged in the row direction in one of the plurality of pixels is the same as an order in which the plurality of sub-pixels are arranged in the row direction in another of the plurality of pixels which is adjacent to the one pixel in the row direction.

5. The multi-primary color display device of claim 1, wherein when each pixel displays the optimal color of the first hue or the optimal color of the specific hue, the luminance values of the second and third sub-pixels are higher than the luminance value corresponding to a minimum gray scale level and are lower than the luminance value corresponding to a maximum gray scale level.

6. The multi-primary color display device of claim 1, wherein the plurality of sub-pixels further include a fifth sub-pixel for displaying a fifth color having a fifth hue and a sixth sub-pixel for displaying a sixth color having a sixth hue.

7. The multi-primary color display device of claim 6, wherein the hue of at least one of the plurality of sub-pixels is approximately the same as the hue of at least one of the other sub-pixels among the plurality of sub-pixels.

8. The multi-primary color display device of claim 6, wherein the color displayed by at least one of the plurality of sub-pixels is approximately the same as the color displayed by either one of the other sub-pixels among the plurality of sub-pixels.

9. The multi-primary color display device of claim 6, wherein at least one of the fourth sub-pixel, the fifth sub-pixel and the sixth sub-pixel is provided between two sub-pixels among the first sub-pixel, the second sub-pixel and the third sub-pixel.

10. The multi-primary color display device of claim 6, wherein the plurality of sub-pixels include a first red sub-pixel, a second red sub-pixel, a green sub-pixel, a blue sub-pixel, a yellow sub-pixel and a cyan sub-pixel as the first sub-pixel, the second sub-pixel, the third sub-pixel, the fourth sub-pixel, the fifth sub-pixel and the sixth sub-pixel.

11. The multi-primary color display device of claim 10, wherein at least one of the first red sub-pixel, the second red sub-pixel and the blue sub-pixel is provided between two sub-pixels among the green sub-pixel, the cyan sub-pixel and the yellow sub-pixel.

12. The multi-primary color display device of claim 10, wherein at least one of the first red sub-pixel, the second red sub-pixel and the yellow sub-pixel is provided between two sub-pixels among the cyan sub-pixel, the green sub-pixel and the blue sub-pixel.

13. The multi-primary color display device of claim 10, wherein at least one of the green sub-pixel, the yellow sub-pixel and the cyan sub-pixel is provided between two sub-pixels among the first red sub-pixel, the second red sub-pixel and the blue sub-pixel.

* * * * *